(12) United States Patent
Pusateri

(10) Patent No.: US 10,817,525 B2
(45) Date of Patent: Oct. 27, 2020

(54) METHOD FOR DISPLAYING CUSTOMIZED COMPILATION MEDIA ITEMS ON AN ELECTRONIC DISPLAY DEVICE

(71) Applicant: impulseGUIDE.com, Getzville, NY (US)

(72) Inventor: Frank C. Pusateri, Williamsville, NY (US)

(73) Assignee: impulseGUIDE.com, Getzville, NY (US)

( * ) Notice: Subject to any disclaimer, the term of this patent is extended or adjusted under 35 U.S.C. 154(b) by 921 days.

(21) Appl. No.: 14/251,063

(22) Filed: Apr. 11, 2014

(65) Prior Publication Data

US 2015/0169535 A1   Jun. 18, 2015

Related U.S. Application Data

(63) Continuation-in-part of application No. 14/105,695, filed on Dec. 13, 2013.

(51) Int. Cl.
  *G06F 16/248*   (2019.01)
  *G06F 16/432*   (2019.01)
  *G06F 16/438*   (2019.01)

(52) U.S. Cl.
  CPC .......... *G06F 16/248* (2019.01); *G06F 16/433* (2019.01); *G06F 16/4393* (2019.01)

(58) Field of Classification Search
  CPC ......... G06F 17/30053; G06F 17/30563; G06F 17/30705; G06F 16/248; G06F 16/254; G06F 16/4387; G06F 16/35; G06F 16/433; G06F 16/4393
  USPC .................................................. 707/737, 734
  See application file for complete search history.

(56) References Cited

U.S. PATENT DOCUMENTS

| | | |
|---|---|---|
| 5,309,174 A | 5/1994 | Minkus |
| 6,215,411 B1 | 4/2001 | Gothard |
| 6,384,736 B1 | 5/2002 | Gothard |
| 7,369,058 B2 | 5/2008 | Gothard |
| 7,743,112 B2 | 6/2010 | Kenna, III et al. |
| 7,765,273 B2 | 7/2010 | Kenna, III et al. |
| 8,330,613 B2 | 12/2012 | Gothard |
| 8,516,527 B2 | 8/2013 | Kenna, III et al. |
| 8,683,340 B2 | 3/2014 | Wilkins |
| 9,124,235 B2 | 9/2015 | Oliver et al. |

(Continued)

*Primary Examiner* — James Trujillo
*Assistant Examiner* — Fariborz Khoshnoodi
(74) *Attorney, Agent, or Firm* — Andrew J. Anderson, Esq.; Harter Secrest & Emery LLP

(57) ABSTRACT

A computer implemented method for displaying a customized compilation media item comprising a compilation of multiple images and textual content on an electronic display device screen. A compilation media item creator program stored in an electronic database employing at least first and second templates arranged in accordance with a media application script for display of first and second composite images in a specified sequence is accessed by a user. Saved customized compilation media items are included as individual media item along with other individual media items in a saved player program on an electronic database, and the electronic display device screen is driven with a media player to display media items on the electronic device display screen. Customized compilation media items further may be selected and combined into groups or channels of such compilation media items.

21 Claims, 47 Drawing Sheets

(56) References Cited

U.S. PATENT DOCUMENTS

| | | |
|---|---|---|
| 2003/0191816 A1 | 10/2003 | Landress et al. |
| 2005/0066286 A1* | 3/2005 | Makela ............... G06F 3/04817 |
| | | 715/764 |
| 2006/0292537 A1* | 12/2006 | Nute ........................ G09B 5/06 |
| | | 434/307 A |
| 2007/0083911 A1 | 4/2007 | Madden et al. |
| 2008/0060003 A1 | 3/2008 | Nocifera et al. |
| 2008/0066007 A1* | 3/2008 | Lau ....................... G06F 3/0481 |
| | | 715/783 |
| 2009/0012880 A1 | 1/2009 | Tortola |
| 2009/0144157 A1 | 6/2009 | Saracino et al. |
| 2010/0122172 A1 | 6/2010 | Mongeau et al. |
| 2011/0126144 A1* | 5/2011 | Sakaguchi ............... F24F 11/30 |
| | | 715/771 |
| 2011/0153043 A1* | 6/2011 | Ojala ...................... H04S 1/002 |
| | | 700/94 |
| 2011/0161348 A1* | 6/2011 | Oron ....................... G06F 16/70 |
| | | 707/769 |
| 2011/0170838 A1 | 7/2011 | Rosengart et al. |
| 2013/0002521 A1* | 1/2013 | Minematsu ........... G06F 3/1415 |
| | | 345/1.1 |
| 2013/0009968 A1 | 1/2013 | Gothard |
| 2013/0155075 A1* | 6/2013 | Matsui .................... G06T 9/001 |
| | | 345/501 |
| 2014/0050458 A1* | 2/2014 | Mochinaga .......... H04N 13/337 |
| | | 386/239 |
| 2014/0317662 A1 | 10/2014 | Oztaskent et al. |
| 2015/0058764 A1* | 2/2015 | Moran ................. G06F 3/0484 |
| | | 715/765 |

* cited by examiner

FIG. 4E

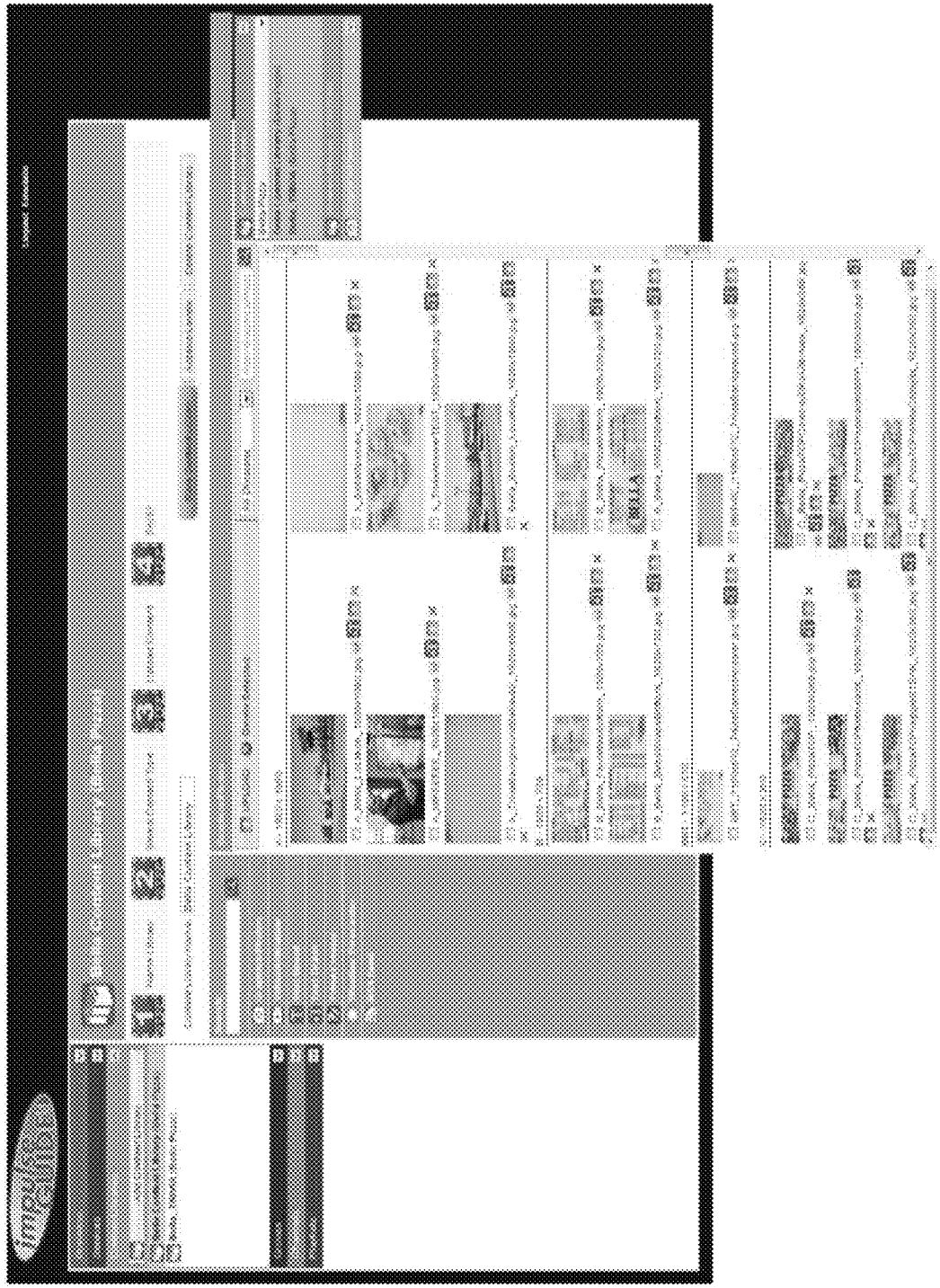
FIG. 5

FIG. 7C

Type Final Answer Text

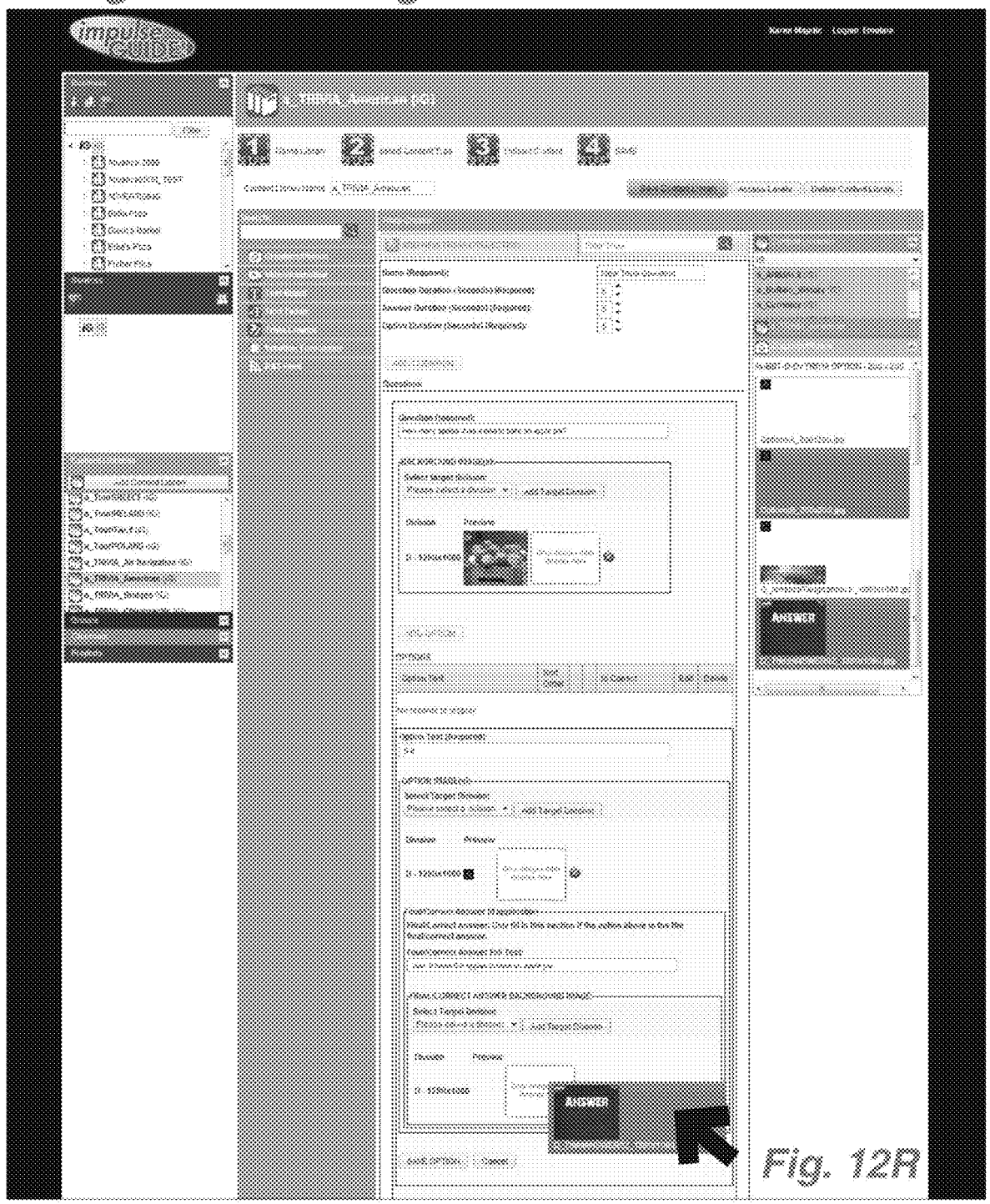

METHOD FOR DISPLAYING CUSTOMIZED COMPILATION MEDIA ITEMS ON AN ELECTRONIC DISPLAY DEVICE

CROSS REFERENCE TO RELATED APPLICATION

This invention is a continuation-in-part of application Ser. No. 14/105,695 filed Dec. 13, 2013, the disclosure of which is incorporated herein by reference in its entirety.

FIELD OF THE INVENTION

This invention relates generally to the field of screen media and, more specifically, to managing display of a plurality of media items on electronic display devices in a closed digital signage network that uses one or more digital display devices such as display placed on location, interactive displays and mobile devices such as a cell phone, smart phone or tablet. The invention further relates to a computer implemented method for displaying a customized compilation media item comprising a compilation of multiple images and textual content on an electronic display device screen.

BACKGROUND OF THE INVENTION

The display of media content in public venues using digital signage is a growing field. Digital signage systems are becoming increasingly popular in many environments and in particular in retail, food services, health care, hospitality, exhibit, entertainment, education and workplace locations. As the use of digital signage has expanded, content is increasingly delivered over digital signage networks that are connected to networked individual displays. As each of the displays in a network typically has its own characteristics with regard to desired display content, however, each display location may benefit from a uniquely tailored selection of media content and display times and schedules. Moreover, within each display there desirably may be multiple screen divisions, each of which may desirably be independently addressable to provide various types of content. Further, it may be desirable to continuously vary the content displayed on a screen, and further on each division of a screen, to provide a more enticing and engaging display.

Visual digital media or signage systems are basically comprised of three major elements: hardware, software, and media content. Media content is typically varied on displays in digital signage networks by means of globally or locally driven loops of content, each specific to a division or multiple divisions of one or more displays. In such an arrangement, the media content itself may be retrieved from a centralized storage location over a public or private data network. With the content being categorized according to a number of different criteria, a local device driving one or more displays may assemble a loop of content appropriate to its own characteristics, retrieving the individual media assets via the network. The loop is thus constructed at a local level to suit the various needs of the particular display venue in question. While current systems are relatively inexpensive to buy, operators or those using the system for messaging or viewer engagement often find that building content, adding content, and updating the content of the screen images is not easy, and that further approaches to enhancing viewer engagement would be desirable.

SUMMARY OF THE INVENTION

In accordance with one embodiment of the present invention, a computer implemented method for managing display of a plurality of media items on an electronic display device screen is described, comprising: accessing an electronic library of media items stored in an electronic database, including collections of media items saved in the electronic data base as groups or channels of media items, where each group or channel of media items contains a plurality of media items; selecting and arranging one or more groups or channels of media items saved in the electronic database, and optionally individual media items saved in the electronic library, in a designated sequential arrangement for sequential display of a media item from each selected group or channel and any selected individual media items, and saving the designated sequential arrangement of groups or channels of media items and optional individual media items in an electronic database as a first playlist; optionally forming and saving one or more additional playlists by selecting and arranging one or more channels of media items, groups of media items and individual media items saved in the electronic library, in additional designated sequential arrangements for sequential display of a media item from each selected channel, group and selected individual media items, and saving the additional designated sequential arrangements of channels of individual media items, groups of individual media items and individual media items in an electronic database as additional playlists; and selecting and arranging playlists including the first playlist and optionally additional playlists in a desired sequential order and saving the desired sequential order in a player program on an electronic database, wherein a media player driving the electronic display device screen is configured by the saved player program to display media items on the electronic device display screen in a manner corresponding to a repeating loop of the arranged order of selected playlists and selection of sequential arrangement of channels of media items, groups of media items and individual media items in each selected playlist, wherein each channel and/or group in each playlist is programmed such that the media player is further configured by the player program to play a different media item from the channel and/or group relative to the media item played the previous time the channel and/or group is played by the media player, whereby the media item displayed on the electronic display device screen for a channel and/or group is changed, relative to the previous displayed media item for the channel and/or group, each time the channel and/or group is displayed in the designated sequential arrangement of channels, groups and individual media items of a playlist as a player program loop repeats.

In further embodiments, also described are methods and systems for managing display of a plurality of media items on an electronic display device screen of a specified screen format comprising: a plurality of defined screen division formats stored in an electronic memory, where each defined screen division format is configured to represent either the entire specified screen format or a portion of the specified screen format; a plurality of defined screen layouts stored in an electronic memory, each defined screen layout comprising either i) a defined screen division format configured to represent the entire specified screen format or ii) two or more defined screen division formats each configured to represent a portion of the specified screen format and which are spatially combined to form divisions which together represent the entire specified screen format; a plurality of media items, and groups or channels of media items stored in an electronic memory, each stored in one of the plurality of defined screen division formats; and a player program creator configured to create and store player program instructions in an electronic memory for controlling a media player to display media items on an electronic display device screen of the specified screen format selected from the plurality of media items and groups or channels of media items in accordance with a selected one or more of the defined screen layouts displayed in a selected sequence, wherein media items selected to be displayed in each defined screen division format of each selected defined screen layout are only selectable in the player program creator from media items stored in the corresponding screen division format.

In accordance with yet further embodiments, a computer implemented method for displaying a customized compilation media item comprising a compilation of multiple images and textual content on an electronic display device screen is described, comprising: accessing a compilation media item creator program stored in an electronic database employing at least first and second templates arranged in accordance with a media application script for display of first and second composite images in a specified sequence, wherein the first template includes one or more text boxes superimposed over a first background image field and the second template includes one or more text boxes superimposed over a second background image field; entering text to be displayed in one or more text box in the first template and selecting a background image to be displayed in the first background image field from images stored in an electronic database, and saving the entered text and selected background image in an electronic database to create saved information for the first composite image; entering text to be displayed in one or more text box in the second template and selecting a background image to be displayed in the second background image field from images stored in an electronic database and saving the entered text and selected background image in an electronic database to create saved information for the second composite image; saving the entered text and selected background images for the first and second templates in an electronic database in combination as a saved customized compilation media item; including the saved customized compilation media item as an individual media item along with other individual media items in a saved player program on an electronic database; and driving the electronic display device screen with a media player to display media items on the electronic device display screen, wherein the media player is configured by the saved player program to sequentially display different individual media items included in the saved player program, including the saved customized compilation media item. In further preferred embodiments the first template includes at least a first text box superimposed over the first background image field in a first location, and the media application script in the compilation media item creator program further enables layering of one or more additional option text boxes and/or option images selected from images stored in an electronic database (preferably, at least one and up to and including three each of option text boxes and associated option images) over the first background image in a second location. Customized compilation media items created in accordance with such embodiments of the invention may further advantageously be selected and combined into groups or channels of such compilation media items in accordance with further embodiments of the invention, so a group or channel including such compilation media items may be arranged along with other individual media items or other groups or channels of media items in a designated sequential arrangement for sequential display of a media item from each selected group or channel and any selected individual media items in a saved playlist.

BRIEF DESCRIPTION OF THE DRAWINGS

FIGS. 4A-4E illustrate web-based GUI screens providing various levels of system access to selected content libraries to various types of users that may be employed in various embodiments of the invention.

FIG. 5 depicts a representative GUI screen that may be employed for uploading content to a content library in various embodiments of the invention.

FIGS. 7A-7C depict representative GUI screens for creating a channel and scheduling channel content that may be employed in various embodiments of the invention.

DETAILED DESCRIPTION

Figure 1A:
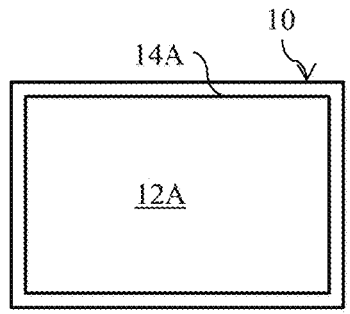
FIGS. 1A-1L are schematic views of an electronic display device screen having a non-limited sampling of various defined screen layouts comprising defined screen division formats that may be used in various embodiments of the present invention.

The presentation of media on a digital signage display may take a variety of different forms. In accordance with one embodiment of the present invention, a computer implemented method for managing display of a plurality of media items on an electronic display device screen is described, wherein a large amount of media content items may be easily programmed into playlists in a manner that facilitates building media content, adding media content, and updating media content to be displayed on a screen, while further enabling a high level of variety in the sequencing of the displayed media content items to be efficiently programmed.

In particular, an electronic library of media items stored in an electronic database may be accessed by a system user, e.g., over a web site, where the electronic library includes collections of media items saved in the electronic data base as channels of media items and/or groups of media items, where each channel of media items and group of media items contains a plurality of media items. Such channels of media items and groups of media items may be preformed and saved by the system provider so as to be directly available to a system user, or may be formed by the user by selecting individual media items from the electronic library to be displayed to form one or more channels of media items and/or groups of media items, where each formed channel of media items and group of media items contains a plurality of selected media items. The formed channels and groups may then be saved in the electronic database. Similarly, individual media items may be saved in the electronic database by the system provider and made available to a system user, and the system user may also upload and save individual media items to the electronic database. Media items may include still or moving images (e.g., graphics or photographs), video/animation, text boards, text tickers, trivia, weather, RSS feeds or other media content of interest. One or more saved groups of media items may be included as media items in a saved channel.

In specific embodiments of the invention, various themed content libraries may be created by a system provider including themed channels of media items and/or themed groups of media content, as well as themed individual media items, and made available to a system user to select from. For example holiday channels/groups, world tour channels/groups, inspirational quotes channels/groups, trivia channels/groups, fascinating facts channel/groups, etc. An advertising channel/group can also be created amongst many more examples.

One or more channels of media items, groups of media items, and optionally individual media items saved in the electronic library, may then be selected and arranged in a designated sequential arrangement for sequential display of a media item from each selected channel, group, and any selected individual media items, and saving the designated sequential arrangement of channels of media items, groups of media items, and optional individual media items in an electronic database as a first playlist. Optionally, one or more additional playlists may further be formed and saved by selecting and arranging one or more channels of media items, groups of media items, and individual media items saved in the electronic library, in additional designated sequential arrangements for sequential display of a media item from each selected channel, group, and selected individual media items, and saving the additional designated sequential arrangements of channels of media items, groups of media items, and individual media items in an electronic database as additional playlists.

Playlists including the first playlist and optionally additional playlists may then be selected and arranged in a desired sequential order, and the desired sequential order saved in a player program on an electronic database. The player program may be associated with a media player driving a specific electronic display device screen, such that the media player is configured by the saved player program to display media items on the electronic device display screen in a manner corresponding to a repeating loop of the arranged order of selected playlists and selection and sequential arrangement of channels of media items, groups of media items, and individual media items in each selected playlist. Each channel or group in each playlist is programmed such that the media player is further configured by the player program to play a different media item from the channel or group relative to the media item played the previous time the channel or group is played by the media player, whereby the media item displayed on the electronic display device screen for a channel or group is changed, relative to the previous displayed media item for the channel or group, each time the channel or group is displayed in the designated sequential arrangement of a playlist as a player program loop repeats.

In accordance with further embodiments of the invention, a channel play method or a group play method may be selected for each selected channel of media items or a group of media items to further configure the media player to display media items in the group or channel in a desired sequence each time the group or channel is displayed. In particular embodiments, the channel play method or a group play method may be selected from either displaying media items in the channel or group in a selected repeating ordered sequence each time the channel or group is displayed, or displaying media items in the channel or group in a random shuffle sequence, such as by employing a conventional randomizer program, to independently randomly display the individual media items of a selected channel or group each time the channel or group is displayed. When a channel or group with multiple pieces of content is placed in a playlist, then the media player is configured by the player program so that every time the media player comes back to that channel or group in the repeating loop of the arranged order of selected playlists a random piece of content or group from within that channel or group is chosen to be displayed on the electronic display device. The channel or group will play through all its content randomly until all content in the channel or group has been displayed at least once as the player program loop is repeated. Programming of the channel or group in a random mode may be similar, e.g., to the random shuffle programming on an electric music device. When a random shuffle sequence play method is selected, the media items are preferably reshuffled after all media items of the channel or group have been displayed in a repeating loop of the arranged order of selected playlists in the saved player program.

In a further preferred aspect of the invention, at least one selected playlist includes more than one channel of media items and/or group of media items in at least one designated sequential arrangement of selected channels of media items, group of media items or individual media items. By employing multiple channels and/or groups in a playlist, wherein each channel and/or group displays a different media item each time the channel and/or group is displayed, the variety of media items displayed on a display screen can be easily modified to provide a seemingly constantly changing order of presentation of media items, to more effectively engage a viewer. This is particularly evident when the channels and groups are displayed in a random shuffle mode.

In a further embodiment of the invention, the channels, groups and individual media items in a playlist may be scheduled to be active only during designated times. A user may schedule each channel, group or individual media item in a playlist to be active, e.g., for a selected period of time (ex. Jan. 1, 2014-Feb. 14, 2014) on selected days, as well as selected times during a day. The media player will be further configured by the player program such that if not scheduled to be active, a channel, group or an individual media item included in a playlist selected to be included in a saved desired sequential order in the player program will be skipped and not displayed on the electronic display device screen, and rather a media item from the next active channel, group or individual media item in the playlist will be displayed.

While the entire area of a display screen may be employed to display a desired media image, it is often desirable to preferably have several independently operated screen divisions on a display screen, each of which shows different content simultaneously. In accordance with one embodiment of the present invention, a system for managing display of a plurality of media items on an electronic display device is described which includes employing multiple screen divisions by providing a plurality of defined screen division formats stored in an electronic memory, where each defined screen division format is configured to represent either an entire specified screen format of the display device or a portion of the specified screen format, and further providing a plurality of defined screen layouts stored in an electronic memory, each defined screen layout comprising either i) a defined screen division format configured to represent the entire specified screen format or ii) two or more defined screen division formats each configured to represent a portion of the specified screen format and which are spatially combined to form divisions which together represent the entire specified screen format.

Figure 1B:
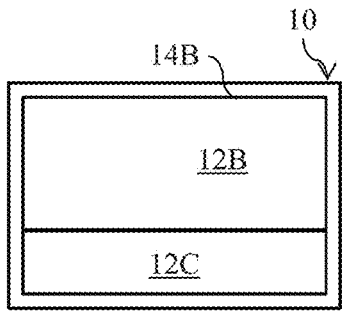

As shown in FIG. 1A, e.g., a digital signage electronic display device 10 is illustrated wherein the entire display area of display device 10 corresponds to a defined screen division format 12A, as well as a defined screen layout 14A. As shown in FIG. 1B, the display area of display device 10 is instead divided into 2 defined screen division formats 12B and 12C, where each separate screen division may display different media content. Defined screen division formats 12B and 12C together in the orientation of FIG. 1B form a defined screen layout 14B. As further shown in FIG. 1C, the display area of digital signage electronic display device 10 may alternatively be divided into defined screen division formats 12B and 12C in the reverse orientation in the form of defined screen layout 14C. FIGS. 1D-1L depict further alternative embodiments in the form of defined screen layouts 14D-14L, made up of various orientations and combinations of defined screen division formats 12D-12I.

Thus, in various embodiments of the invention, the plurality of defined screen layouts may include a defined screen layout comprising a defined screen division format configured to represent the entire specified screen format as shown in FIG. 1A, and a defined screen layout comprising two or more defined screen division formats each configured to represent a portion of the specified screen format and which are spatially combined to form divisions which together represent the entire specified screen format as shown in FIGS. 1B-1L.

In further embodiments of the invention, the plurality of defined screen layouts may include two or more distinct defined screen layouts comprising two or more defined screen division formats each configured to represent a portion of the specified screen format and which are spatially combined to form divisions which together represent the entire specified screen format as shown in FIGS. 1B-1L.

In yet further embodiments of the invention, the plurality of defined screen layouts includes a defined screen layout comprising two or more of a same defined screen division format configured to represent a portion of the specified screen format as shown in FIGS. 1F-1L, and more particularly wherein the plurality of defined screen layouts includes a defined screen layout comprising two or more of a same defined screen division format configured to represent a portion of the specified screen format and which are spatially combined to form divisions which together represent the entire specified screen format as shown in FIGS. 1F, 1H, 1J, and 1L.

The specified screen format may be selected from any conventional screen format. In a preferred embodiment, e.g., the specified screen format may be a HDTV screen format, and more particularly a "2K" (i.e., 1920×1080 pixel) screen format, as electronic display screens in such format provide high definition displays and are readily available. As even higher resolution display screens have started to become more available (e.g., "4K" screens, "8K" screens), the present invention is equally applicable to such higher resolution screens, as well as applicable to lower resolution screens (e.g., "720p" screens).

In a preferred embodiment, the invention may be practiced by employing a plurality of media items stored in an electronic memory, each stored in one of a plurality of defined screen division formats corresponding to either the entire specified screen format or a portion of the specified screen format, and a plurality of defined screen layouts each comprising either i) a defined screen division format configured to represent the entire specified screen format or ii) two or more defined screen division formats each configured to represent a portion of the specified screen format and which are spatially combined to form divisions which together represent the entire specified screen format.

Figure 1C:
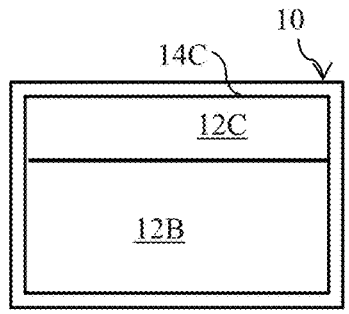
Figure 1D:
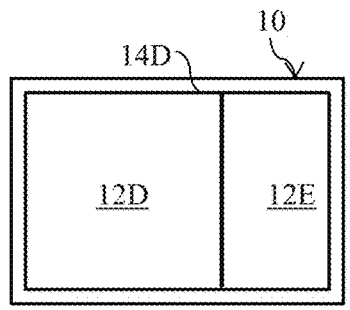
Figure 1E:
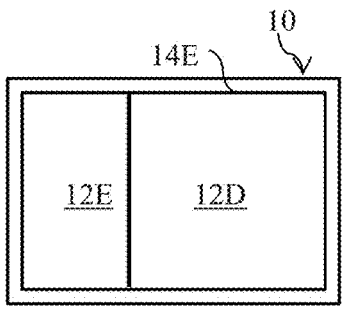
Figure 1F:
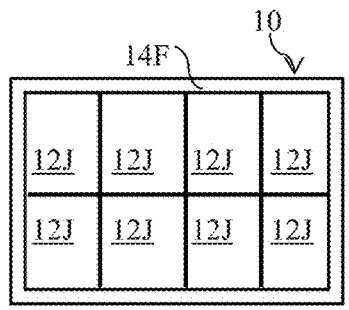
Figure 1G:
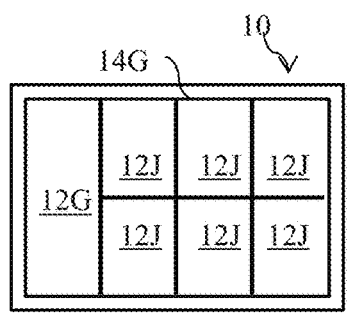
Figure 1H:
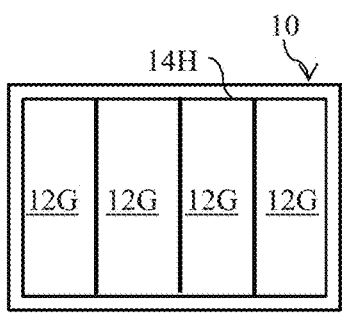
Figure 1I:
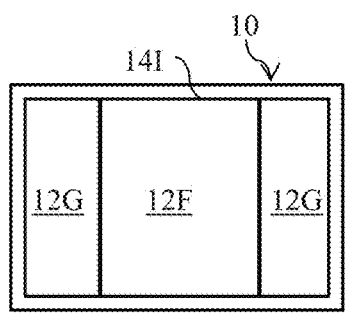
Figure 1J:
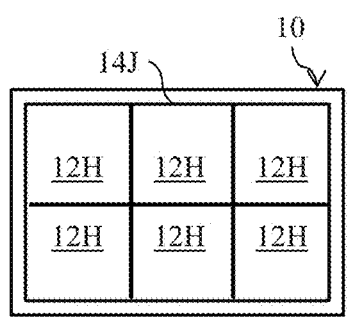
Figure 1K:
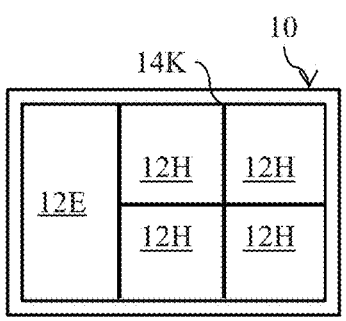
Figure 1L:
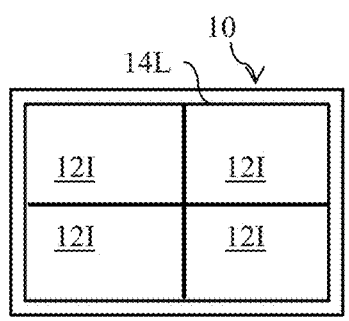

For example, where the specified screen format is 1920×1080 pixels, defined screen division format 12A, as well as a defined screen layout 14A, as shown in FIG. 1A may be of the corresponding 1920×1080 pixel format. Screen division formats 12B and 12C, as shown in FIGS. 1B and 1C, may represent 1920×720 and 1920×360 pixel formats, respectively, which together make up the entire screen 1920×1080 pixel format. Similarly, as illustrated in FIGS. 1D and 1E, screen division formats 12D and 12E may represent 1280×1080 and 640×1080 pixel formats, respectively. In FIGS. 1F-1L, screen division formats 12F may represent a 960×1080 pixel format, 12G may represent a 480×1080 pixel format, 12H may represent a 640×540 pixel format, 12I may represent a 960×540 pixel format, and 12J may represent a 480×540 pixel format. The defined screen division formats and screen layout arrangements of FIGS. 1A-1L are just by way of example, and different numbers or orientations of screen division formats may be defined and used to display desired available content in additional defined screen layouts. In any defined screen division, the content displayed may include still or moving images, or other media content of interest.

Figure 2:
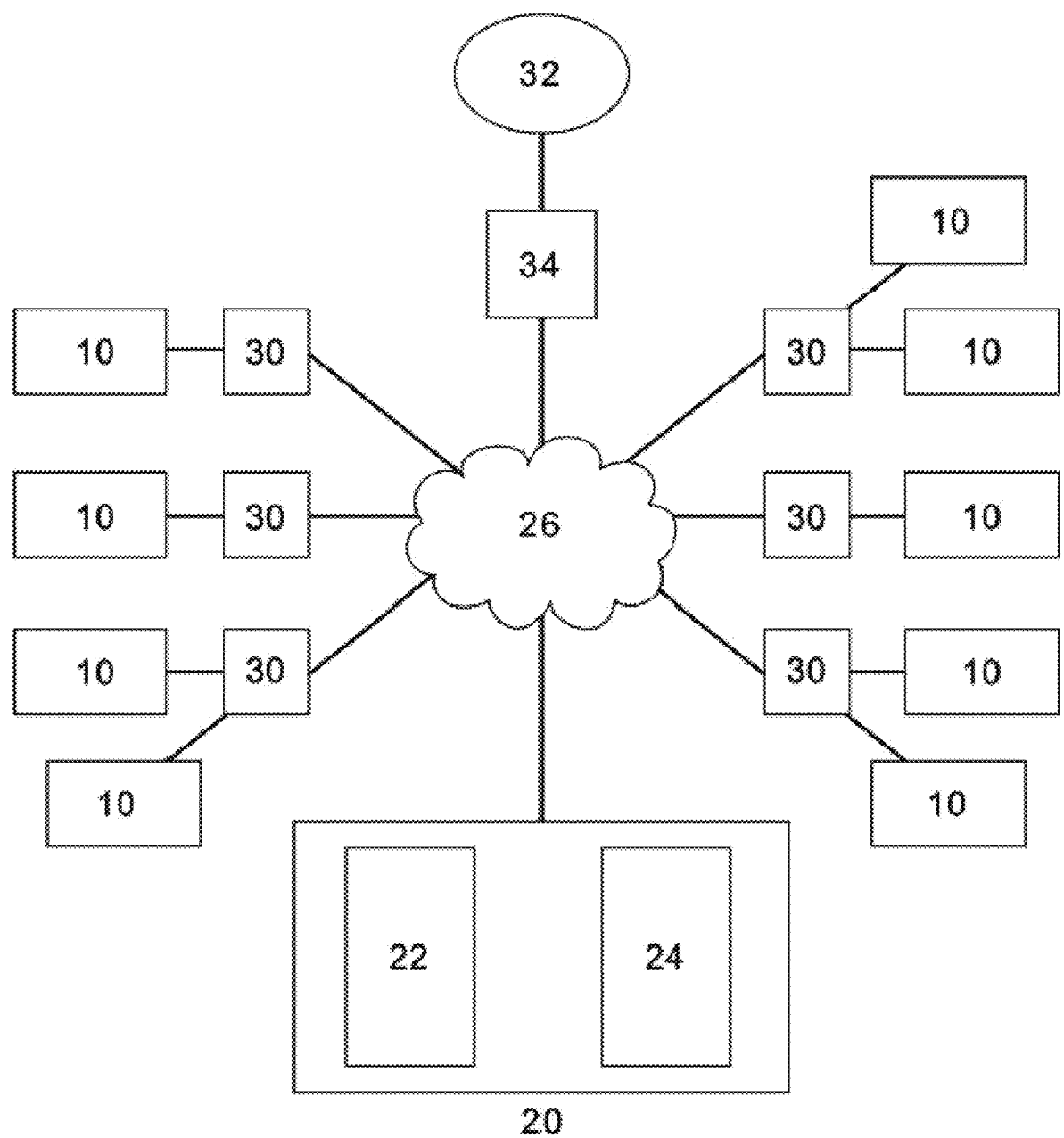
FIG. 2 is a schematic view of a digital signage network including display devices, stored media items, and a player program creator that may be used in an embodiment of the present invention.

Further in accordance with the invention, a plurality of media items and channels or groups of media items are stored in an electronic memory, each preferably stored in one of the plurality of defined screen division formats, and a player program creator is provided configured to create and store player program instructions in an electronic memory for controlling a media player to display media items, on an electronic display device screen of a specified screen format, selected from the plurality of media items, groups of media items and channels of media items in accordance with a selected one or more of the defined screen layouts displayed in a selected sequence. As illustrated in FIG. 2, such a player program creator 22 may reside, e.g., on a centrally located server 20, which is connected by a network (such as the internet 26) to local media players 30 provided at remote locations with display screens 10. Display screens 10 may be any conventional electronic display device screen of a specified screen format, but more preferably is a high definition display screen, such as a HDTV of, e.g., 1920×1080 pixel screen format. Media players 30 may be, e.g., an appropriately programmed general purpose computer with the appropriate processor, graphics card, RAM, hard drive space, and imaged software, or a commercial dedicated digital media player, with the same specification listed above. Media players 30 are further configured by a player program created in accordance with the invention as described herein. Media items stored in the defined screen division formats and playlists and player programs created with the player program creator may be stored, e.g., in a central electronic content database memory 24 depicted in FIG. 2. Further in accordance with various embodiments of the invention, when using the player program creator media items to be displayed in each defined screen division format of each selected defined screen layout are preferably only selectable from media items, groups of media items, and channels of media items stored in the corresponding screen division format. By storing the media items in the defined screen division formats, and limiting selection of available media items in the playlist creator to those stored in the corresponding defined screen division format, the media items do not need to be transcoded at the time of playout, so as to advantageously minimize the media player processing requirements and optimize performance of the system.

As further depicted in FIG. 2, the display 10 may be one of a plurality of displays of a digital signage network. Each of the displays of the network receives an input from a local media player 30 that may be, for example, a computer with appropriate memory and programming as described above. Such a media player 30 may also be used to drive multiple displays. The general concept of using a computer to drive a display screen is well known in the art. Each of the local media players 30 are linked to centrally located server 20 of the digital signage network through, e.g., internet connections 26. Users 32 may connect to the centrally located server over the web through, e.g., a local computer 34 and internet 26 connections to employ player program creator 22 located thereon. The electronic library of media items stored in central electronic content database 24 may be formed, e.g., by uploading images from a local computer 34. Once a player program is created, it may be stored on the centrally located server 20, and accessed through a local computer 34, and a copy stored on memory in media player 30. In case of internet 26 connection failure, media player 30 will be able to continue to run through content saved in the copy stored in memory thereon, however, updates are unable to be downloaded into the media player 30 and viewed on display screen 10. Once Internet 26 connection is resumed media player 30 will then download updated content programmed and saved on central server 20 to be viewed on display screen 10.

While depicted as local media players 30 at remote locations in FIG. 2, the components of media player 30 may alternatively be located on a central server and communicate with the local screens to be driven through a thin client device connected to the display screen and connected to the media player through an internet or other network connection.

In a particular embodiment, media items stored in the electronic memory in defined screen division formats may be made available to multiple system users for display in corresponding defined screen divisions of selected screen layouts in multiple user electronic display device screen systems. Appropriate access levels may be provided to various users to restrict access to various content libraries for various individual users. Access to individual users may be permitted or denied, e.g., per individual user location for each individual content library, group, channel or playlist.

In a digital signage system, each media item to be displayed may be displayed in a selected screen division for a selected length of time, and multiple selected images displayed in series in a display loop. While a large number of images may be included in a loop in each screen division in order to provide a first level of image sequence variety to a viewer, it has been difficult to easily change such order after it is established in most systems.

The present invention provides a system wherein channels of media items, groups of media items, and individual media items stored in the same defined screen division format may be selected to be displayed in series of each corresponding specified screen division format of a selected defined screen layout comprising multiple screen divisions. Multiple channels of media content, and multiple groups of media content may be established and stored in an electronic memory so as to be available for selection to be included in a playlist to be displayed in a similarly defined screen division format. Thus, a wide variety of media content may be displayed in a selected screen division format simply by selection of desired stored channels or groups of related media content. As a further degree of variation, the media items of the same defined screen division format stored in a channel or a group may be selected to be displayed in a random sequence, such as by employing a conventional randomizer program to independently randomly display the related media content images of a selected channel or group in each screen division. One or more stored channels of media items, groups of media items, and individual media items saved in the electronic memory may be selected to be played in designated sequential arrangement in a selected screen division of a selected screen layout in a playlist for sequential display of a media item from each selected channel, group and selected individual media items, easily changing the type of media to be displayed.

Further, multiple playlists may be created and stored in an electronic memory each employing different defined screen layouts, and such multiple playlists may be selected and arranged in a desired sequential order in a player program to control a media player driving an electronic display device screen to display media items corresponding to the arranged order of selected playlists and selection and sequential arrangement of formed channels of media items, groups of media items, and individual media items in each selected playlist, whereby the media item displayed on the electronic display device screen for a channel or group is changed, relative to the previous displayed media item for the channel or group, each time the channel or group is displayed in the designated sequential arrangement of a playlist, thereby further increasing the diversity of presented image formats perceived by a viewer. Each playlist in the player program may be independently scheduled to be active only during designated times. A user may schedule each playlist to be active, e.g., for a selected period of time (ex. Jan. 1, 2014-Feb. 14, 2014) on selected days, as well as selected times during a day. The media player will be further configured by the player program such that if a playlist is not scheduled to be active, the next playlist in the player program in the sequential order that is scheduled to be active will be played. The present invention thus enables a very dynamic presentation of media and messages, increasing viewer enticement and engagement.

Various types of media may advantageously be saved in various content channels and groups in defined screen division formats and made available to system users, thereby broadening the variety of information available for display to display screen viewers (e.g., customers of system users). In addition to media items for display of media content created which is specific to a system user's business (for example, product specific media for that user's products), general channels of media content and groups of media content may be created and easily accessed by system users to provide additional educational and entertaining display media content. E.g., trivia or other themed content may be created and stored in defined screen division formats for easy selection and display by a system user.

Figure 3:
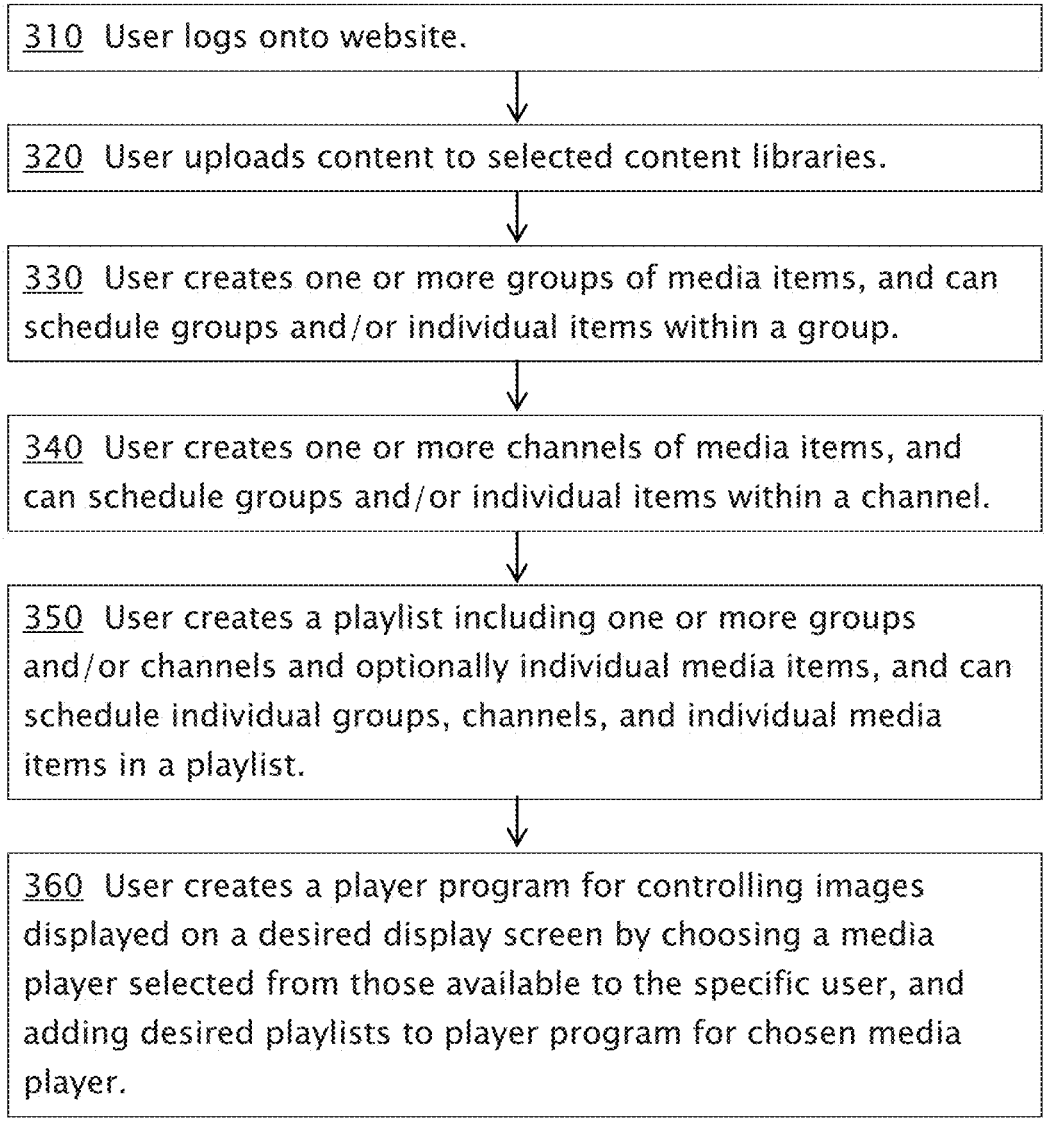
FIG. 3 is a flow diagram demonstrating a computer implemented, web based method for the process of creating and scheduling playout of playlists on a system in accordance with an embodiment of the invention.

In further embodiment of the invention, all individual media items within groups and within channels may be scheduled to be active only during designated times. A user may schedule each group or individual media item in a channel to be active, e.g., for a selected period of time (e.g., Jan. 1, 2014-Feb. 14, 2014) on selected days, as well as selected times during a day. If not scheduled to be active, a group or an individual media item included in a channel selected to be included in a saved desired sequential order in the player program will be skipped and not displayed on the electronic display device screen, and rather a media item from the next active group or individual media item in the channel will be displayed. FIG. 3 shows a flow diagram of a process of creating and scheduling playout of one or more playlists including one or more channels of media items, one or more groups of media items and individual media items on a system in accordance with an embodiment of the invention. In a preferred embodiment, the invention may be implemented in the form of a web-based program with appropriate graphical user interface (GUI) screens, and FIGS. 4-9 depict representative GUI screens that may be employed.

Figure 4A:
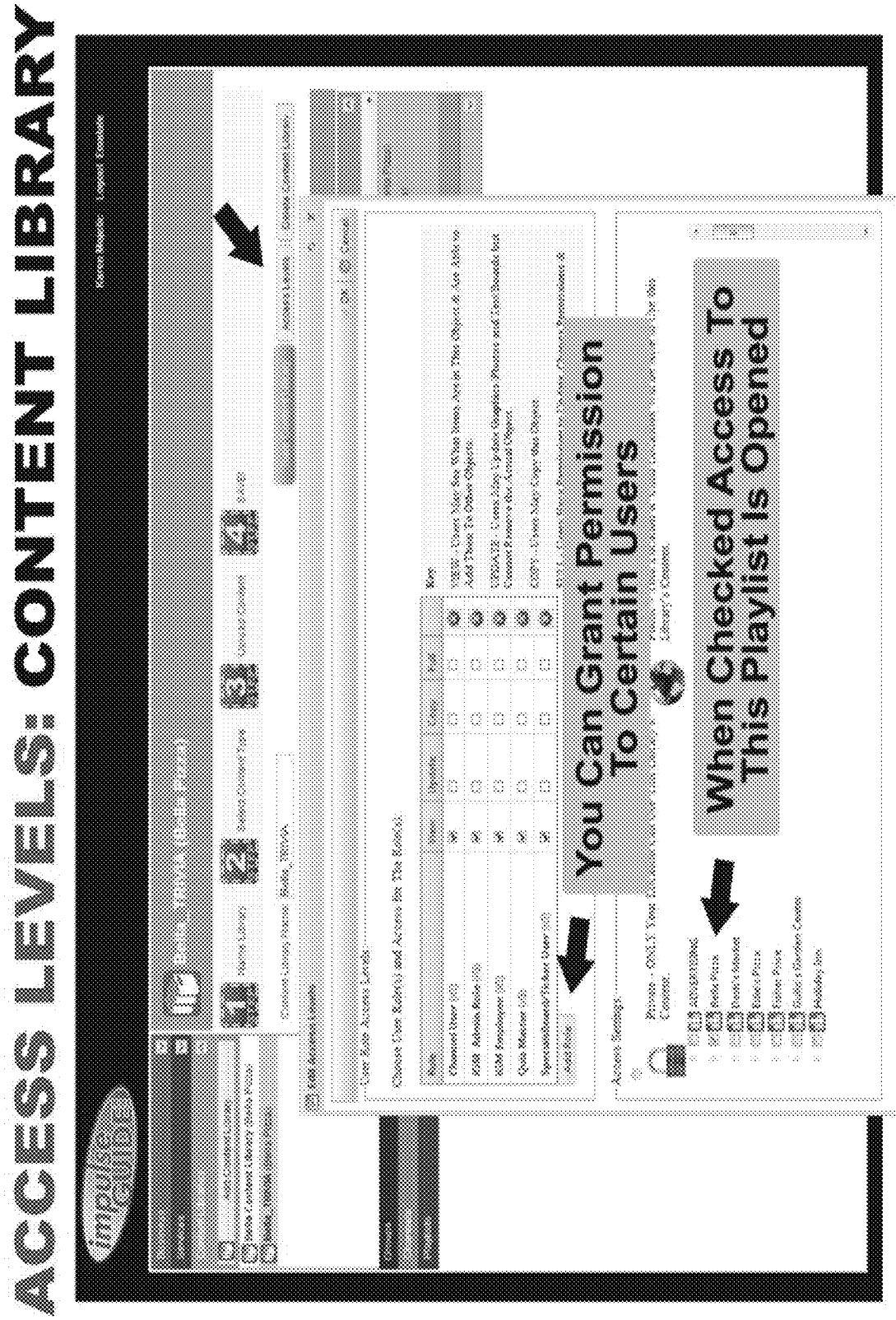
Figure 4B:
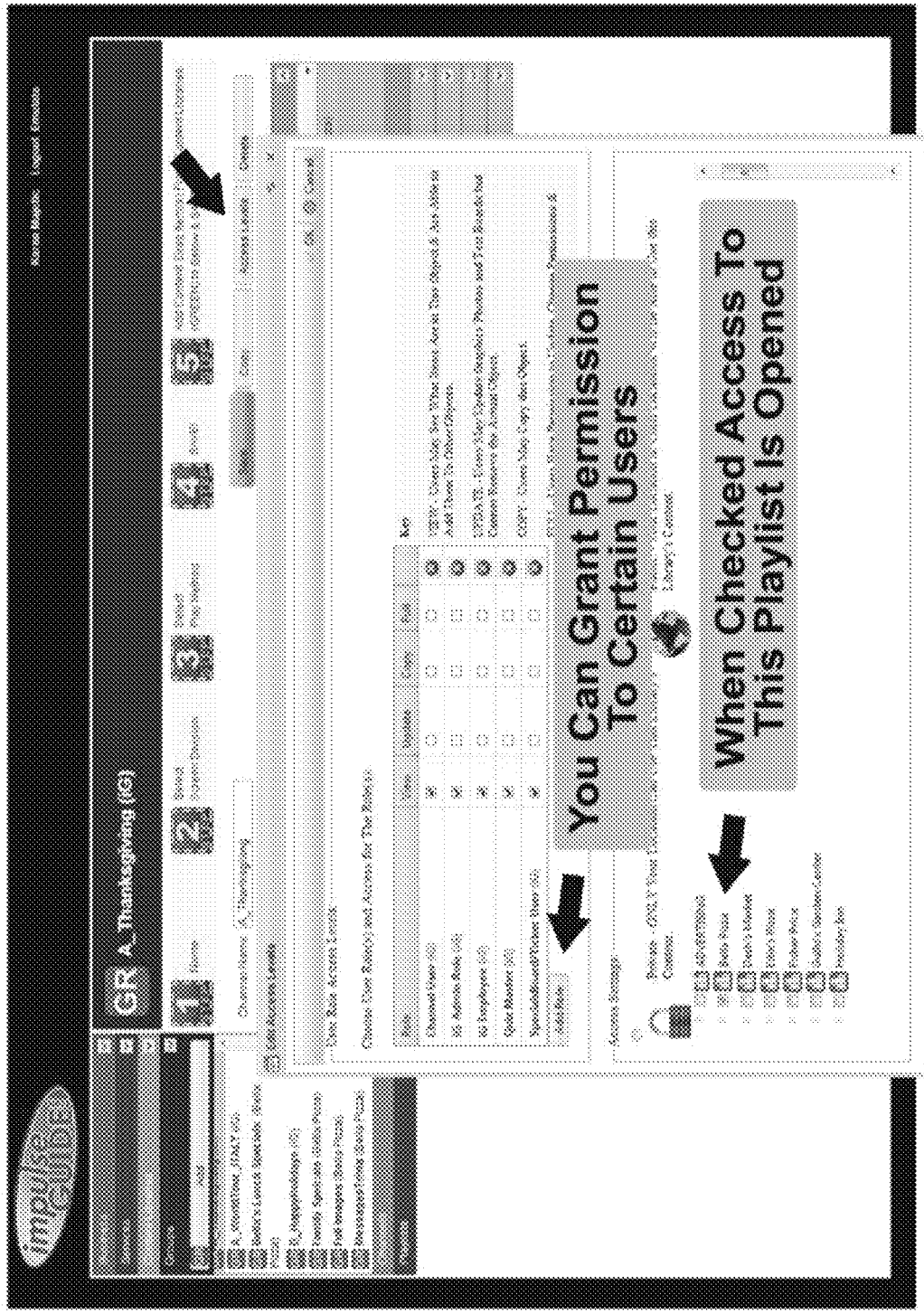
Figure 4C:
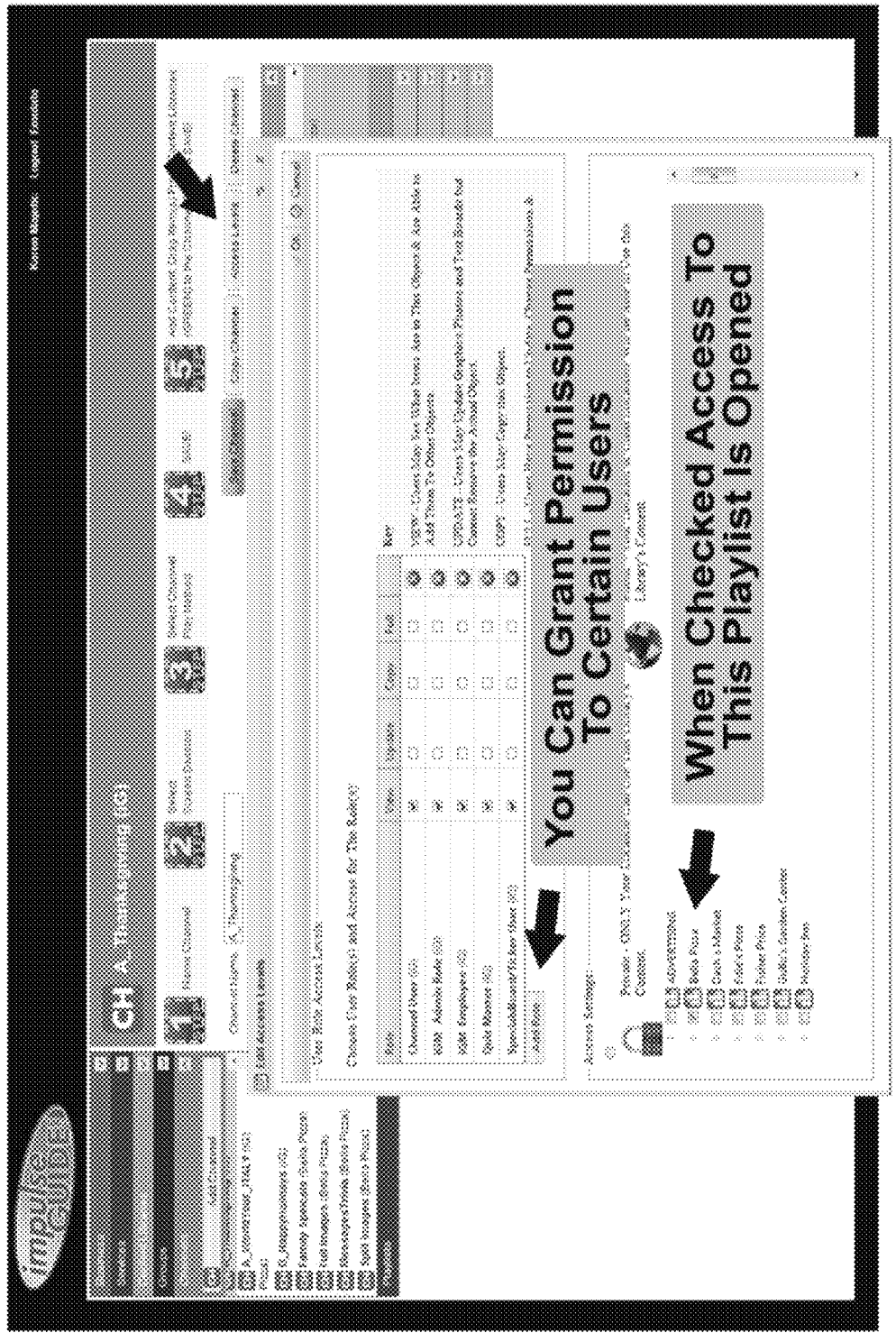
Figure 4D:
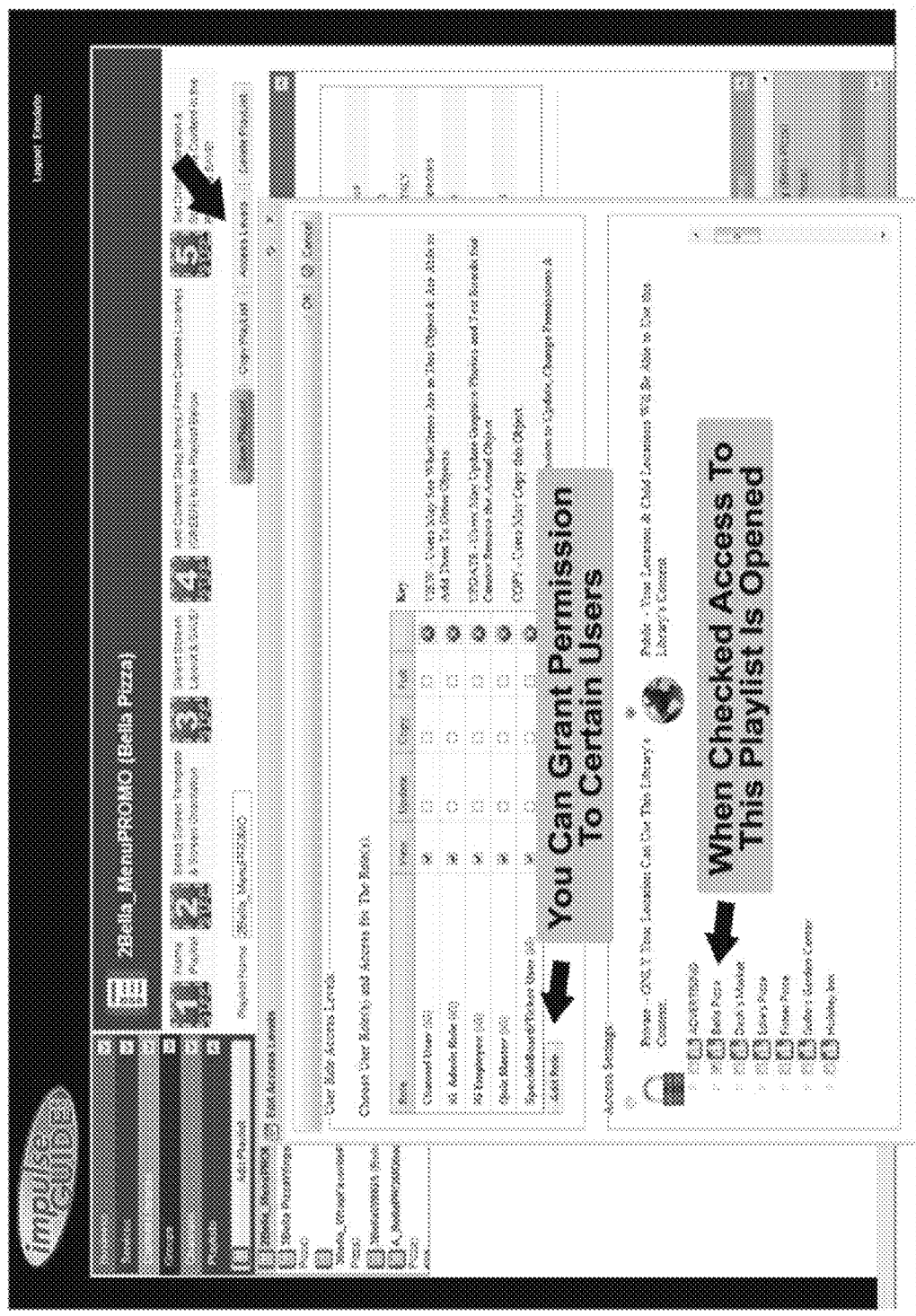

In step 310, a user logs onto a website provided with various content libraries containing various individual media items, groups of media items and channels of media items, such as illustrated in the left-hand panel of a web-based GUI as illustrated in FIG. 4A. As further shown in FIG. 4A, various levels of system access to selected content libraries may be granted to various types of users through such a web-based GUI as desired by a system provider through a pop-up screen configured to edit access levels.

In step 320, a user may upload content to a selected content library, such as may be saved on a central server 20 as depicted in FIG. 2. Content libraries may be, e.g., client and or topic specific. FIG. 5 depicts a representative GUI screen that may be employed for such step. As shown therein, e.g., content may be searched for in and selected from content in various categories of electronic media (e.g., Graphics/Photos, Video/Animation, Text Boards, Text Tickers, Trivia, Weather, RSS feeds, etc. as listed in the panel second from the left), and uploaded to a selected or newly created and named Content Library.

Figure 6A:
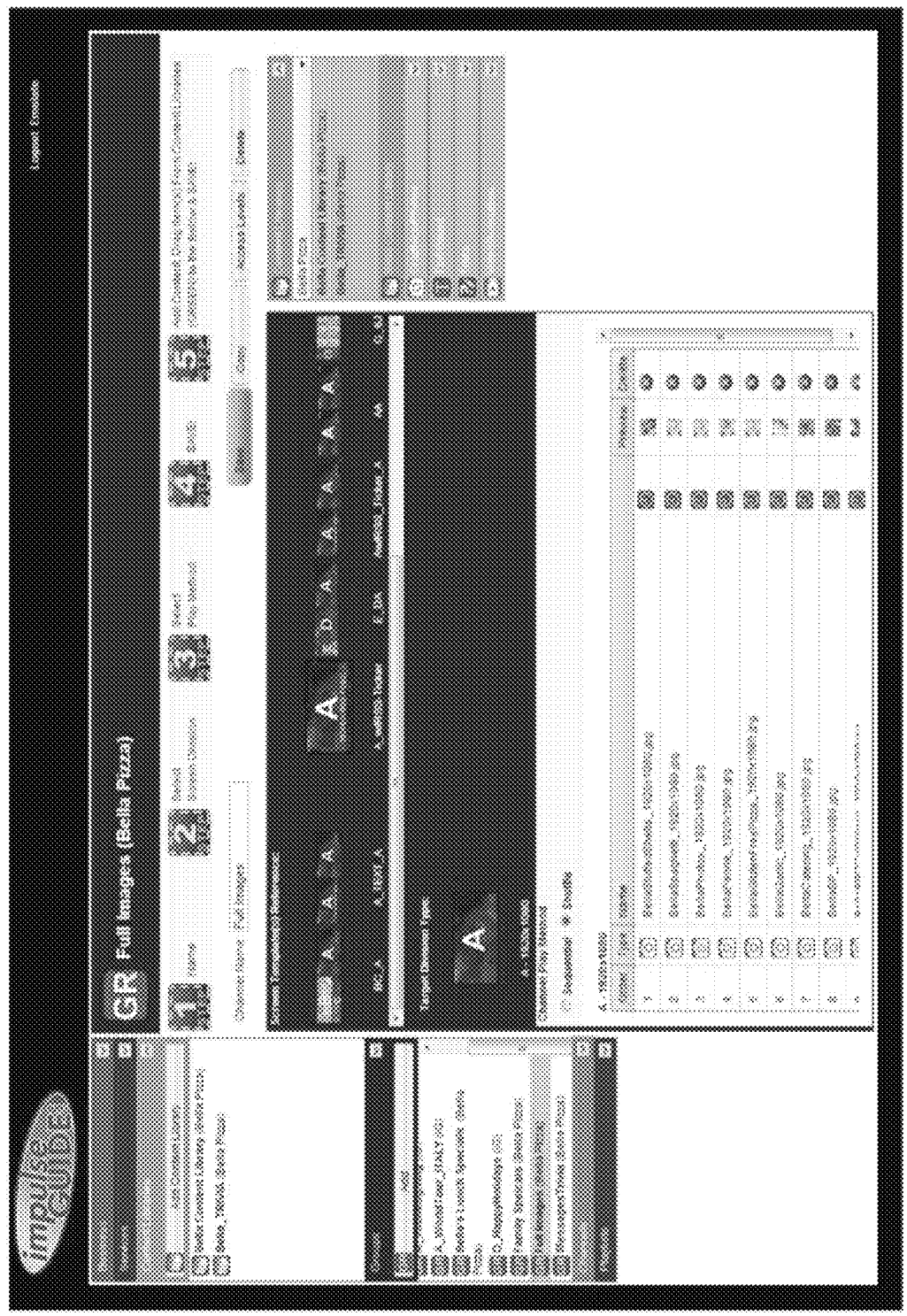
FIGS. 6A-6C depict representative GUI screens for creating a group and scheduling group content that may be employed in various embodiments of the invention.
Figure 6B:
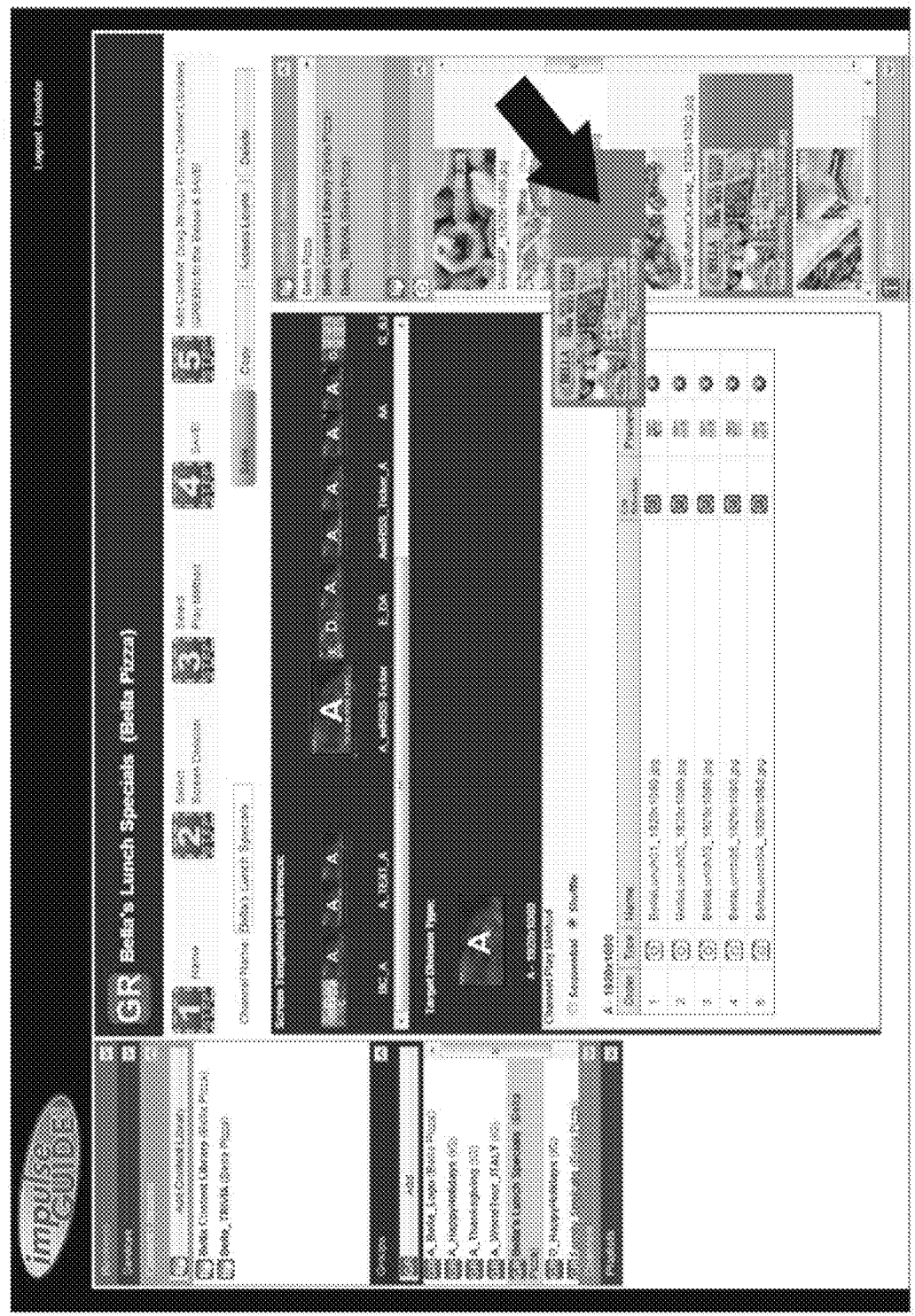
Figure 6C:
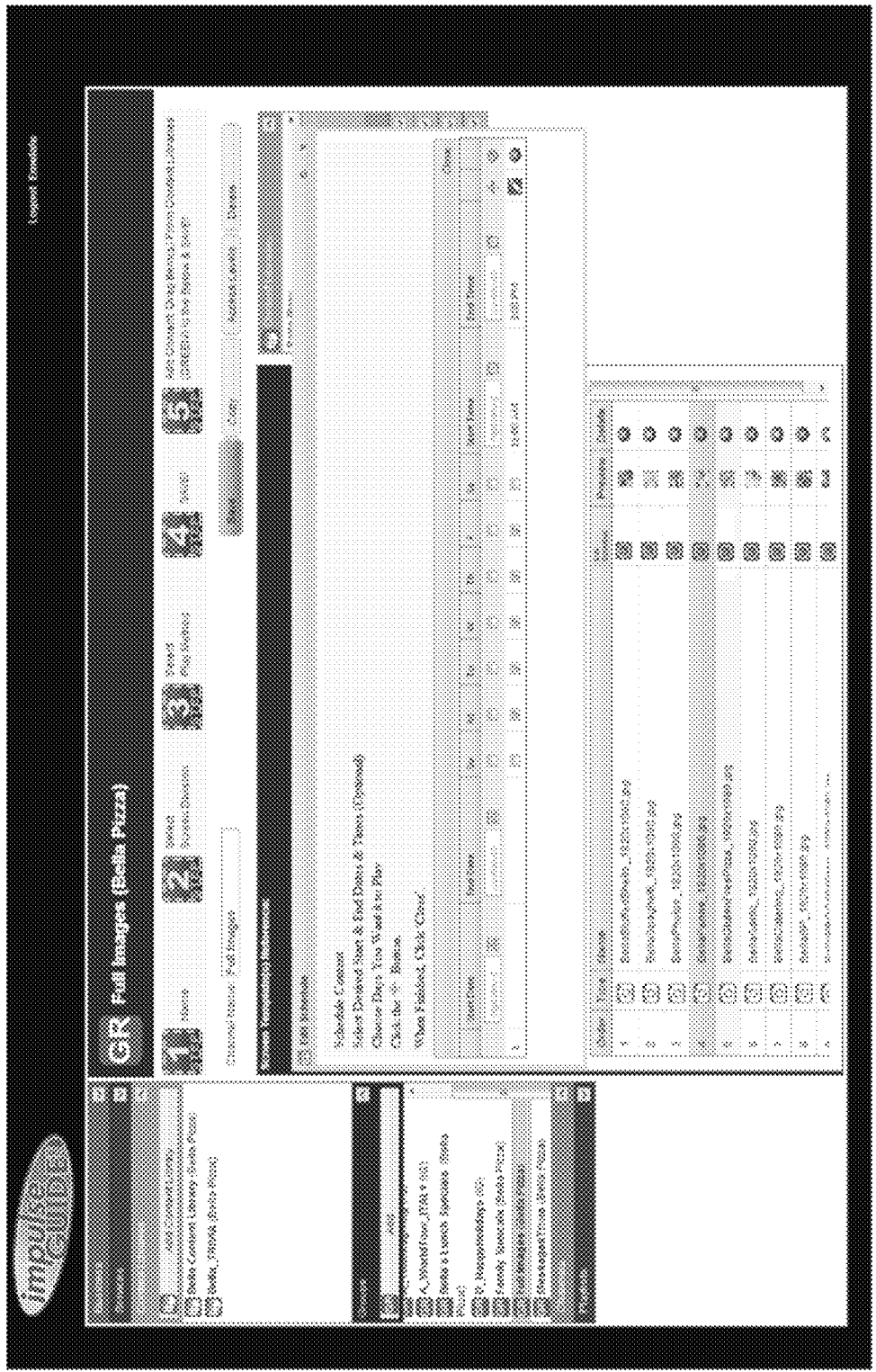

In step 330, a user may create a group, and can schedule individual items within a group. As shown in FIG. 6A, a user may create a group by naming the group, selecting a desired screen division format for the group, selecting a group play method (e.g., sequential or shuffle), adding content selected from a content library into the group, and saving the group. As shown in FIG. 6B, a user may add content by selecting desired media items from Content Libraries displayed in the right-hand panel, and dragging the selected content into a Group being created or edited. As shown in FIG. 6C, a user may schedule each group to be active in a playlist or a channel, e.g., for a selected period of time, and/or on selected days, and/or as well as selected times during a day. In a further specific embodiment, a user may schedule individual items in a group to only be active during selected scheduled time periods. Once a group is created, a user may modify the contents thereof by, e.g., adding, deleting or rearranging media items or changing the selected play method. As further shown in FIG. 4B, various levels of system access to selected Group content libraries may also be granted to various types of users by a system provider through a pop-up screen configured to edit access levels.

Figure 7A:
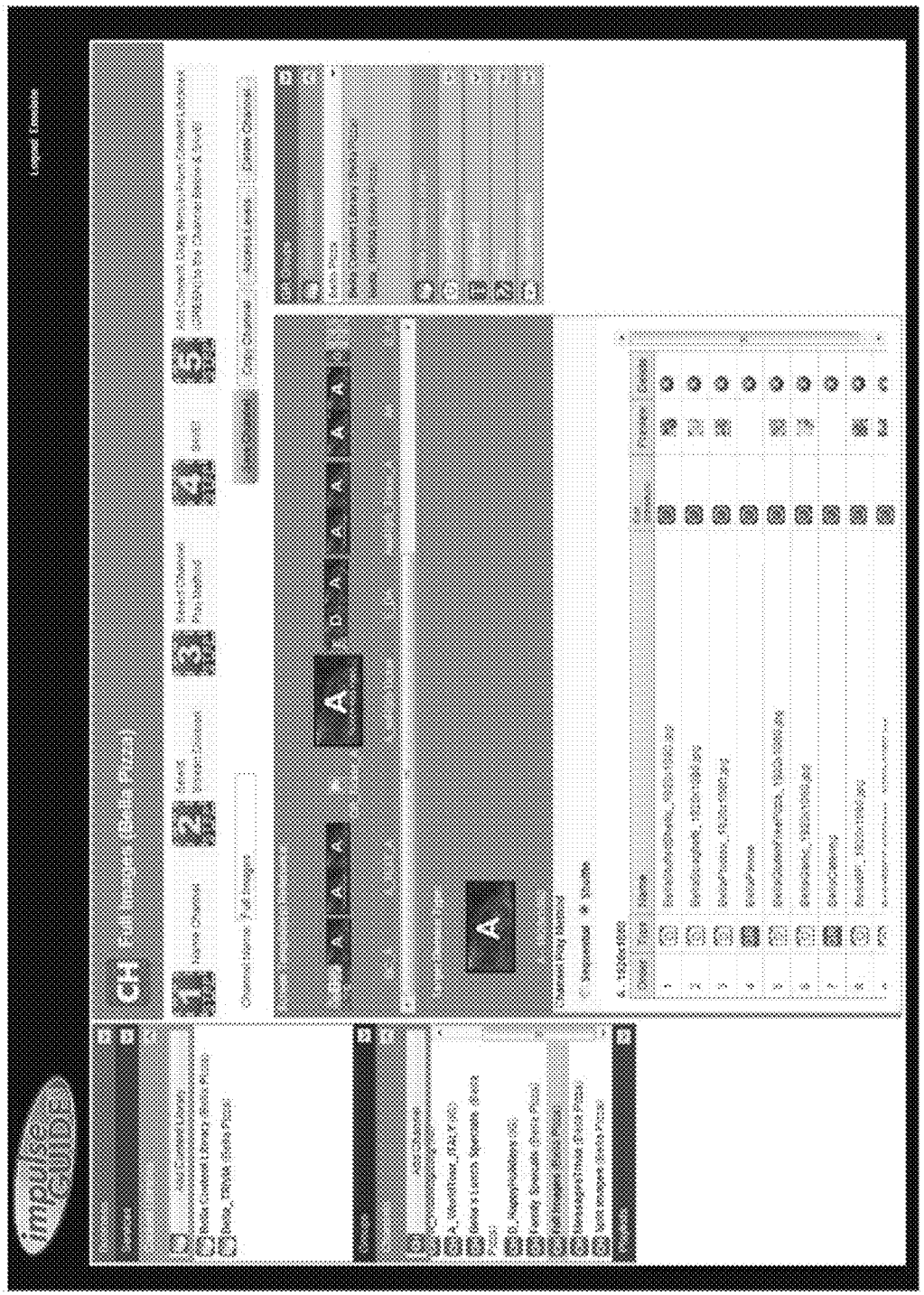
Figure 7B:
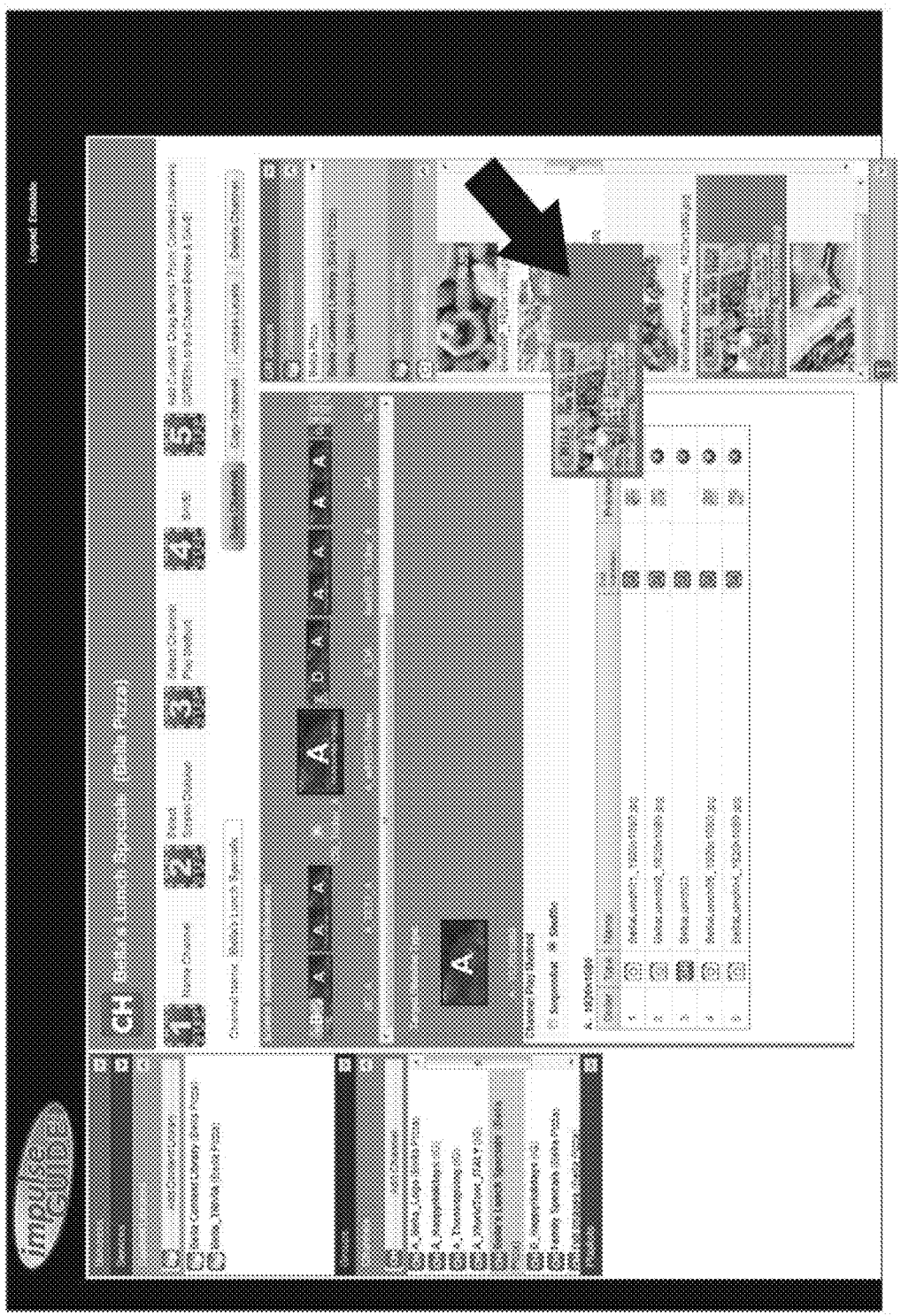
Figure 7C:
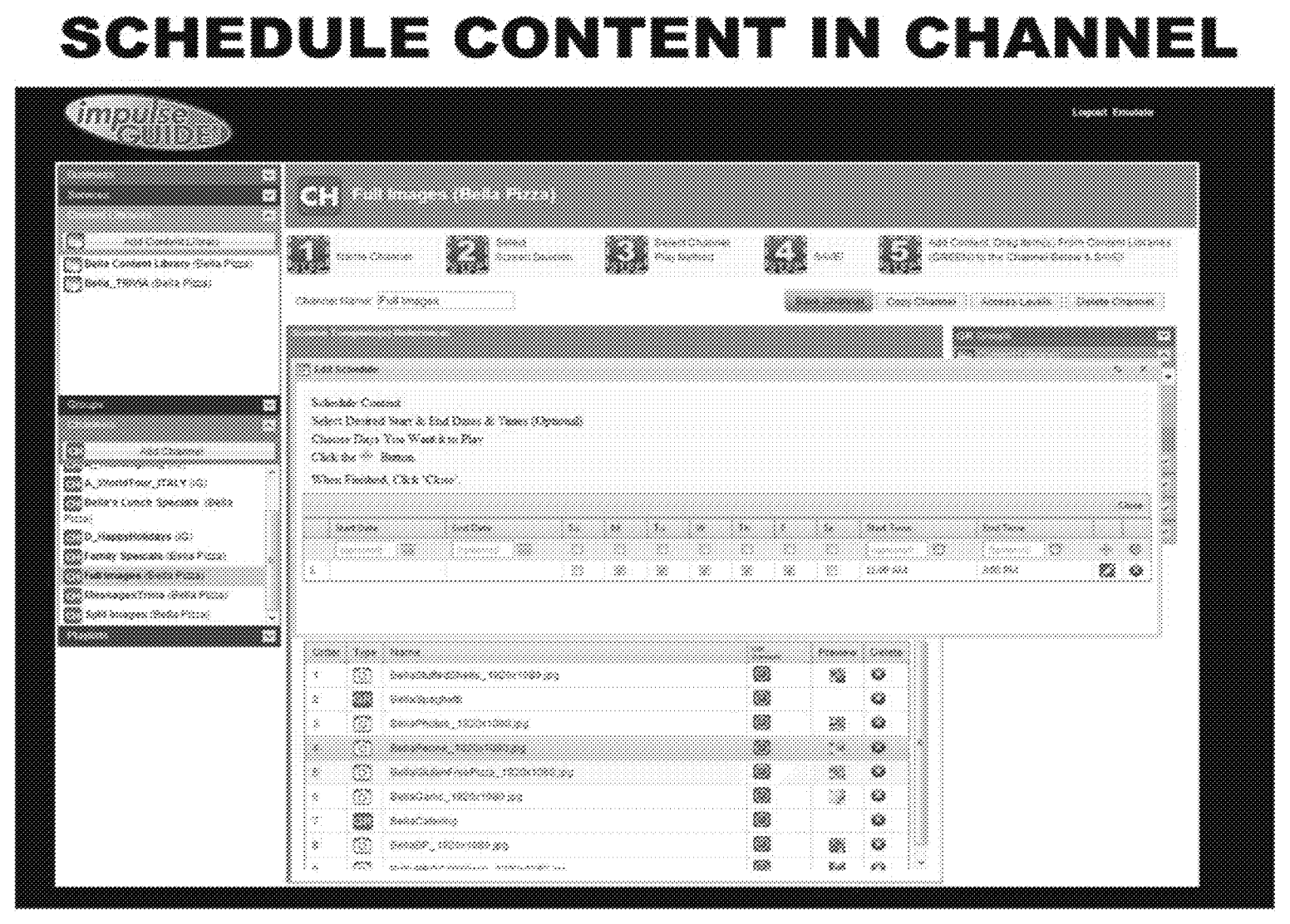

In step 340, a user may create a channel, and can schedule individual items within a channel. As shown in FIG. 7A, a user may create a channel by naming the channel, selecting a desired screen division format for the channel, selecting a channel play method (e.g., sequential or shuffle), adding content selected from a content library into the channel, and saving the channel. As shown in FIG. 7B, a user may add content by selecting desired media items from Content Libraries displayed in the right-hand panel, and dragging the selected content into a Channel being created or edited. As shown in FIG. 7C, a user may schedule each channel to be active in a playlist, e.g., for a selected period of time, and/or on selected days, and/or as well as selected times during a day. In a further specific embodiment, a user may schedule individual items, and groups in a channel to only be active during selected scheduled time periods. Once a channel is created, a user may modify the contents thereof by, e.g., adding, deleting or rearranging media items or changing the selected play method. As further shown in FIG. 4C, various levels of system access to selected Channel content libraries may also be granted to various types of users by a system provider through a pop-up screen configured to edit access levels.

Figure 4E:
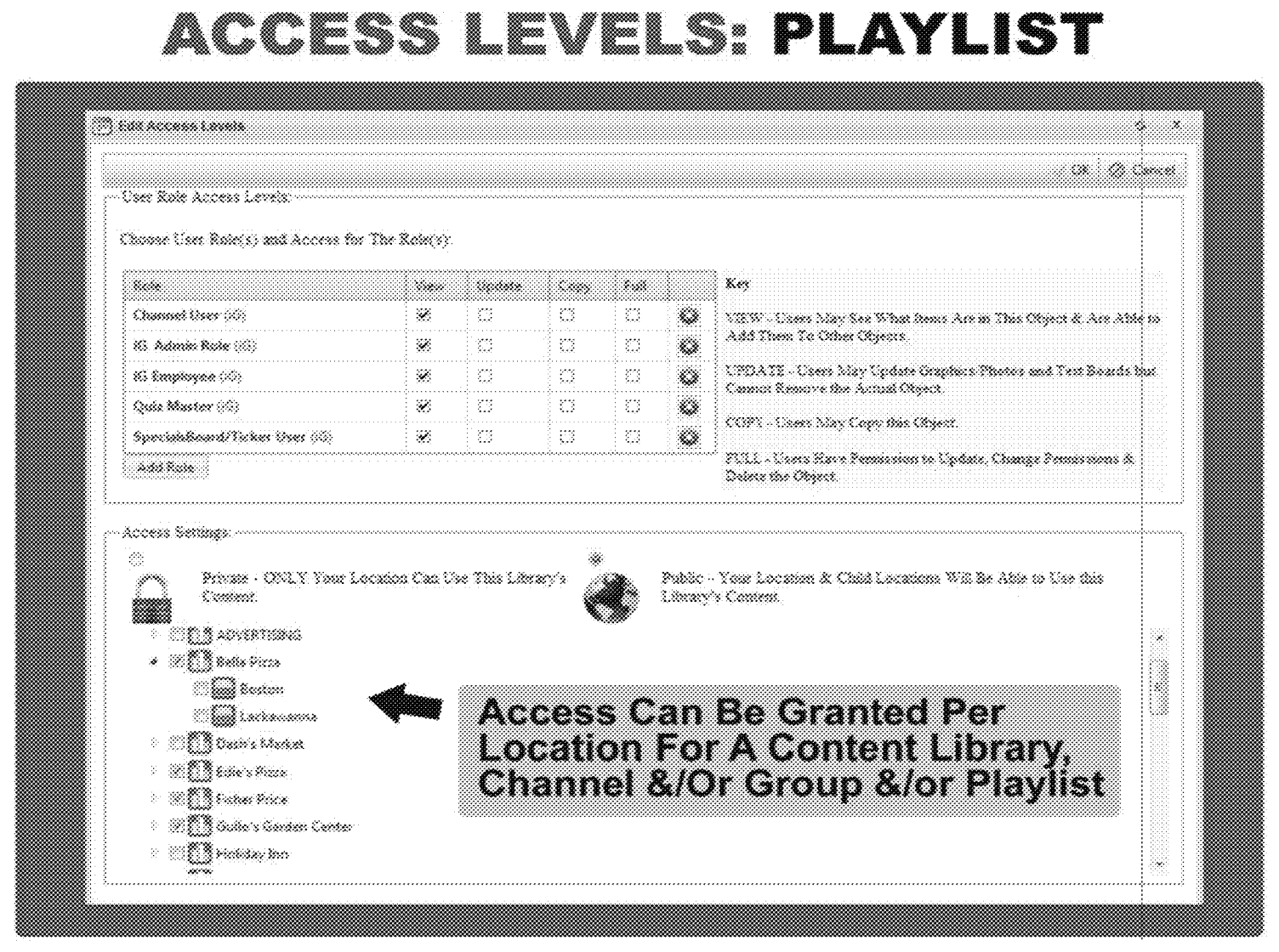
Figure 8A:
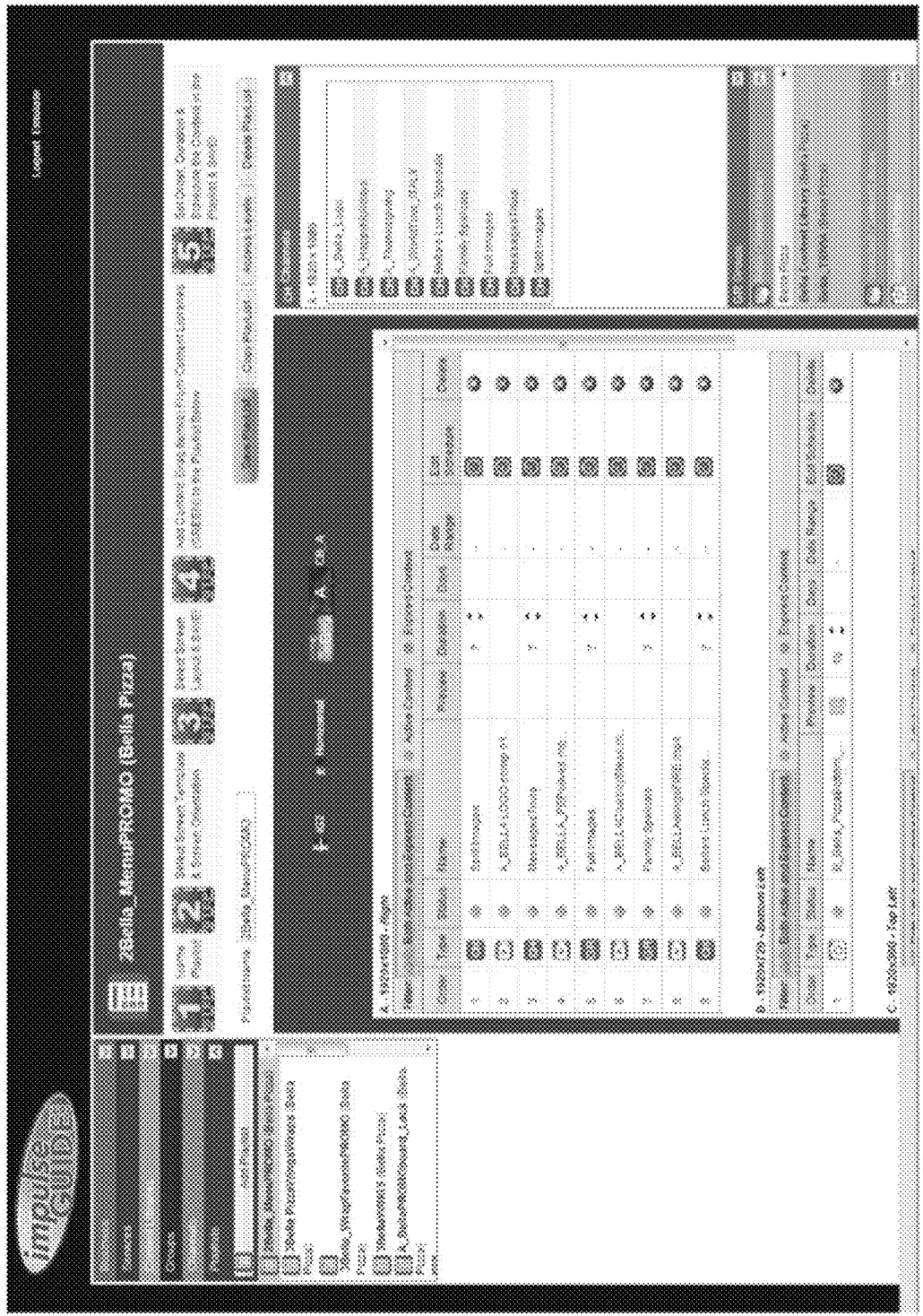
FIGS. 8A-8B depict representative GUI screens for creating and scheduling items in a playlist that may be employed in various embodiments of the invention.
Figure 8B:
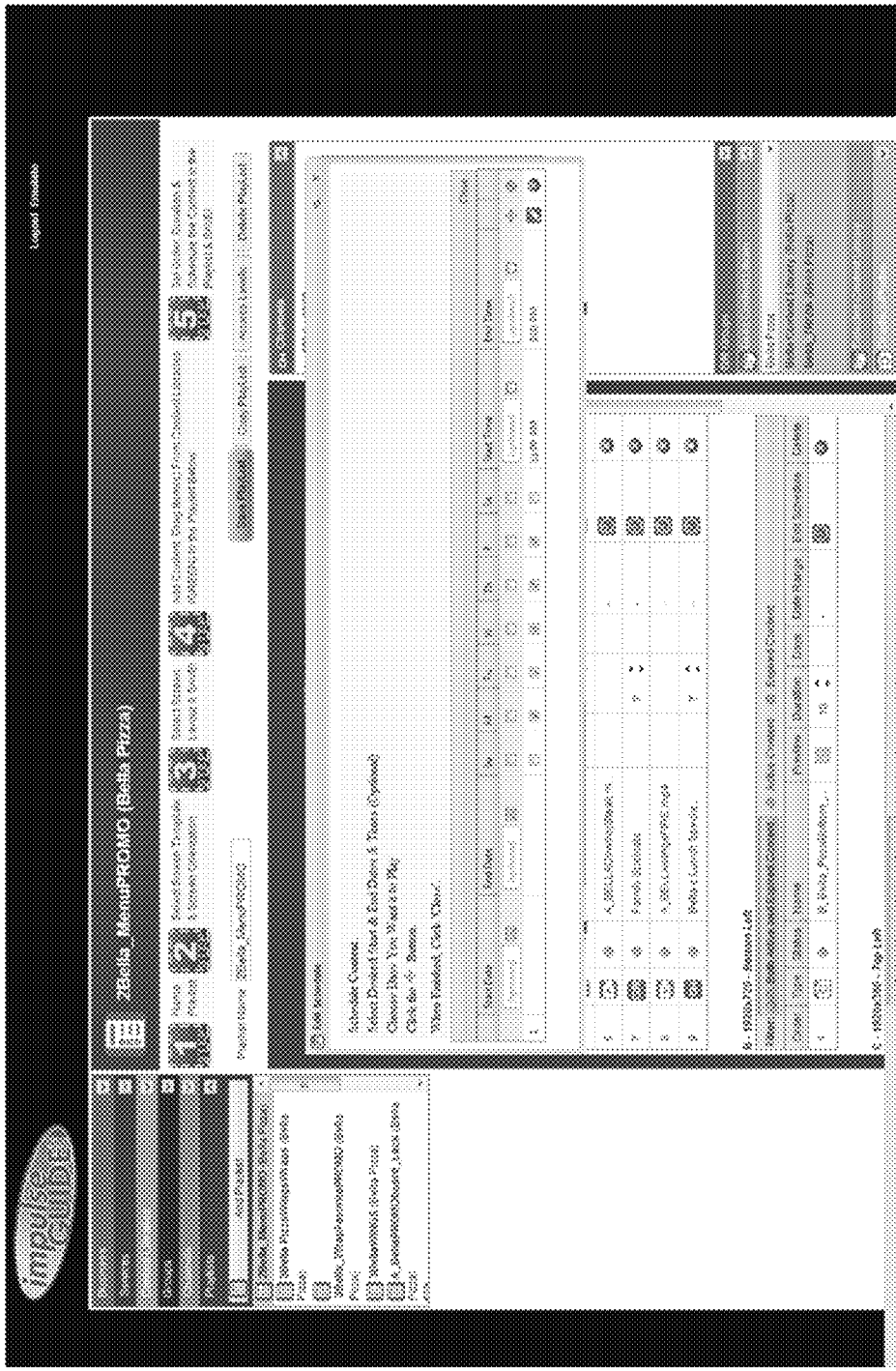

In step 350, a user may create a playlist, and can schedule individual items within a playlist. As shown in FIG. 8A, a user may create a playlist by naming the playlist, selecting a specified screen format (e.g., including screen size and orientation), selecting a screen layout, adding content to the playlist in the form of channels of media items, groups of media items and individual media items selected from the content libraries (e.g., by selecting desired media items from Content Libraries displayed in the right-hand panel, and dragging the selected content into a playlist being created or edited), setting the order and scheduling the active time for the content in the playlist, and saving the created playlist. As shown in FIG. 8B, a user may schedule each item in the playlist by accessing an Edit Schedule pop-up screen for each item. Playlists for presentation of varying media content presented in defined screen divisions of defined screen layouts on an electronic display of a specified screen format in accordance with the invention may thus be conveniently scheduled to playout the included channels of media items, groups of media items, and individual media items at preselected times in accordance with conventional scheduling programs. Further as described above, the channels, groups and individual media items in a playlist may be scheduled to be active only during designated times. A user may schedule each channel, group or individual media item to be active, e.g., for a selected period of time, and/or on selected days, and/or as well as selected times during a day. Once created, a user may select and modify the contents of a saved playlist. As further shown in FIG. 4D, various levels of system access to saved playlists may also be granted to various types of users by a system provider through a pop-up screen configured to edit access levels. As shown in FIG. 4E, access to individual users may further be permitted or denied, e.g., per individual user location for each individual content library, group, channel or playlist.

Figure 9A:
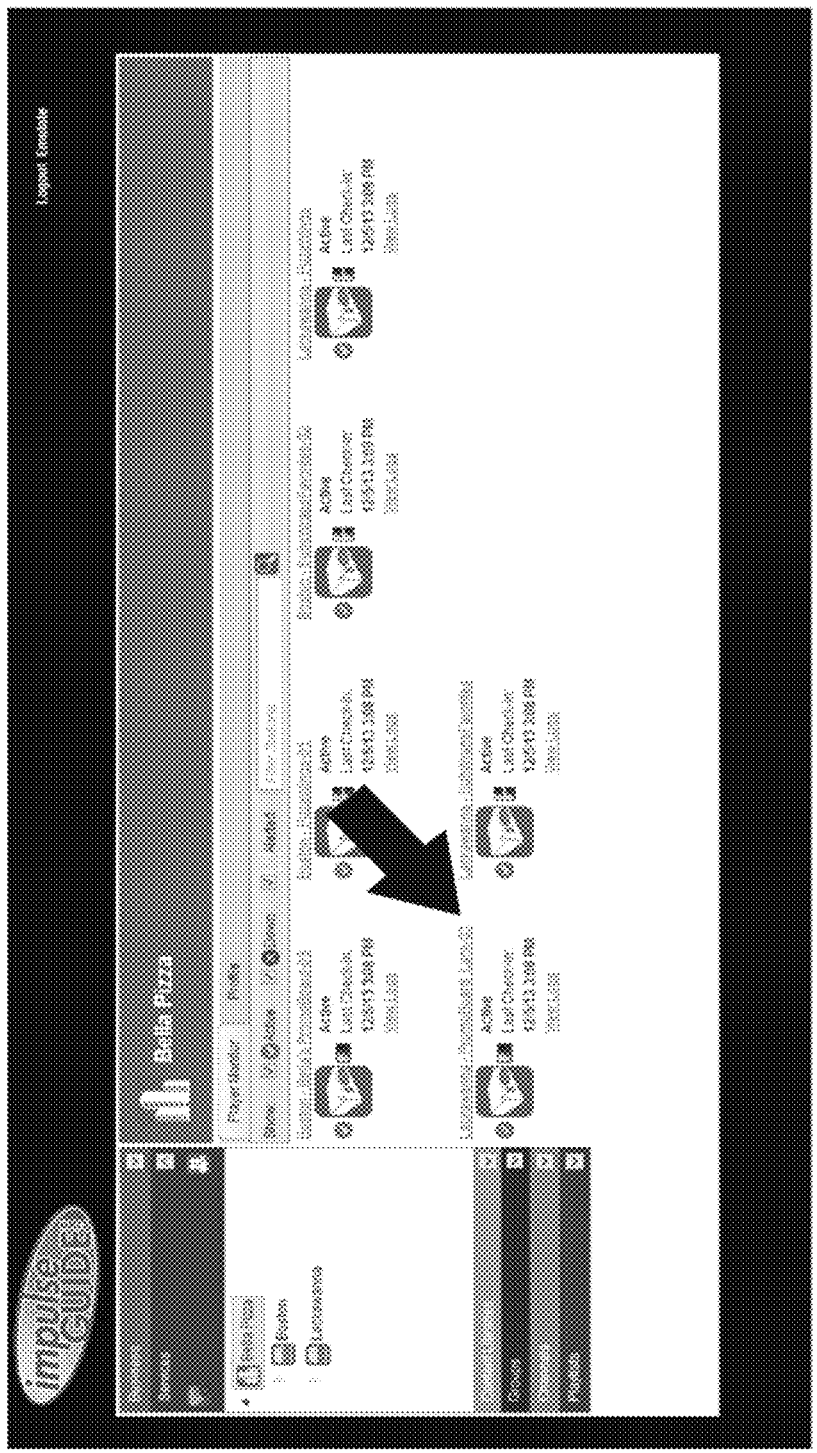
FIGS. 9A-9B depict representative GUI screens for creating a player program for a selected media player that may be employed in various embodiments of the invention.
Figure 9B:
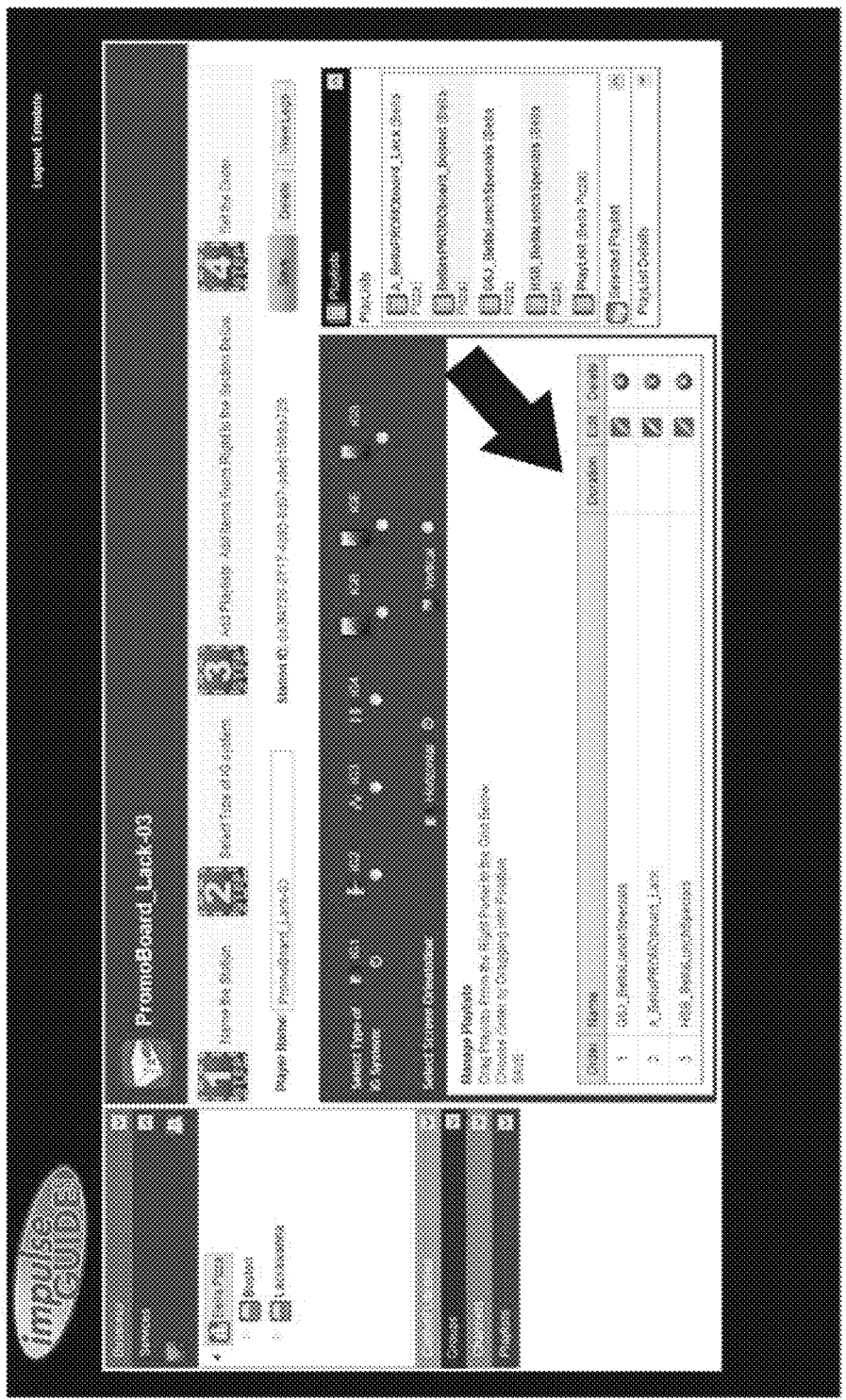

In step 360, a user may create a player program for controlling images displayed on a desired display screen. As shown in FIG. 9A, a user first chooses a media player from among those available to the specific user. Internet addresses of specific media players may previously have been uploaded to the player program creator database, and saved in accordance with the appropriate client file. As shown in FIG. 9B, the user may then name the player program for the selected media player, and select a type of display system associated with the selected media player, as each local media player may control images on one or more screens at the local level. The user may then select saved playlists and add them to the player program, and set the order of selected playlists in the player program. Representative GUI screens for creating a player program for a selected media player are shown in FIGS. 9A-9B.

The media player driving an associated electronic display device screen is then configured by the saved player program now associated with the selected media player over an internet connection. Content assigned and scheduled to groups, channels, and playlists assigned to the specific media player in the player program creator are then pushed out through the media player to the display screen. Media items on the electronic device display screen are displayed in a manner corresponding to a repeating loop of the arranged order of selected playlists and selection sequential arrangement of channels of media items, groups of media items, and individual media items in each selected playlist. Each channel and group in each playlist is programmed such that the media player is further configured by the player program to play a different media item from the channel and group relative to the media item played the previous time the channel and group is played by the media player as the player program loop repeats, so that the media item displayed on the electronic display device screen for a channel and group is changed, relative to the previous displayed media item for the channel and group, each time the channel and group is displayed in the designated sequential arrangement of channels, groups and individual media items of a playlist.

Figure 10A:
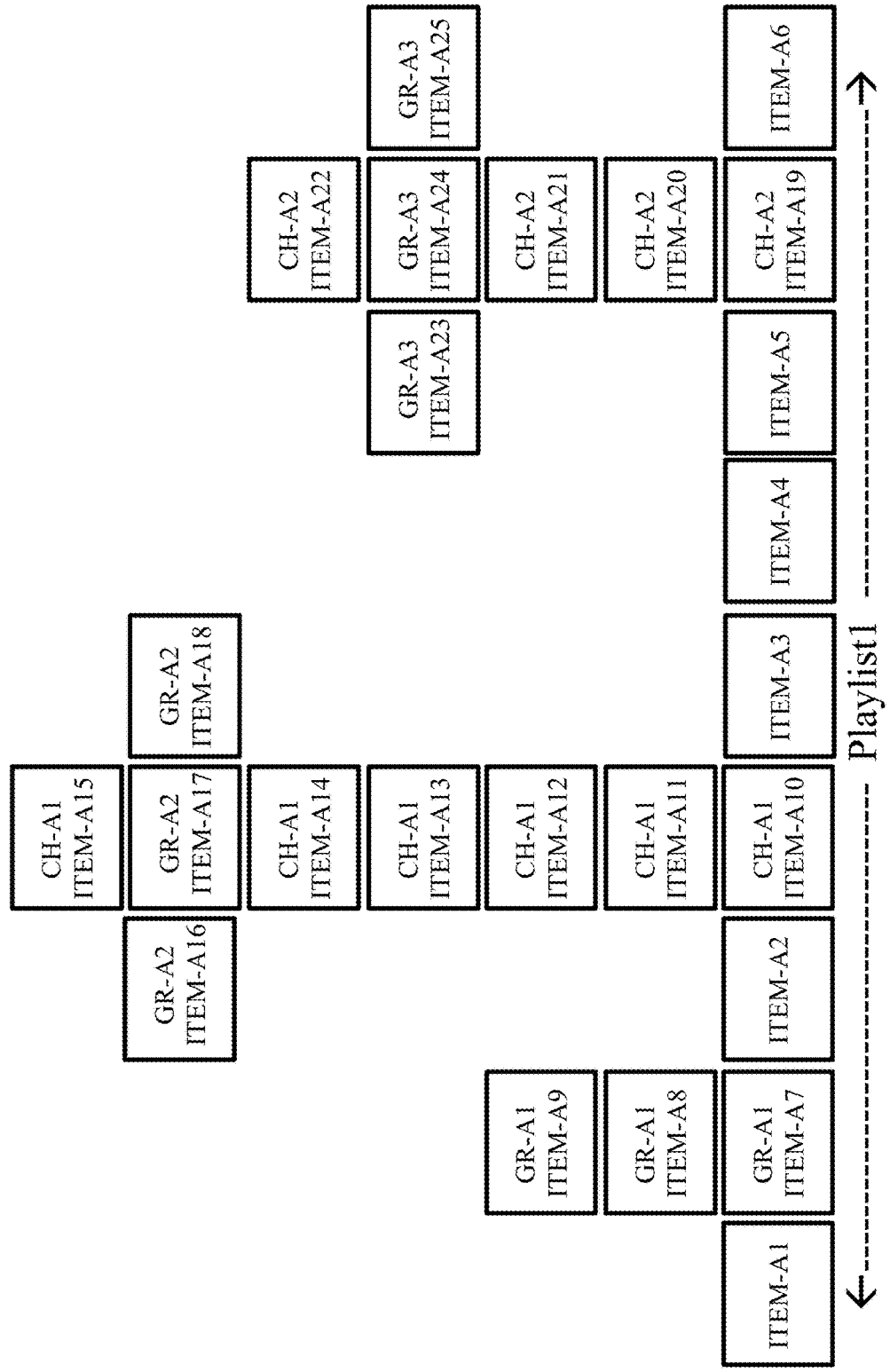
FIGS. 10A and 10B illustrate representative relative arrangements of individual media items, groups of media items, and channels of media items in a playlist in various embodiments of the invention.

A representative relative arrangement of individual media items, groups of media items, and channels of media items in a playlist may be illustrated as shown in FIG. 10A. As shown, a Playlist1 is formed from the depicted arrangement of individual media items ITEM-A1 to ITEM-A6, along with a group of media items GR-A1 and channels of media items CH-A1 and CH-A2. Group GR-A1 itself is formed from individual media items ITEM-A7 to ITEM-A9. Channel CH-A1 is formed from individual media items ITEM-A10 to ITEM-A15 and group GR-A2, wherein GR-A2 itself is formed from individual media items ITEM-A16 to ITEM-A18. Channel CH-A2 is formed from individual media items ITEM-A19 to ITEM-A22 and group GR-A3, wherein GR-A3 itself is formed from individual media items ITEM-A23 to ITEM-A25. When Playlist1 is played by a media player configured in accordance with the invention, each of individual media items ITEM-A1 to ITEM-A6 and a single media item from each of GR-A1, CH-A1, and CH-A2, e.g., items ITEM-A7, ITEM-A10, and ITEM-A19, respectively, will be displayed in the designated sequence of Playlist1. When Playlist1 is repeated, the same items ITEM-A1 to ITEM-A6 will again be displayed in the designated sequence, but a different media item from each of GR-A1, CH-A1 and CH-A2 will be displayed in place of ITEM-A7, ITEM-A10, and ITEM-A19 displayed in the previous loop.

Where CH-A1 is in a shuffle play mode, e.g., one of items ITEM-A11 to ITEM-A15 or GR-A2 will be randomly selected to be displayed in the CH-A1 position in Playlist1. When group GR-A2 is selected, one of items ITEM-A16 to ITEM-A18 will be selected. The present invention thus enables efficient programming of a highly variable sequencing of individual media items.

Figure 10B:
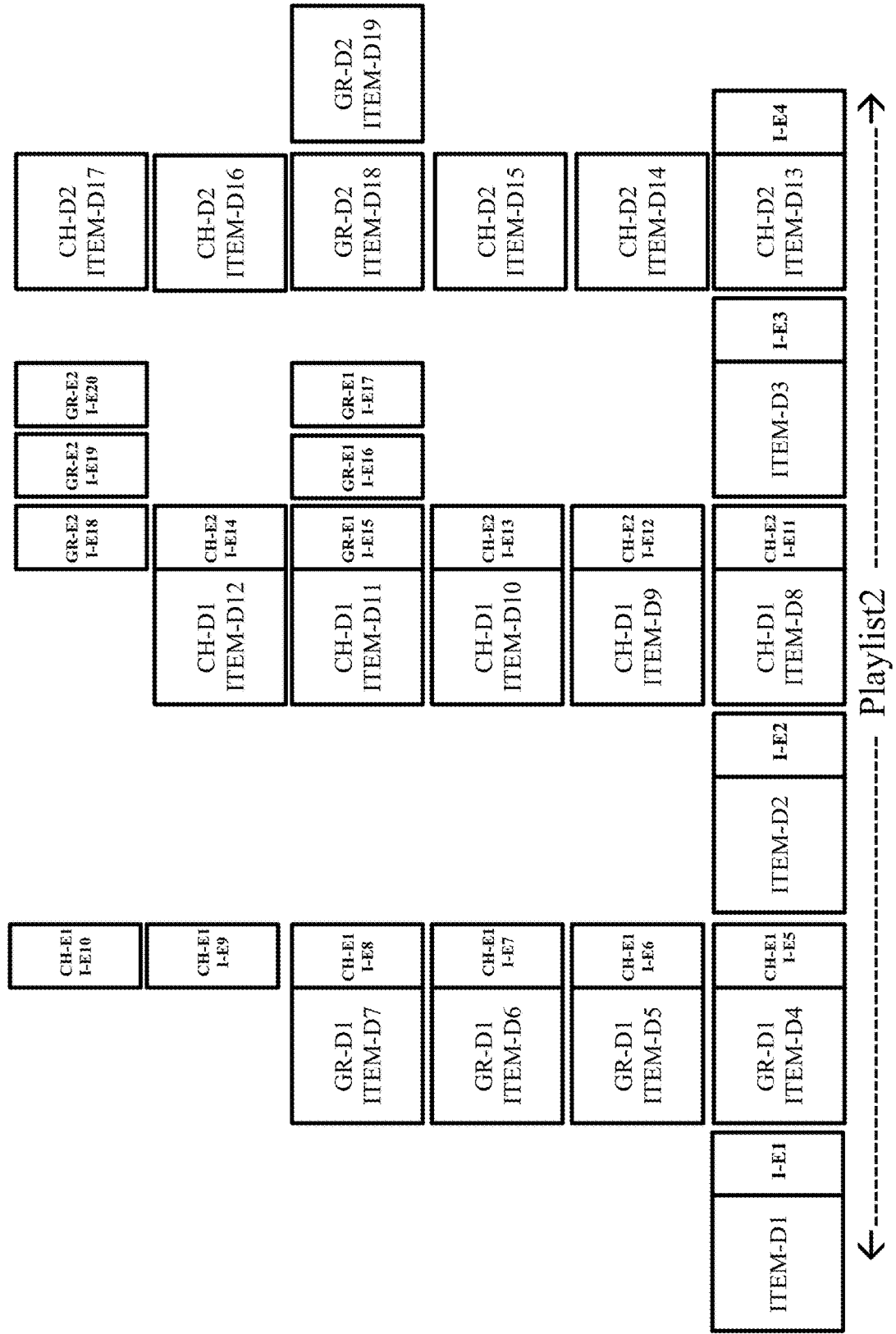

FIG. 10B illustrates a further representative relative arrangement of individual media items, groups of media items, and channels of media items in a playlist for a defined screen layout comprising two defined screen division formats each configured to represent a portion of a specified screen format and which are spatially combined to form divisions which together represent the entire specified screen format (such as defined screen division formats 12D and 12E which together form defined screen layout 14D as shown in FIG. 1D). As shown in FIG. 10B, a Playlist2 is formed from the depicted arrangement of combinations of individual media items ITEM-D1 to ITEM-D3, group GR-D1, and channels CH-D1 and CH-D2 along with individual media items I-E1 to I-E4 and channels CH-E1 and CH-E2. Group GR-D1 itself is formed from individual media items ITEM-D4 to ITEM-D7. Channel CH-E1 is formed from individual media items I-E5 to I-E10. Channel CH-D1 is formed from individual media items ITEM-D8 to ITEM-D12. Channel CH-E2 is formed from individual media items I-E11 to I-E14 and groups GR-E1 and GR-E2, wherein GR-E1 itself is formed from individual media items I-E15 to I-E17 and group GR-E2 itself is formed from individual media items I-E18 to I-E20. Channel CH-D2 is formed from individual media items ITEM-D13 to ITEM-D17 and group GR-D2, wherein GR-D2 itself is formed from individual media items ITEM-D18 and ITEM-D19. For each loop that Playlist2 is played by a media player configured in accordance with the invention, each combination of individual media items ITEM-D1/I-E1, ITEM-D2/I-E2, ITEM-D3/I-E3 will be displayed, along with combinations of a single media items from each combination of GR-D1/CH-E1, CH-D1/CH-E2, and CH-D2/I-E4, (e.g., ITEM-D4/I-E5, ITEM-D8/I-E11, and ITEM-D13/I-E4, respectively) in the designated sequence of Playlist2. When Playlist2 is repeated, the same combination of individual media items ITEM-D1/I-E1, ITEM-D2/I-E2, and ITEM-D3/I-E3 will again be displayed, but different media items from each of GR-D1/CH-E1, CH-D1/CH-E2, and CH-D2/I-E4 will be displayed in place of the combinations of ITEM-D4/I-E5, ITEM-D8/I-E11, and ITEM-D13/I-E4 displayed in the previous loop. Where channels CH-D1 and CH-E2 are in shuffle play modes, e.g., any one of remaining items ITEM-D9 to ITEM-D12 will be randomly selected to be displayed in the CH-D1 position in Playlist1, along with anyone of remaining items I-E12 to I-E14 and groups GR-E1 and GR-E2 in the CH-E2 position. When a group such as GR-E1 is selected, one of items I-E15 to I-E17 will be selected to be displayed in the CH-E2 position. Use of defined screen layouts comprising two or more defined screen division formats each configured to represent a portion of a specified screen format and which are spatially combined to form divisions which together represent the entire specified screen format in accordance with preferred embodiments of the invention thus enables even further highly variable sequencing of individual media items.

If not scheduled to be active, a channel, group or an individual media item included in a playlist in a saved desired sequential order in a player program will be skipped and not displayed on the electronic display device screen, and rather a media item from the next active channel, group or individual media item in the playlist will be displayed. Playlists for various screen layouts, such as Playlist1 and Playlist2 as described above, may be arranged in a player program for sequential playout, further enhancing the variability of image presentation enabled by the present invention.

Figure 10C:
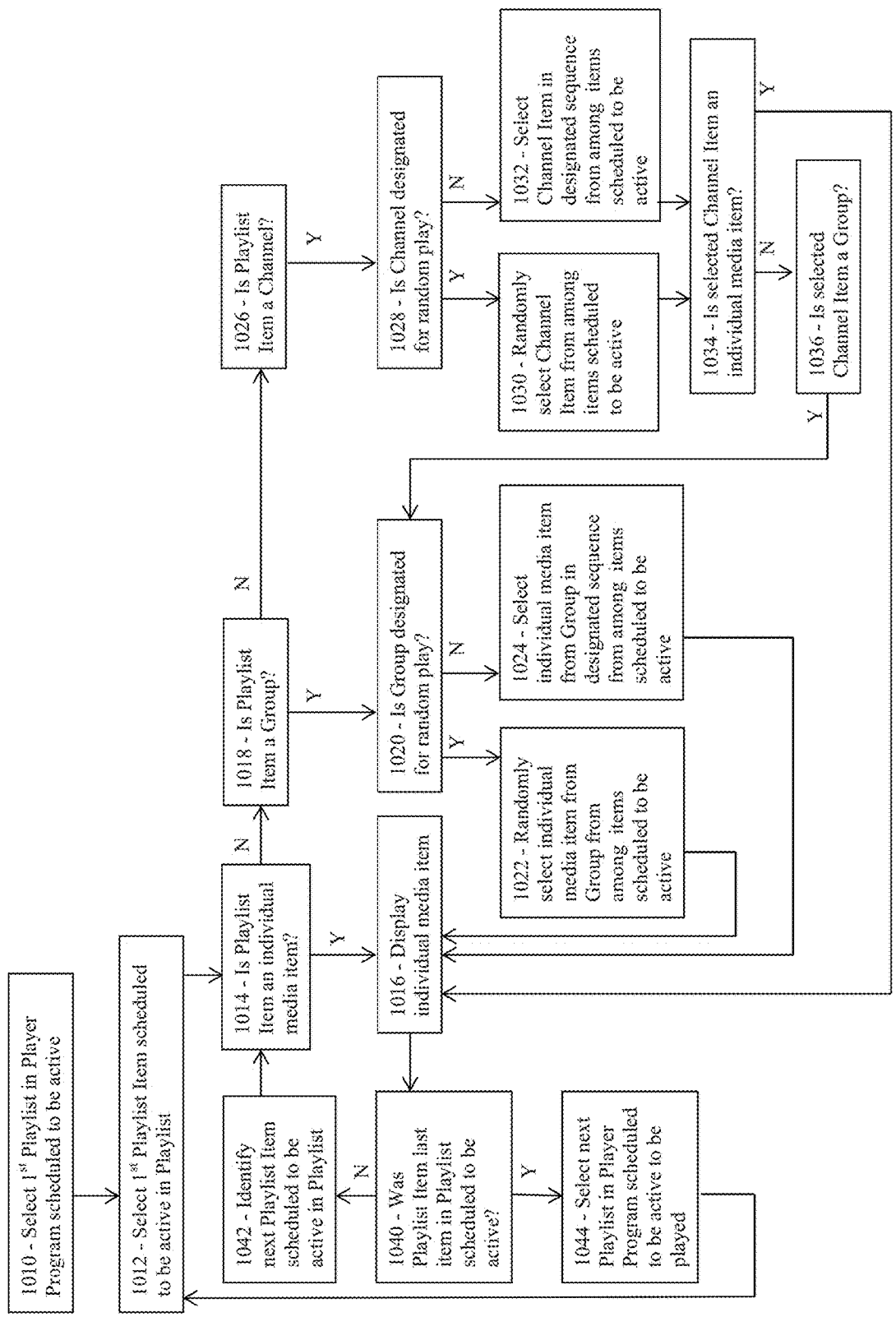
FIG. 10C illustrates a media player logic flow diagram in accordance with an embodiment of the invention.

FIG. 10C illustrates a logic flow diagram of how a media player driving an electronic display device screen may be configured by a saved player program to display media items on the electronic device display screen in a manner corresponding to a repeating loop of an arranged order of selected playlists and selection of sequential arrangement of channels of media items, groups of media items and individual media items in each selected playlist. In step 1010, the first playlist in the player program which is scheduled to be active is selected, and in step 1012, the first playlist item scheduled to be active in the selected playlist is itself selected. In step 1014, it is determined if the selected playlist item is an individual media item, and if so, the selected media item is displayed on the electronic device display screen in step 1016.

If the selected playlist item is not an individual media item, it is determined in step 1018 if the playlist item is a group. If the playlist item is a group, it is determined in step 1020 if the group is designated for random play, and if so, an individual media item is randomly selected from the group from among items scheduled to be active in step 1022. As described above, such random selection may be constrained so as to exclude previously displayed individual media items from the available random selection in accordance with shuffle play type selection programming. Alternatively, if the group is not designated for random play, an individual media item is selected from the group in the designated sequence of the items of the group in step 1024. In either instance, the individual media item is displayed on the electronic device display screen in step 1016.

If the selected playlist item is not an individual media item nor a group, it is confirmed in step 1026 that the playlist item is a channel, and determined in step 1028 if the channel is designated for random play. If so, a channel item is randomly selected from among the channel items scheduled to be active in step 1030. Again, such random selection may be constrained so as to exclude previously displayed channel items from the available random selection in accordance with shuffle play type selection programming. Alternatively, if the channel is not designated for random play, a channel item is selected from the channel from among those items scheduled to be active in accordance with the designated sequence of the channel items in step 1032. In step 1034, it is then determined whether the selected channel item is an individual media item, and if so such individual media item is displayed on the electronic device display screen in step 1016. If the selected channel item is instead determined to be a group in step 1036, the group is then considered in steps 1020-1024 as described above for selection of an individual media item to be displayed in step 1016.

After display of an individual media item in step 1016, it is then determined in step 1040 whether the previously displayed playlist item was the last item in the playlist that is scheduled to be active. If not, the next playlist item scheduled to be active in the playlist is determined in step 1042, and such next playlist item is then considered as in steps 1014-1036. If the previously displayed playlist item is the last item in the playlist that is scheduled to be active, the next playlist in the player program that is scheduled to be active is selected in step 1044, and the first playlist item scheduled to be active in the next playlist scheduled to be active is selected again in step 1012. The media player replays playlists in the player program that are scheduled to be active in a repeating loop, and plays a different media item from each channel and/or group relative to the media item played the previous time the channel and/or group is played by the media player, whereby the media item displayed on the electronic display device screen for a channel and/or group is changed, relative to the previous displayed media item for the channel and/or group, each time the channel and/or group is displayed in the designated sequential arrangement of channels, groups and individual media items of a playlist as a player program loop repeats.

In a specific embodiment, the present invention is particularly useful for presentation of media items created and saved in the form of media files comprising compilations of multiple images and textual content, such as, e.g., trivia "question, option(s) and answer" type compilation media items. A compilation media item creator tool may be used which employs templates including text boxes and background image fields, which enables compilation with selected background images, text strings and option images through a media application script for layering of entered text strings and selected option images over selected background images, e.g., to compose a "question, option(s) and answer" type compilation media item, or other compilation media item comprising multiple sequentially displayed text and option images layered over background images saved in an electronic database as an individual compilation media item.

More specifically, the invention further may include a computer implemented method for displaying a customized compilation media item comprising a compilation of multiple images and textual content on an electronic display device screen. In such method, a compilation media item creator program stored in an electronic database may be accessed by a user, e.g., through a browser interface over the internet world wide web, where, e.g., the program employs at least first and second templates arranged in accordance with a media application script for display of first and second composite images in a specified sequence. The first template may include one or more text boxes superimposed over a first background image field, and the second template may include one or more text boxes superimposed over a second background image field. The user may enter text to be displayed in one or more text boxes in the first template, and select a background image to be displayed in the first background image field from images stored in an electronic database, and save the entered text and selected background image in an electronic database to create saved information for the first composite image. Next, the user may enter text to be displayed in one or more text boxes in the second template, and select a background image to be displayed in the second background image field from images stored in an electronic database, and save the entered text and selected background image in an electronic database to create saved information for the second composite image. The entered text and selected background images for the first and second templates may then be saved in an electronic database in combination as a saved customized compilation media item. The saved customized compilation media item may then be included as an individual media item along with other individual media items in a saved player program on an electronic database, and an electronic display device screen may be driven with a media player to display media items on the electronic device display screen, wherein the media player is configured by the saved player program to sequentially display different individual media items included in the saved player program, including the saved customized compilation media item.

In further specific embodiments, the first template may include at least a first text box superimposed over the first background image field in a first location (e.g., for entering a question text string), and the media application script further enables layering of one or more additional option text boxes and/or option images selected from images stored in an electronic database (preferably, at least one and up to and including three each of option text boxes and associated option images) over the first background image in a second location. These options could include, e.g., "True" and "False" text strings and/or images, alternate answer options (such as color choices, A-B-C answer designations, number options, corresponding keys on a mobile or other selection device, etc.). The compilation media item creator program may preferably center the option text boxes and/or associated option images in the second location depending upon the number of options desired to be included in the compilation medium item. In such embodiment, e.g., a question text string may be entered in the first text box, answer option text strings may be entered in the option text boxes and answer option images selected, and a final answer option text string may be entered in a text box superimposed over the second background image. The entered question text string, answer options text strings, and answer option images may then be saved in an electronic database to create the saved information for the first composite image. While text boxes for answer option text strings are provided in one embodiment, with or without answer option images, such answer option text boxes may not be employed in other embodiments. Alternatively, e.g., the first template may include only a first text box superimposed over the first background image field in a first location for entering a question text string, and a question text string may be entered in the first text box while one or more (preferably one, two or three) answer option images are selected from images stored in an electronic database to be displayed superimposed over the first background image field in a second location, and the entered question text string and selected answer option images may be saved in an electronic database to create the saved information for the first composite image.

In accordance with further specific embodiments, the compilation media item creator program may provide further features to the option text boxes and/or associated option images layered over the first background image. Such option text boxes and/or option images may be animated, e.g., so as to individually be removed from the first composite image (e.g., to narrow the possible answer options from an initially displayed three options to two options, and then to only one remaining option). Removal of options may be by conventional animation effects, such as fading away, movement off the screen, spinning away, etc. While the single remaining option will typically be desired to be constrained to be the "correct" final answer, the removal of other answer options may be programmed to be random or in a specific set sequence. Upon removal of an individual answer option, the remaining answer options may be programmed to be re-centered over the background image if desired.

Such user generated customized compilation media items may in particular be useful for presenting, e.g., a user customized trivia question, multiple-choice answer options, and a final answer in a digital signage display system. While non-customizable question, answer options, and answer media items have been previously provided as media content for use in conventional digital signage media content loop playlists, each such question, answer options, and answer media item is present as a non-customizable whole block of time/space in a playlist, substantially lengthening the playlist as the more of such compilation media items are added to the playlist. In addition to providing the benefit of enabling easily customizable compilation media items such as user-customized trivia questions, once created and stored in an electronic database for use in preferred embodiments of the present system, such customized compilation media items further advantageously may be selected and combined into groups or channels of such compilation media items in accordance with the methods and systems of further embodiments of the invention, so a group or channel including such compilation media items may be arranged along with other individual media items or other groups or channels of media items in a designated sequential arrangement for sequential display of a media item from each selected group or channel and any selected individual media items in a saved playlist. As each channel and/or group in each playlist is programmed such that a media player is configured by a player program to play a different media item from the channel and/or group relative to the media item played the previous time the channel and/or group is played by the media player, the present invention further advantageously enables multiple compilation media items to be easily programmed for alternating interspersed display with other media items in a playlist, without extensively lengthening the playlist.

In further embodiments, when such compilation media items are employed in the methods and systems of the invention for managing display of a plurality of media items on an electronic display device screen of a specified screen format comprising a plurality of defined screen division formats stored in an electronic memory, where each defined screen division format is configured to represent either the entire specified screen format or a portion of the specified screen format, and a plurality of defined screen layouts stored in an electronic memory, each defined screen layout comprising either i) a defined screen division format configured to represent the entire specified screen format or ii) two or more defined screen division formats each configured to represent a portion of the specified screen format and which are spatially combined to form divisions which together represent the entire specified screen format, such compilation media items may advantageously be stored in an electronic memory, with associated images included in such compilation media items selected to be for use in one of the plurality of defined screen division formats. A player program creator in accordance with the present invention configured to create and store player program instructions in an electronic memory may then be employed for controlling a media player to display media items on an electronic display device screen of the specified screen format selected from a plurality of media items, including the compilation media items, and groups or channels of media items in accordance with a selected one or more of the defined screen layouts displayed in a selected sequence, wherein media items selected to be displayed in each defined screen division format of each selected defined screen layout are only selectable in the player program creator from media items stored in the corresponding screen division format.

In a particular embodiment, compilation media items may be stored in an electronic database with a plurality of alternative associated images designated for use in a plurality of alternative defined screen division formats, and such compilation media items are made available for selection for addition to a group, channel, or playlist for a specified defined screen division format if an associated image for the compilation media item designated for use in specified defined screen division format is saved for such compilation media item. This enables text for a specific compilation media item to only have to be created once, and to associate such text with alternative formatted images for alternative display in multiple defined screen division formats.

In further specific embodiments, a compilation media item creator tool may be used which enables the loading or authoring of possible message or answer options for multiple choice selection in a format that includes, e.g., the sizing of the message playout on display, font sizes and color, duration of display and associated graphics, wherein the presentation of the chosen or preferred message may be managed such that the intended communication goals are achieved for a specific intended audience of a digital media display. Templates may be employed to easily construct the way in which messaging and media will be presented on a display device for a created multiple-choice compilation media item. Customizable authoring and presentation of such multiple-choice media items in a specific template structure enables linking the presentation of multiple choice questions, options and answers in a relational structure, and minimizes the efforts required to present customizable media of a multiple-choice nature directed towards specific audiences. This further embodiment of the invention thus further enables improving viewer interaction with the messages presented on a digital display, improving awareness of product or service attributes and/or benefits, and, e.g., reducing the perceived waiting time in locations served by the digital display messaging, thus enabling improved viewer engagement and increased message retention.

In addition to multiple-choice type trivia questions, a compilation media item creator tool employing templates may further be employed in accordance with various embodiments of the invention to create, e.g., educational messaging where the multiple choice options are used to support instructions (e.g., for a display at a museum), presenting points which establish the value or importance of a product or service (e.g., for a display at a bank where the question is "How much would $10 deposited per month be worth in 10 years?"), information related to the features of a product or service or the benefits that are realized, and other general entertainment features.

Figure 11:
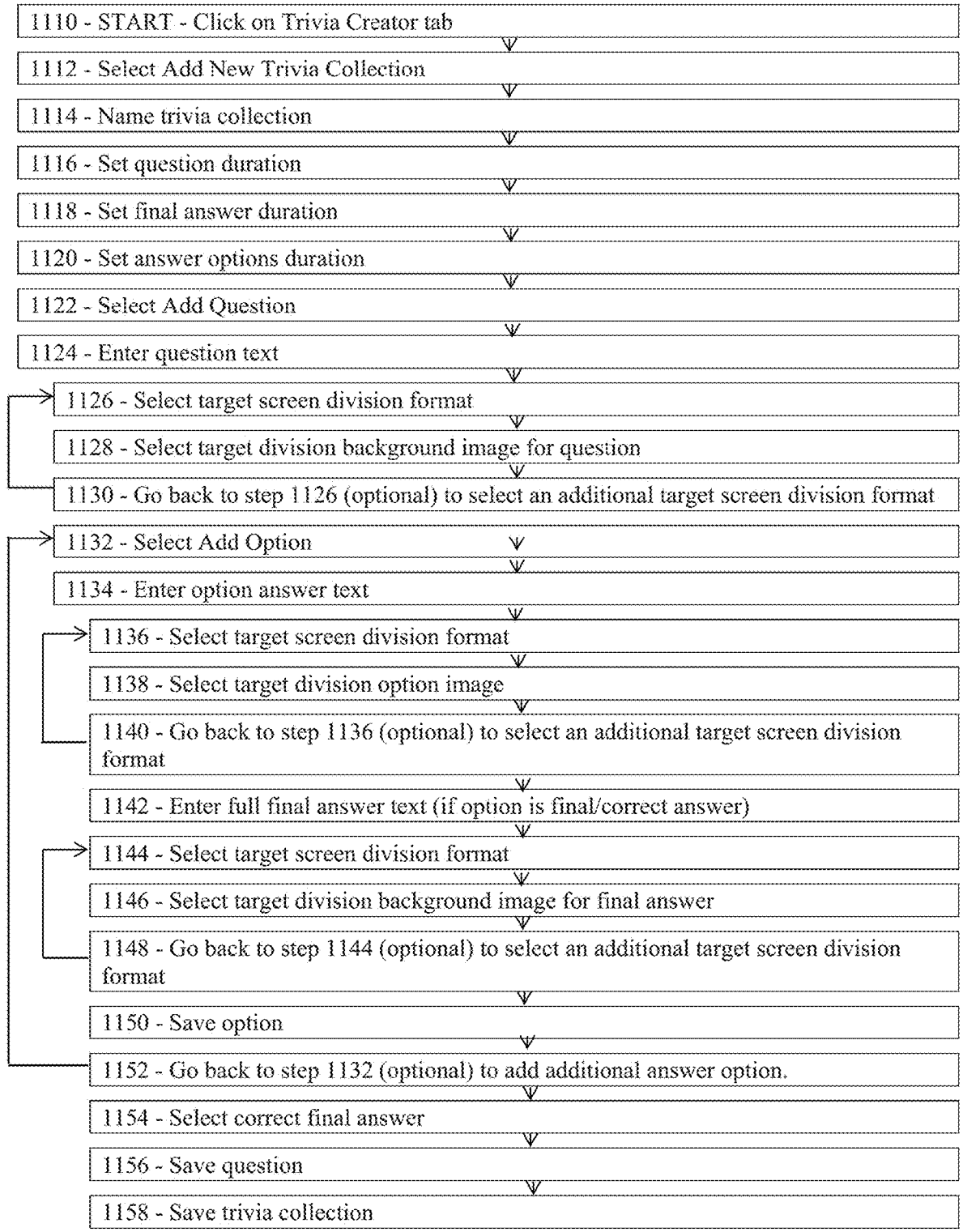
FIG. 11 is a flow diagram demonstrating an example of a computer implemented, web based method for the creation of a trivia type question, answer options, and final answer compilation media item for use in an embodiment of the invention.

FIG. 11 shows a flow diagram of a process of creating a compilation media item that may be employed in one embodiment of the present invention, such as a trivia question type compilation media item including display of first text message (e.g., a question) super-imposed over a first background image, display of multiple further text messages and/or images also super-imposed over the background image (e.g., multiple-choice type answer options and/or associated images), and a final text message (e.g., the answer to the question) super-imposed over a second background image. In a preferred embodiment, the process may be implemented in the form of a web-based program with appropriate graphical user interface (GUI) screens, and FIGS. 12A-12V depict representative GUI screens that may be further employed with the computer implemented, web based method and system as illustrated in FIGS. 3-9.

Figure 12A:
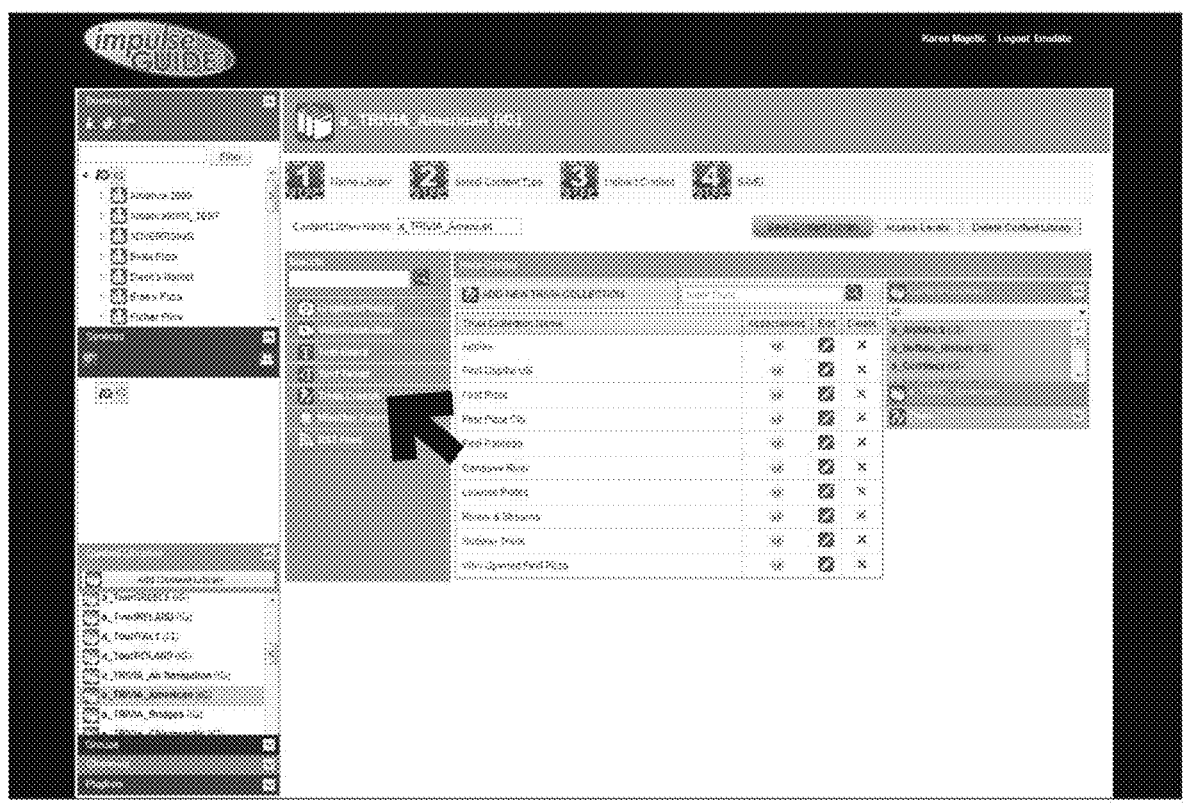
FIGS. 12A-12V illustrate an example of web-based GUI screens for creating a trivia type question, answer options, and final answer compilation media item that may be employed in an embodiment of the invention.
Figure 12B:
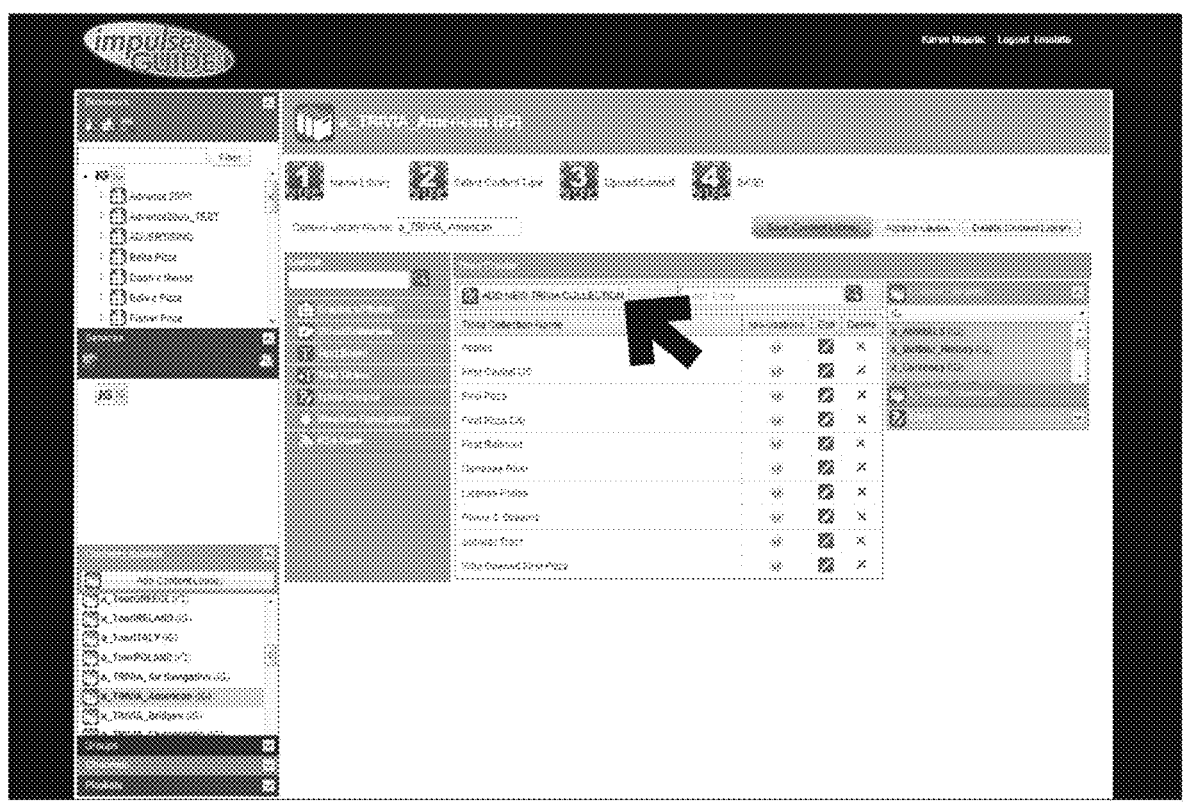
Figure 12C:
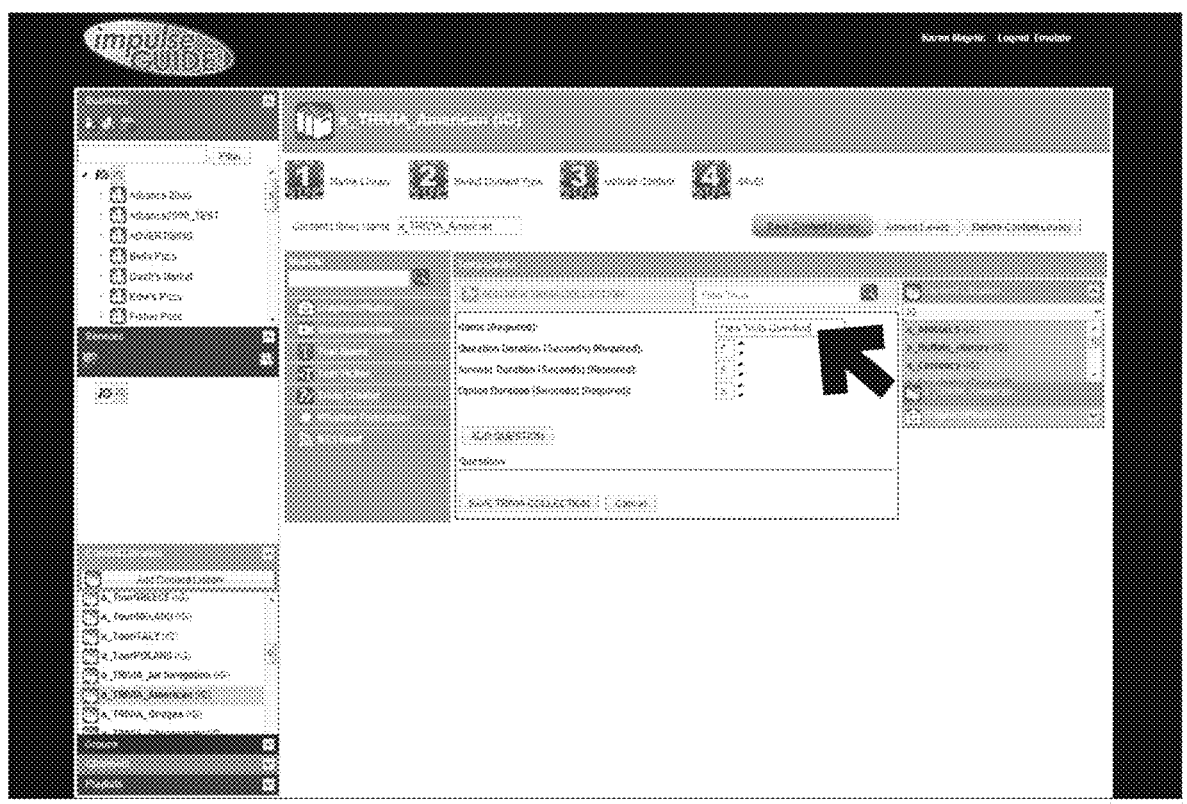
Figure 12D:
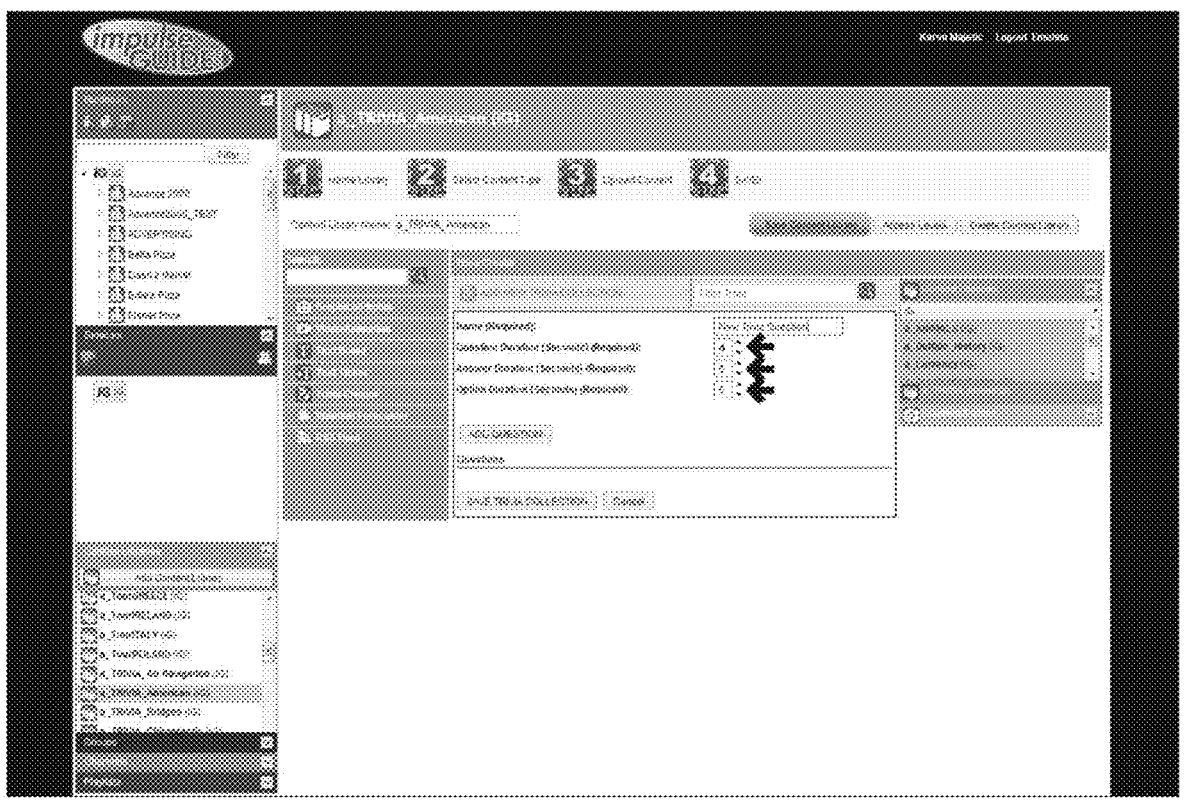
Figure 12E:
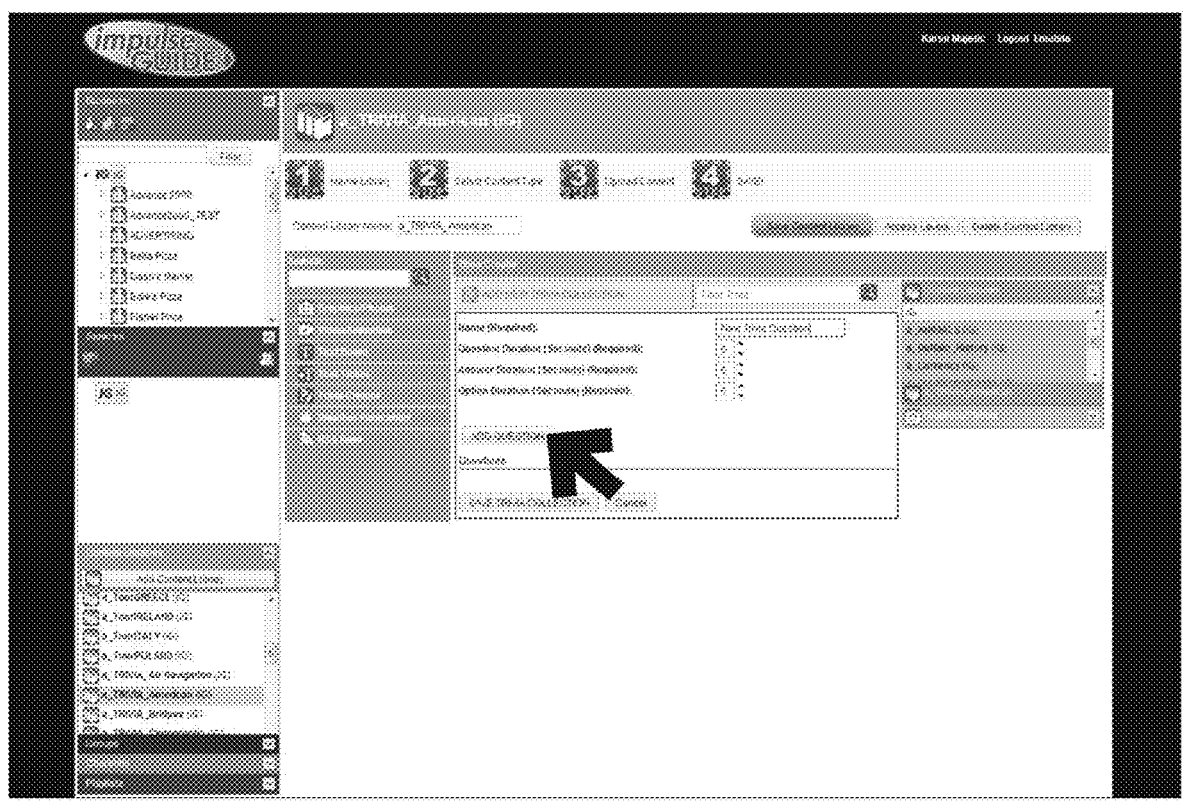
Figure 12F:
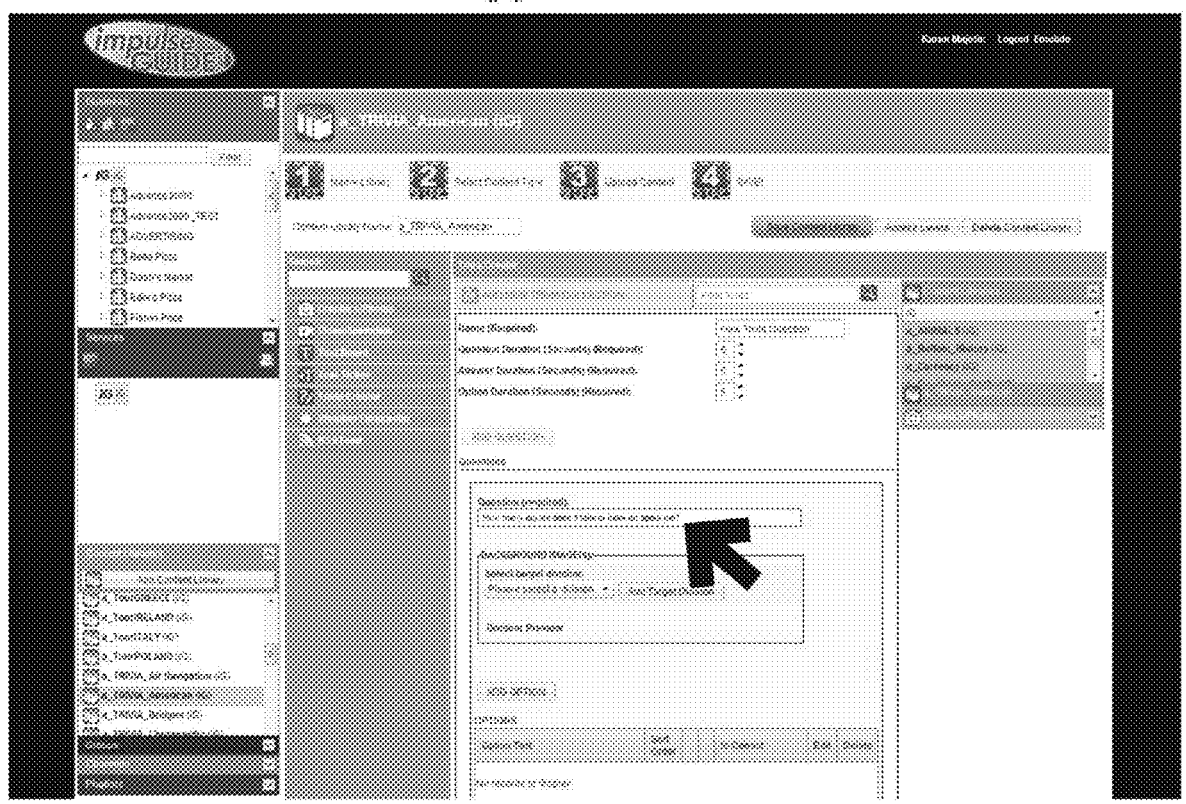

In step 1110, a user starts the process of creating a question, answer options, and final answer compilation media item in a selected content library by clicking on a Trivia Creator tab of a web-based GUI as illustrated in FIG. 12A. As further previously shown in FIG. 4A, various levels of system access to selected content libraries may be granted to various types of users through such a web-based GUI as desired by a system provider through a pop-up screen configured to edit access levels. In step 1112, the user may select to Add New Trivia Collection as shown on a GUI screen in FIG. 12B. In step 1114, the user names the new trivia collection, as show in FIG. 12C. In steps 1116, 1118 and 1120, the user can set the question duration, final answer duration, and answer options duration for a trivia item in the newly created collection, as shown in FIG. 12D. In step 1122, the user selects Add Question as shown in FIG. 12E, and in step 1124 enters a question into a text box as shown in FIG. 12F.

Figure 12G:
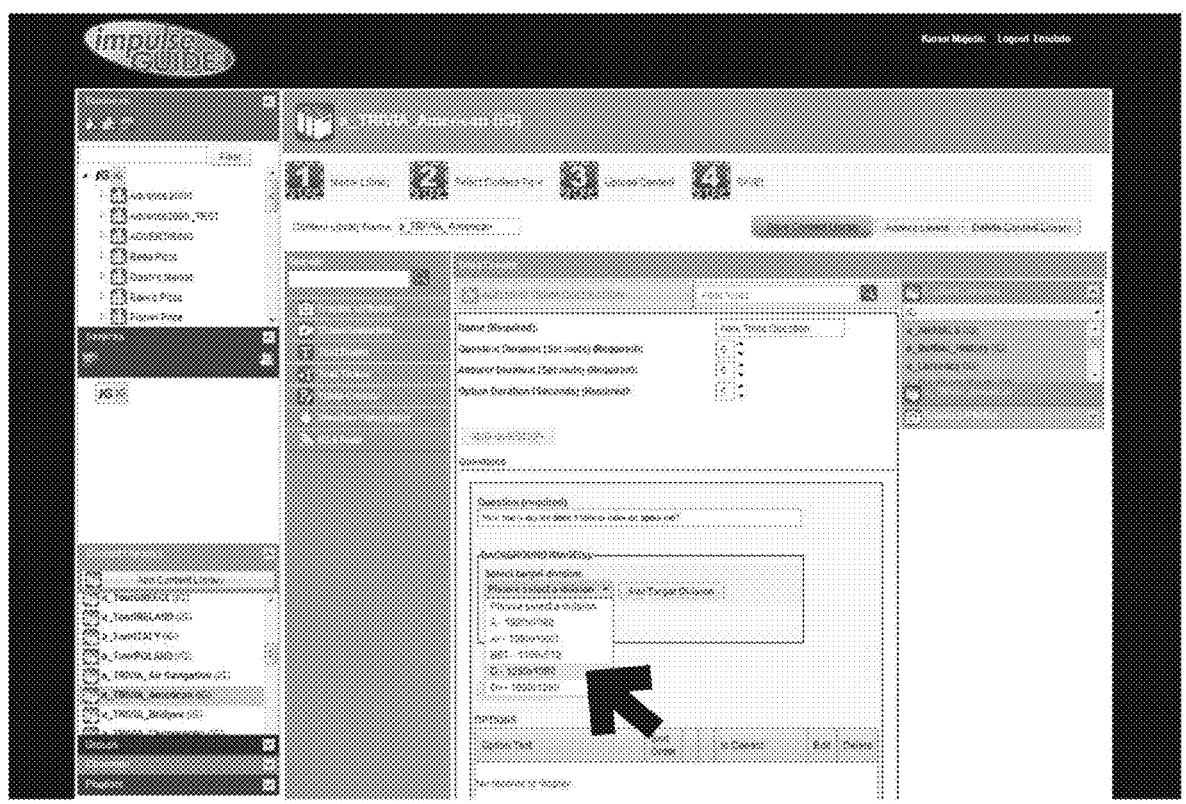
Figure 12H:
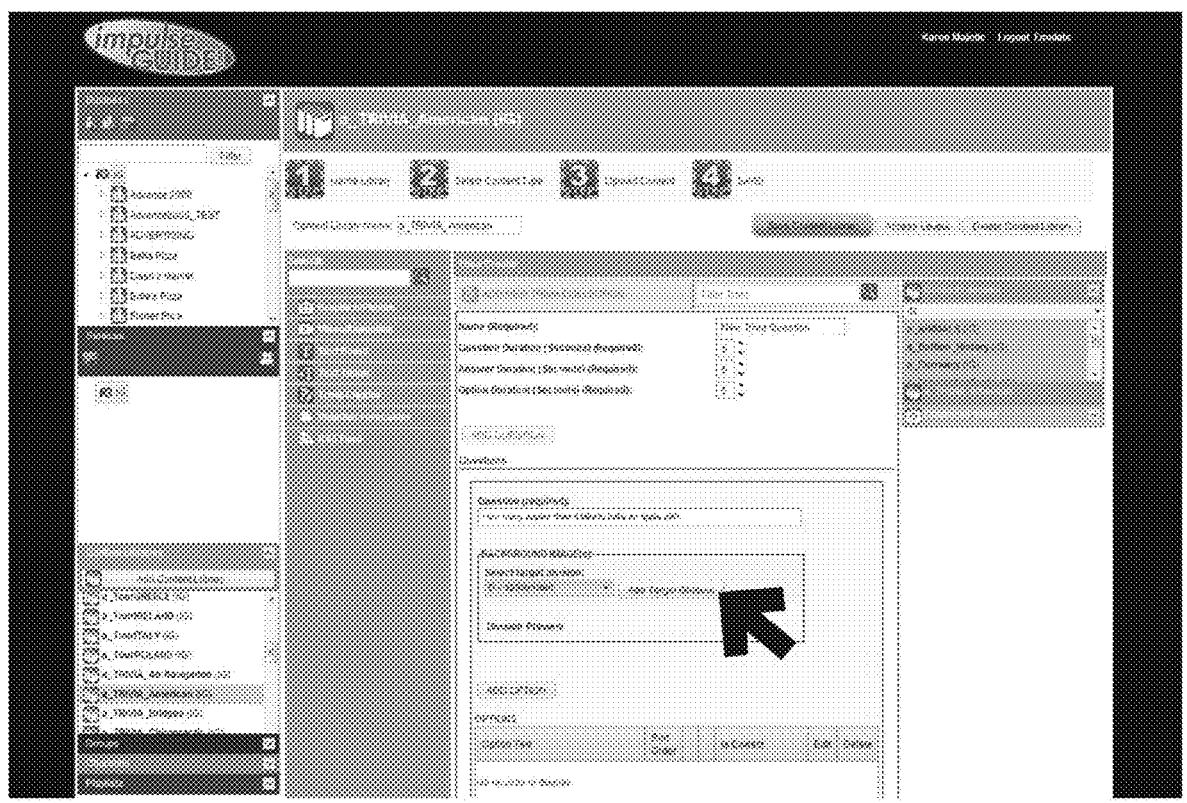
Figure 12I:
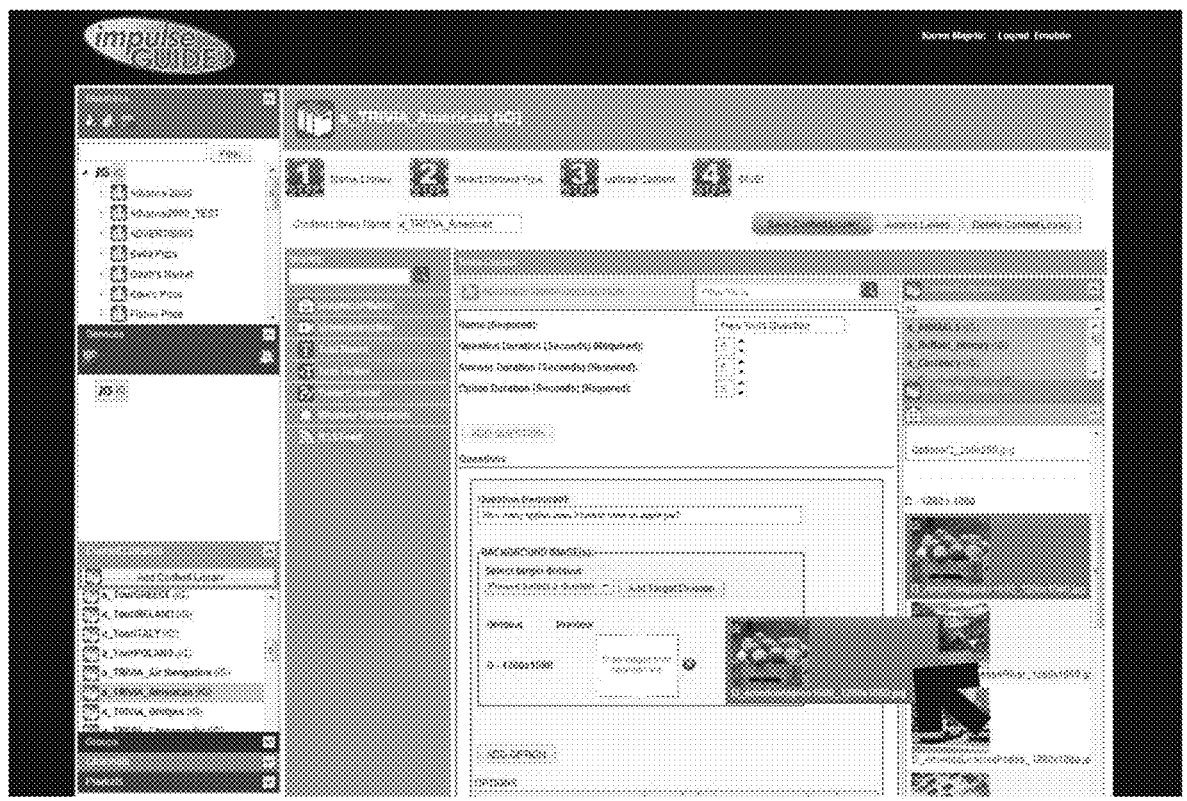

In step 1126, the user selects a target screen division format (e.g., "D—1280×1080" pixels) for the trivia question compilation media item as shown in FIG. 12G, and in step 1128 selects option to add a target division background image as shown in FIG. 12H. Background images for use in the selected target screen division format are then made available from a content library as shown in the right-hand panel in FIG. 12I, and the user may click and drag an image from such content library which is selected for use in the selected target screen division format as further shown in FIG. 12I. In step 1130, a user may decide to go back to step 1126, and select an additional target screen division format for the compilation media item to be used with. In such case, an additional background image may then be selected for use in the additional selected target screen division format.

Figure 12J:
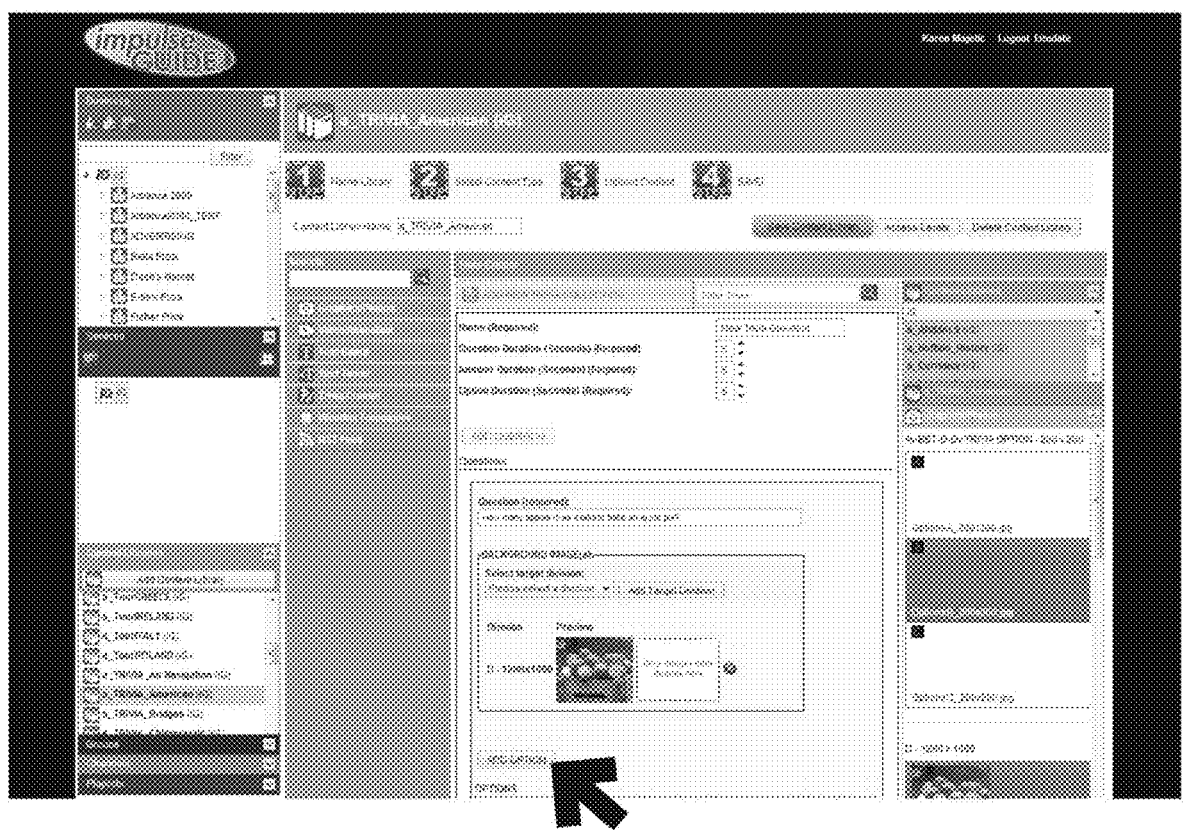
Figure 12K:
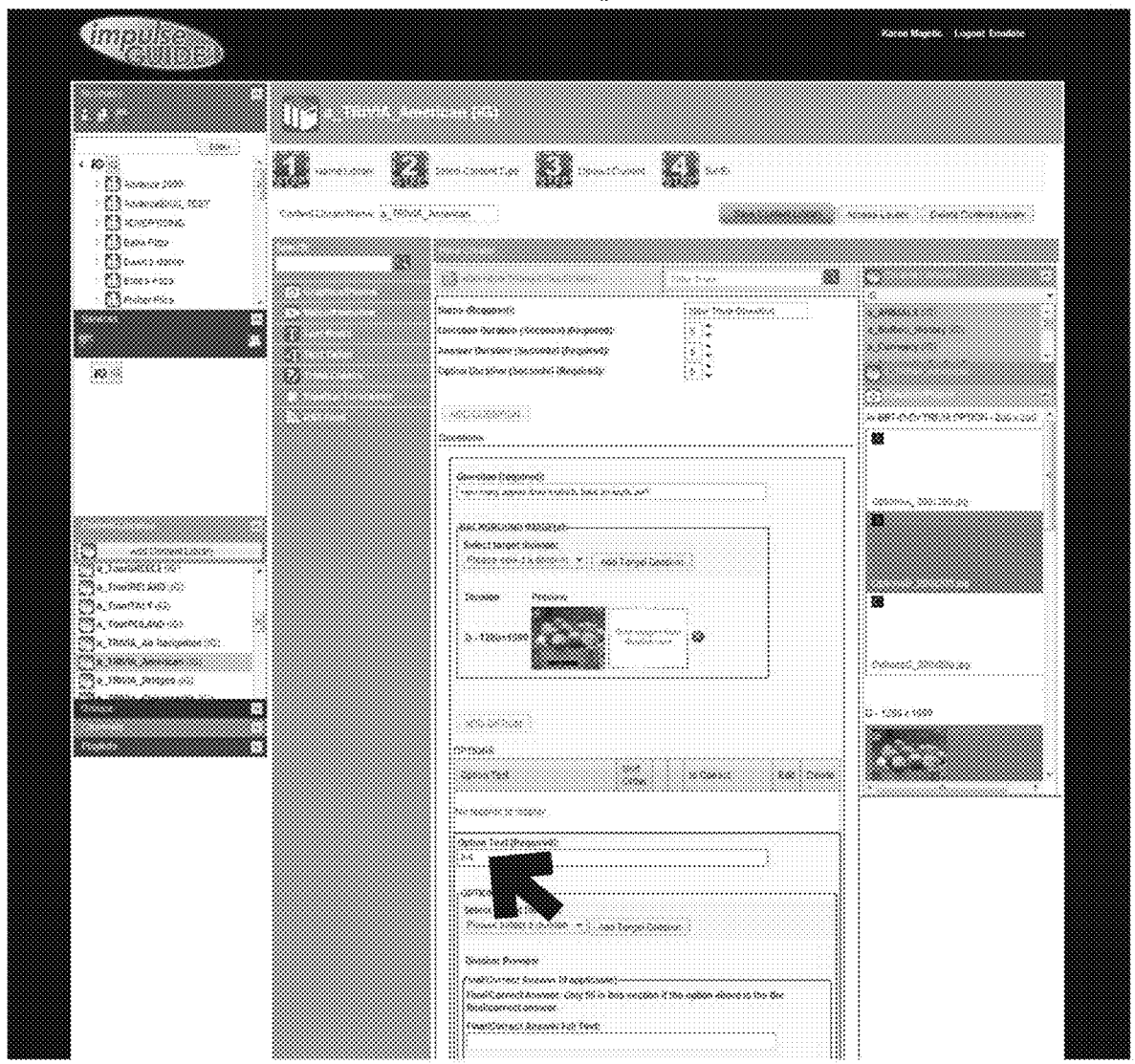
Figure 12L:
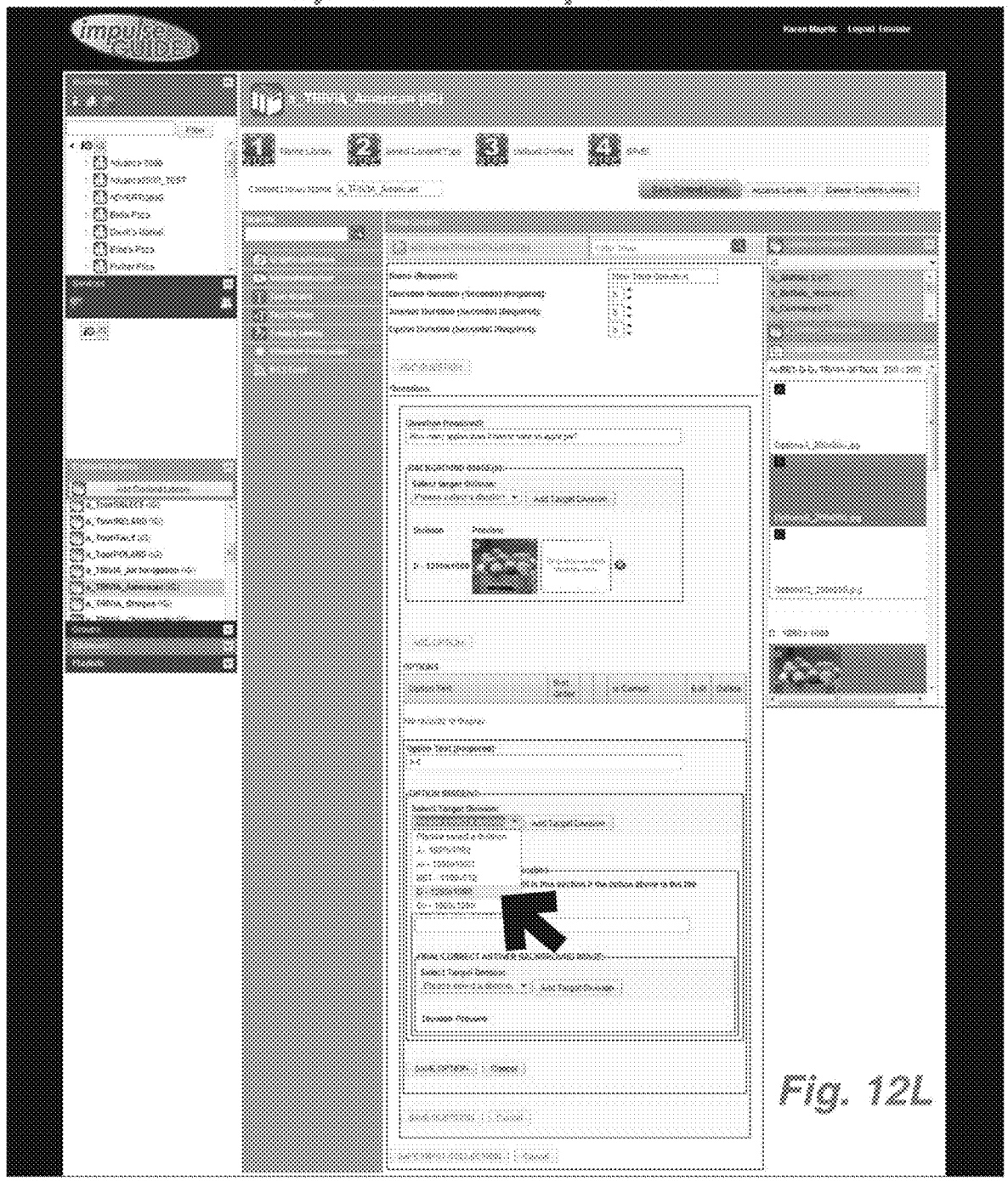
Figure 12M:
Figure 12N:
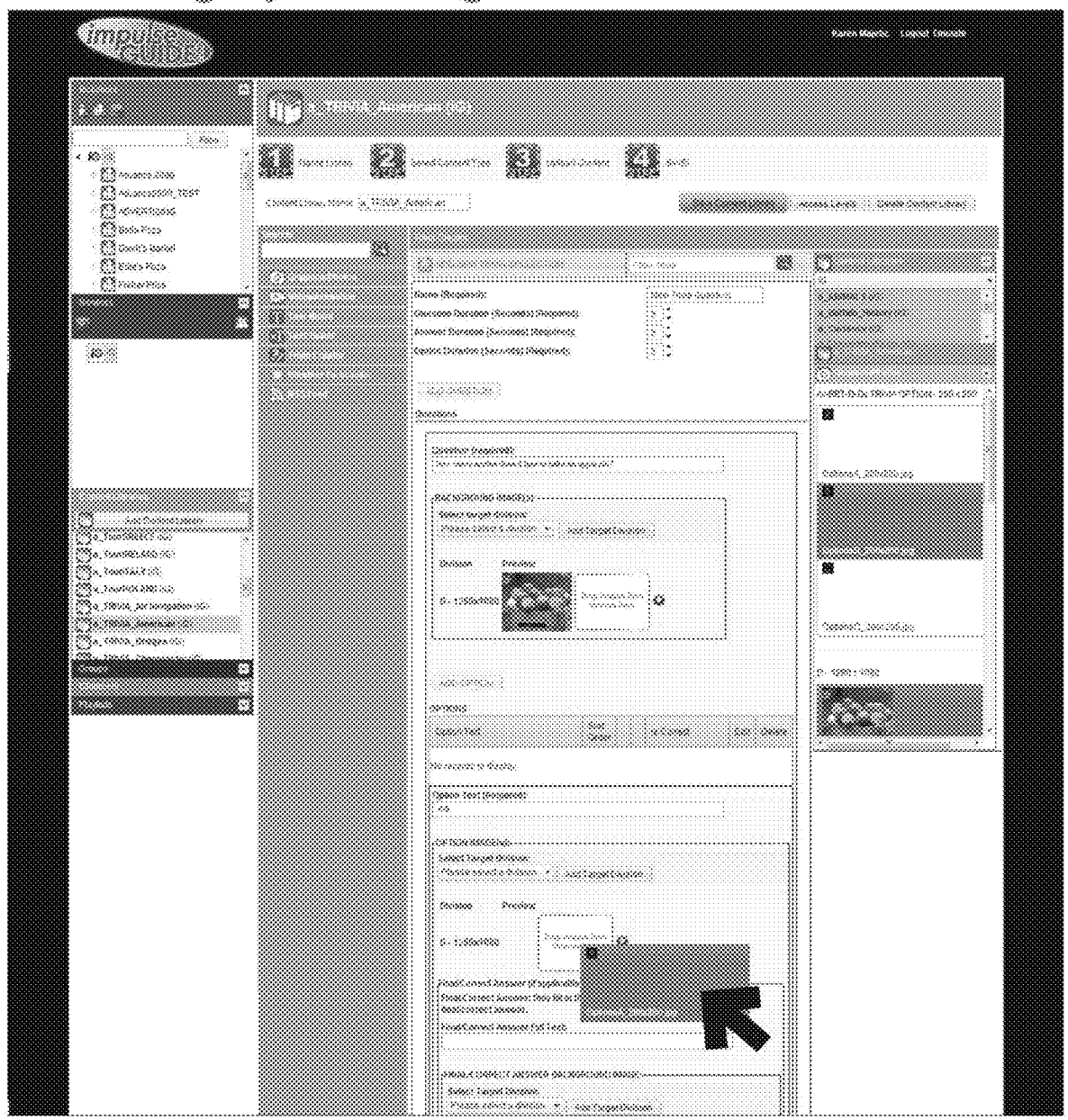
Figure 120:
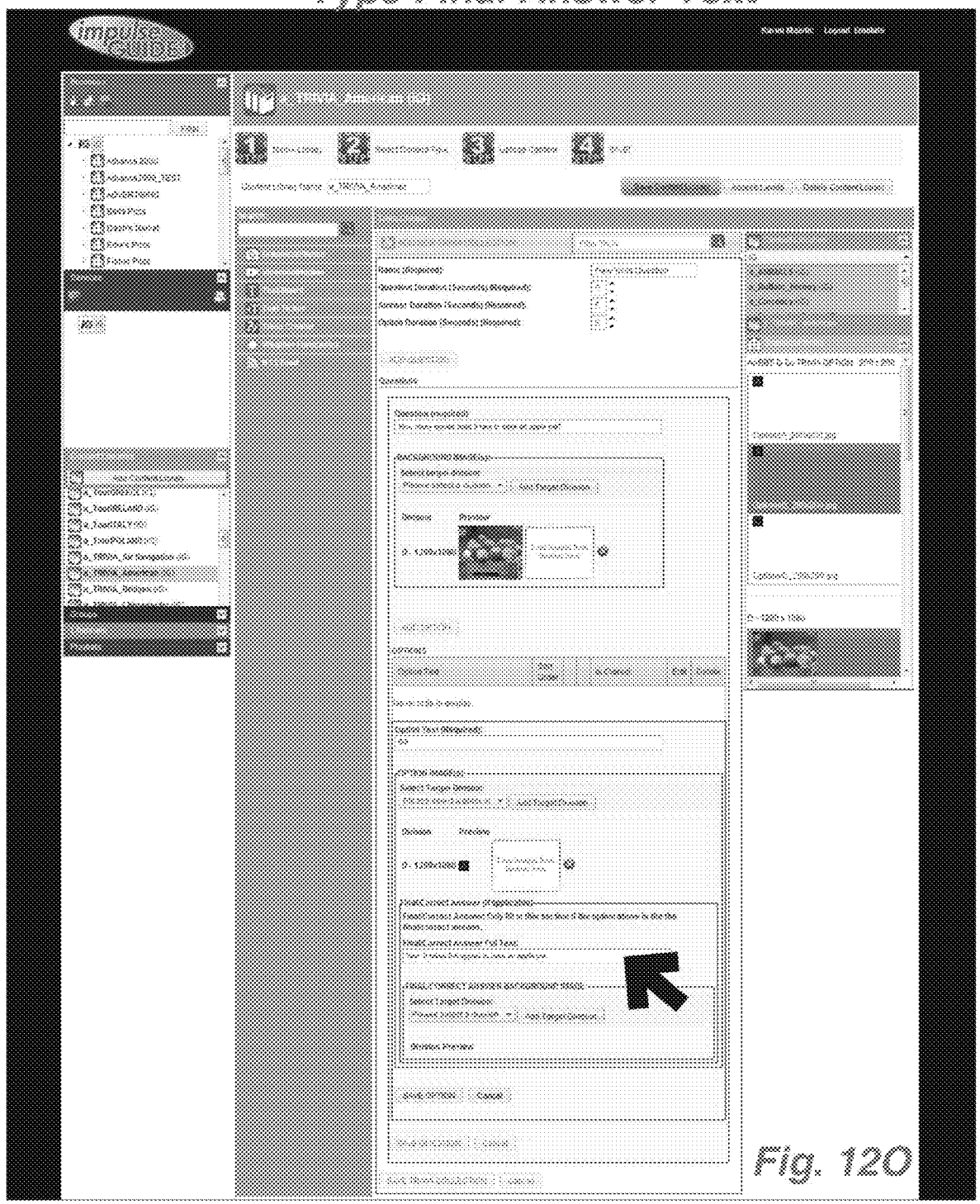

In step 1132, the user selects Add Option as shown in FIG. 12J, and in step 1134 enters an option answer into a text box as shown in FIG. 12K. In step 1136, the user again selects the target screen division format (e.g., "D—1280×1080") for the trivia question compilation media item as shown in FIG. 12L, and in step 1138 selects option to add a target division option image as shown in FIG. 12M. The user may then click and drag an option image from the content library shown in the right-hand panel which is selected for use in the selected target screen division format as shown in FIG. 12N. In this particular embodiment, option images (e.g., block images of capital letters "A", "B" and "C", for selection with answer options to be designated by such letters) for a selected target division are of a substantially smaller size (e.g., 200×200 pixels) than the background image, as such option images are intended to be super-imposed along with the option text over the background image. Thus, selection of option images in a compilation media item may be controlled by only making available option images of an appropriate size for use in a selected target screen division for the compilation media item. In step 1140, a user may decide to go back to step 1136, and select an additional target screen division format for the compilation media item to be used with. In such case, an additional option image may then be selected for use in the additional selected target screen division format. Note, however, that as the option images in this embodiment are relatively small in comparison to the target division, the same option image may be designated for use in various target screen division formats.

Figure 12P:
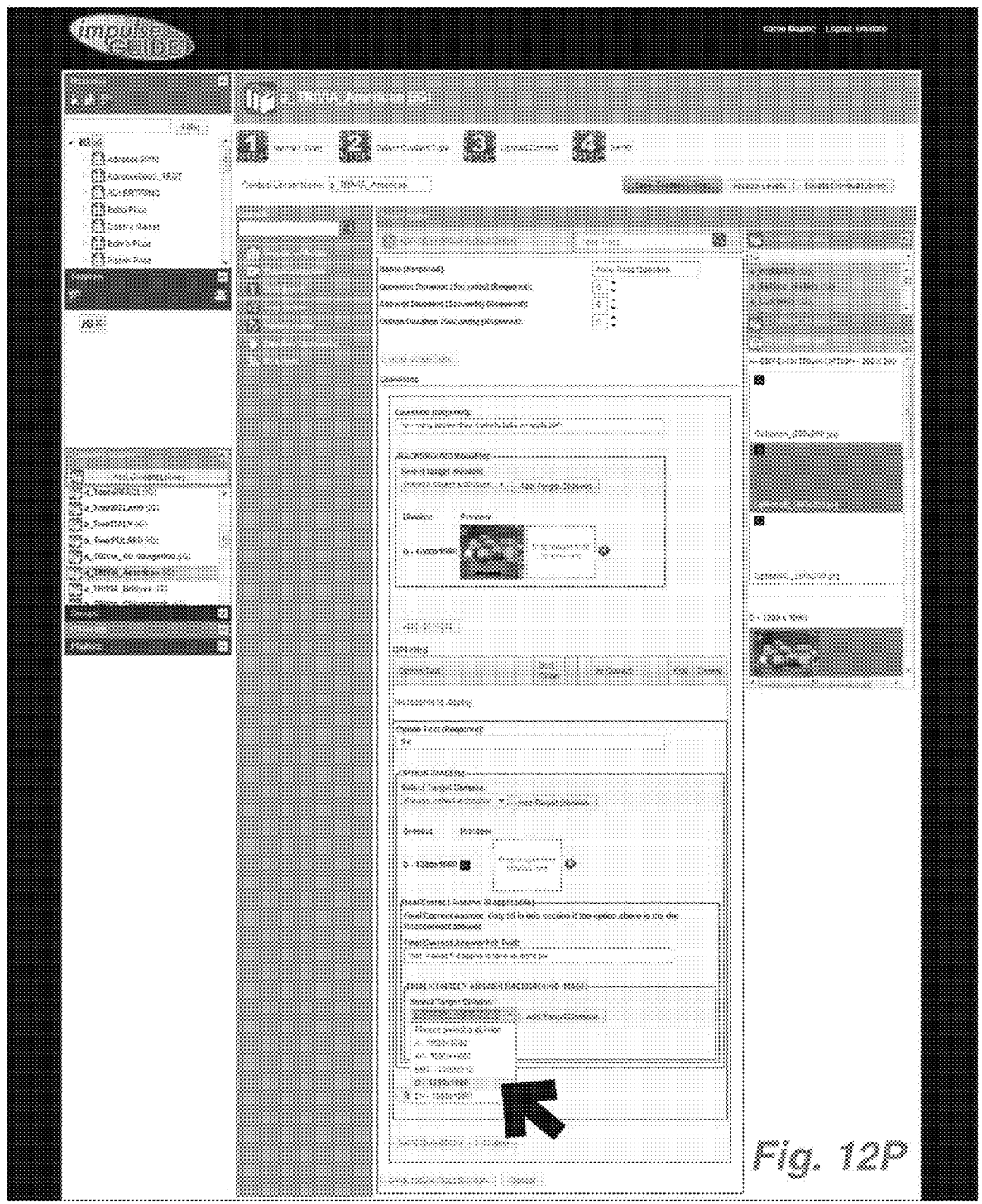
Figure 12Q:
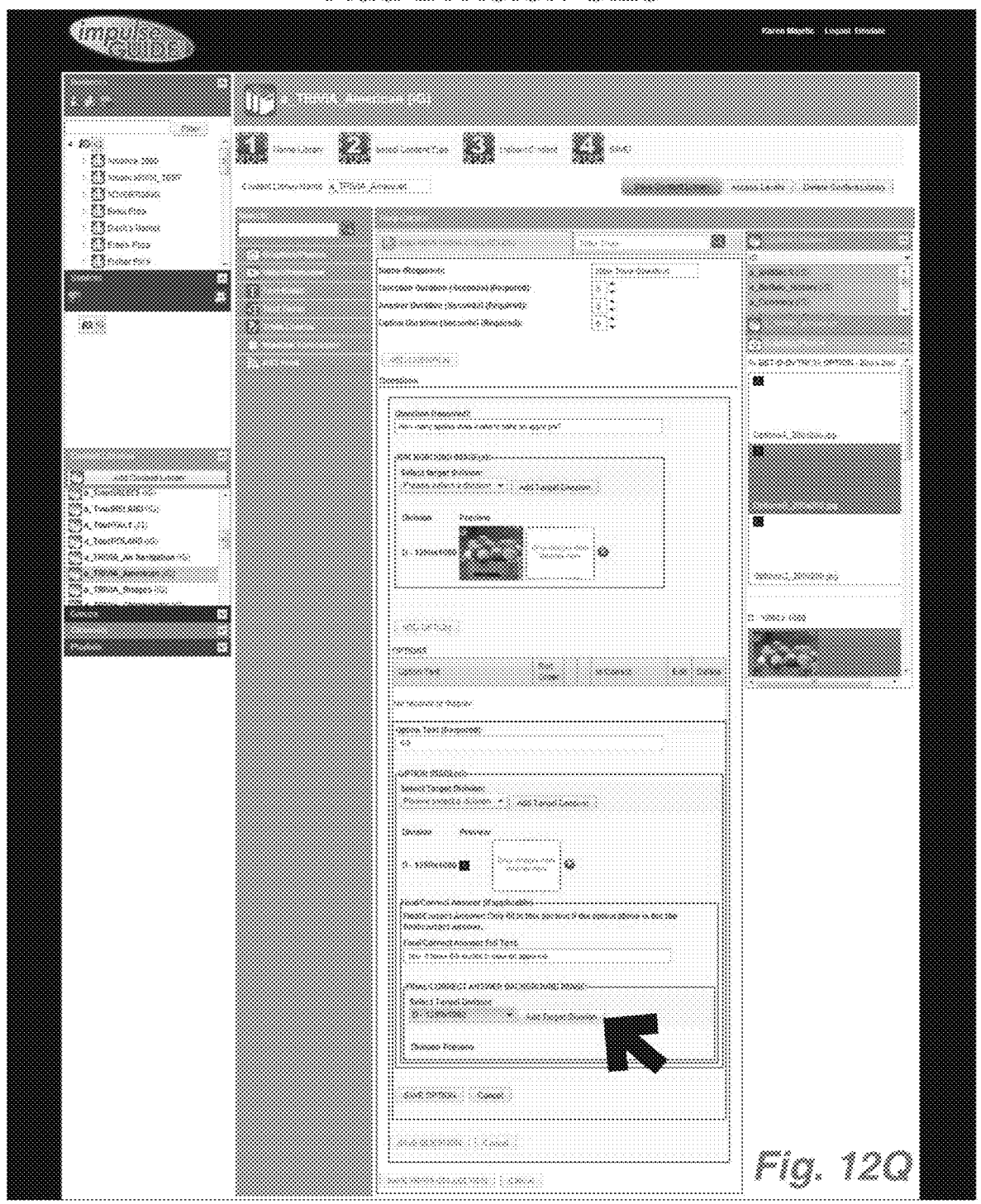
Figure 12S:
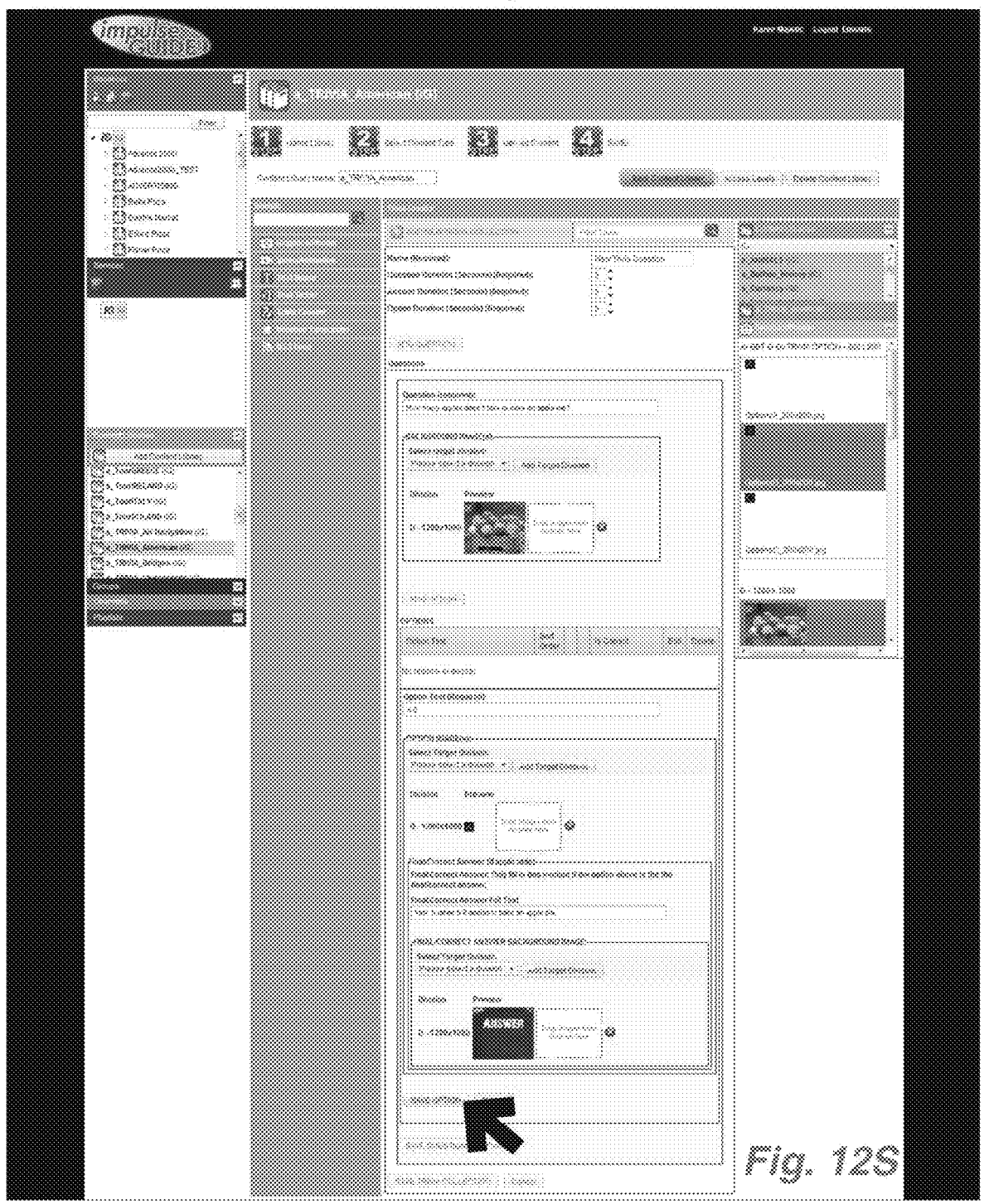

In step 1142, if the option is to be designated as the final/correct answer to be displayed, the user enters the desired full final answer text, as shown in FIG. 12O. In step 1144, the user selects the target screen division format (e.g., "D—1280×1080") for the trivia question compilation media item as shown in FIG. 12P, and in step 1146 selects option to add a target division background image for the final answer as shown in FIG. 12Q. The user may then click and drag an image from the content library shown in the right-hand panel which is selected for use in the selected target screen division format as the final answer background image as shown in FIG. 12R. In step 1148, a user may decide to go back to step 1144, and select an additional target screen division format for the compilation media item to be used with. In such case, an additional background image for the final answer display may then be selected for use of the compilation media item in the additional selected target screen division format. In step 1150, the completed option may then be saved as shown in FIG. 12S.

Figure 12T:
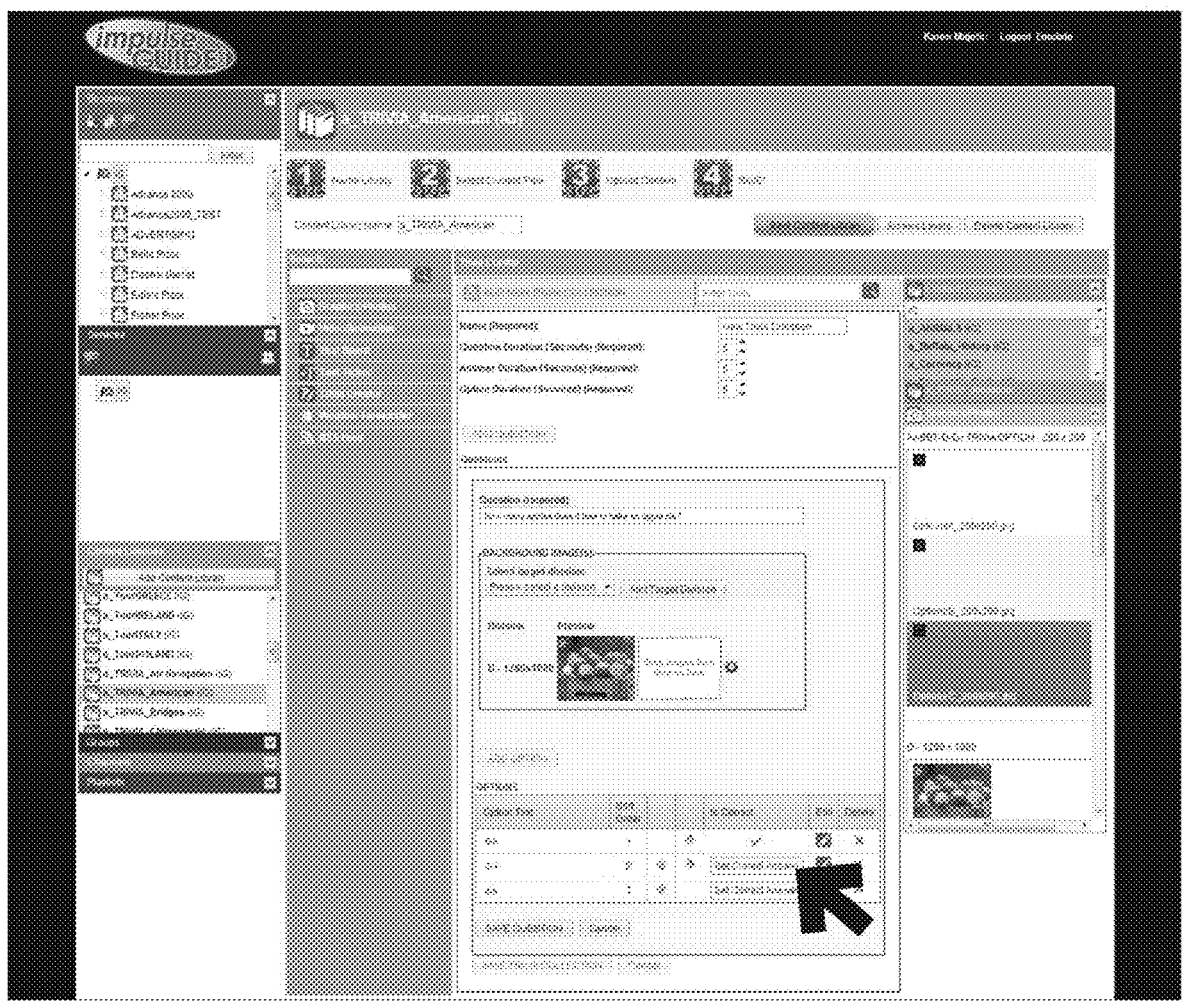
Figure 12U:
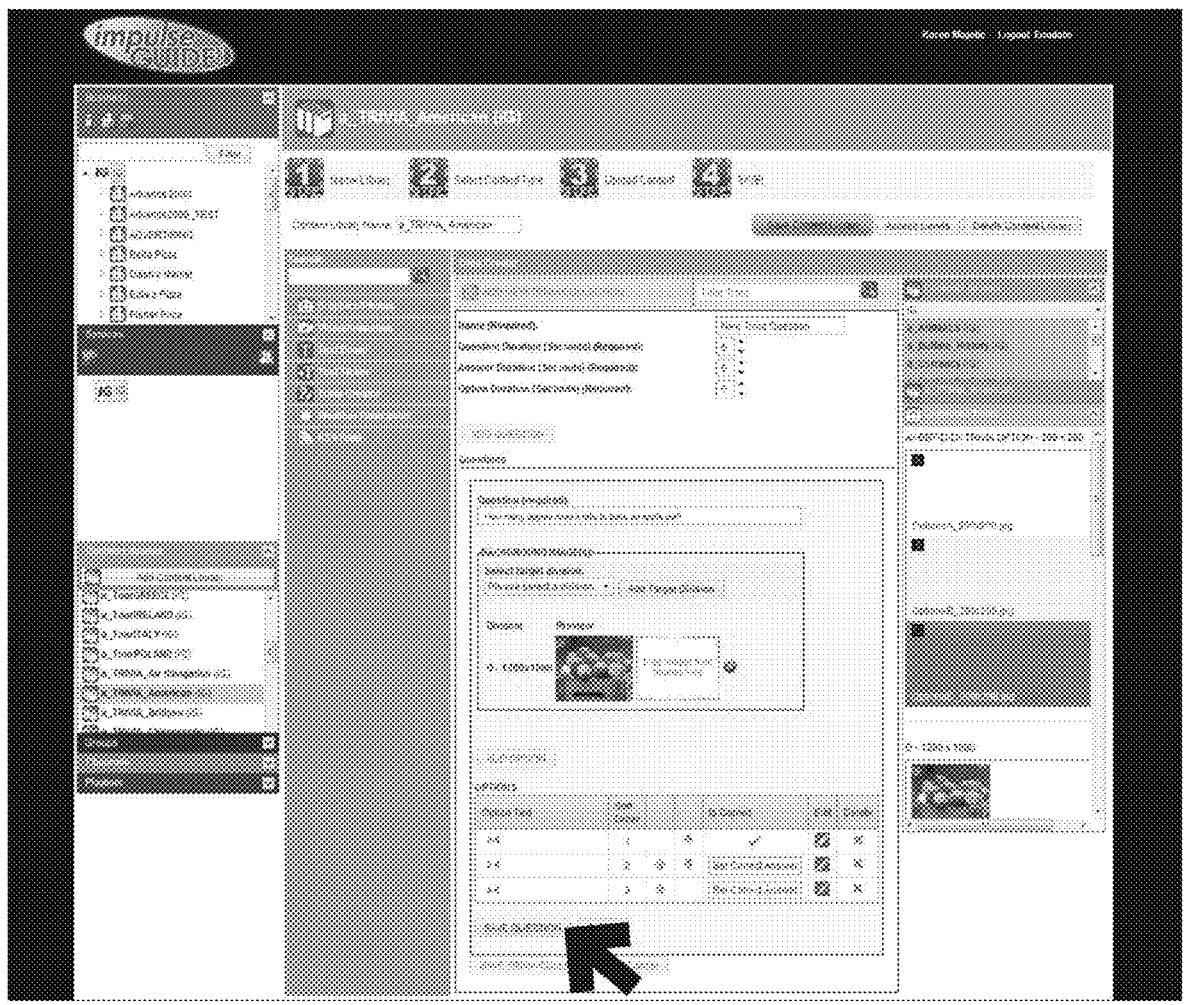
Figure 12V:
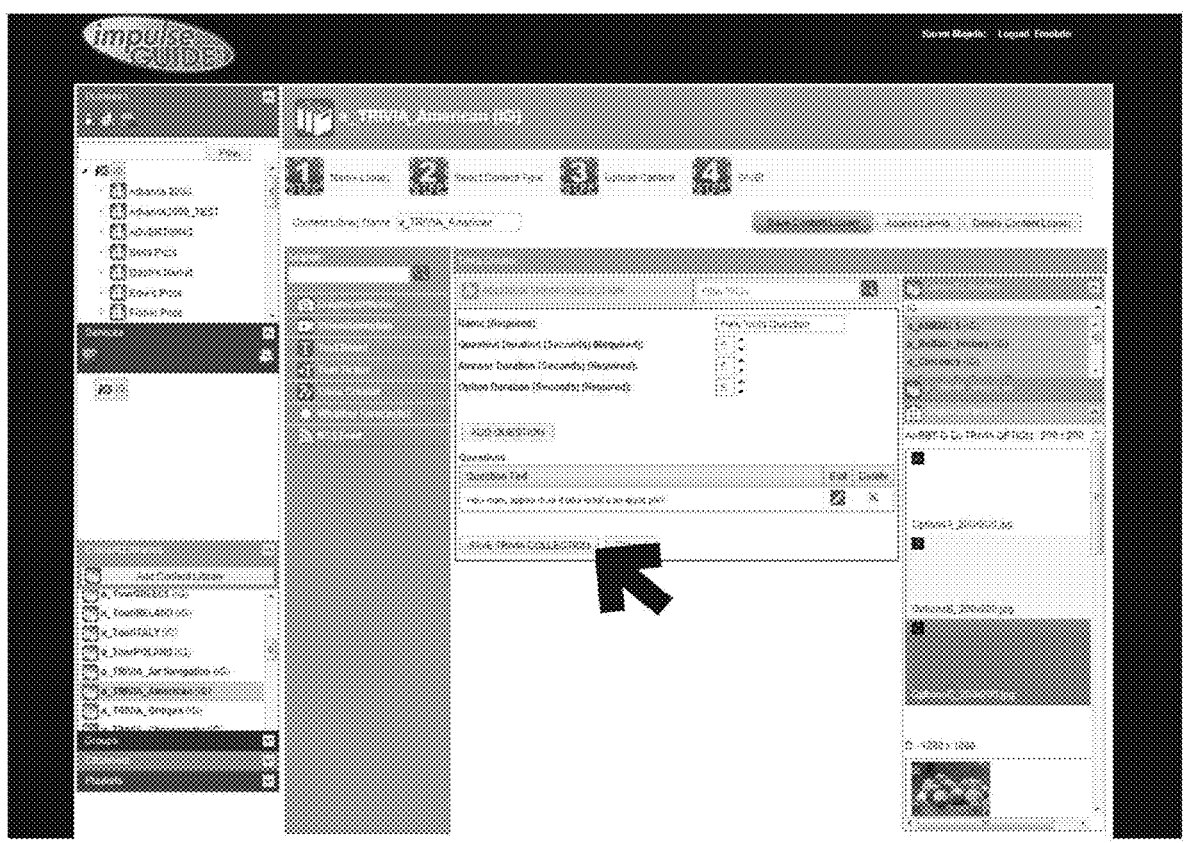

In step 1152, the user decides if an additional answer option is desired to be entered. If so, steps 1132-1150 of FIG. 11 may be repeated one or more times, e.g., to create second and third option answers with associated option images to be displayed along with the first saved option answer superimposed over the question background image. In step 1154, after multiple option answers are created and saved, the correct answer is selected as shown in FIG. 12T. As further shown in FIG. 12T, in a particular embodiment the option answers may be sort ordered, e.g., such that the options may be sequentially added to the question background image, or alternatively sequentially faded from the question background image until only the correct answer remains. In step 1156, the completed question may then be saved as shown in FIG. 12U, and in step 1158 the trivia collection saved as shown in FIG. 12V.

Figure 13A:
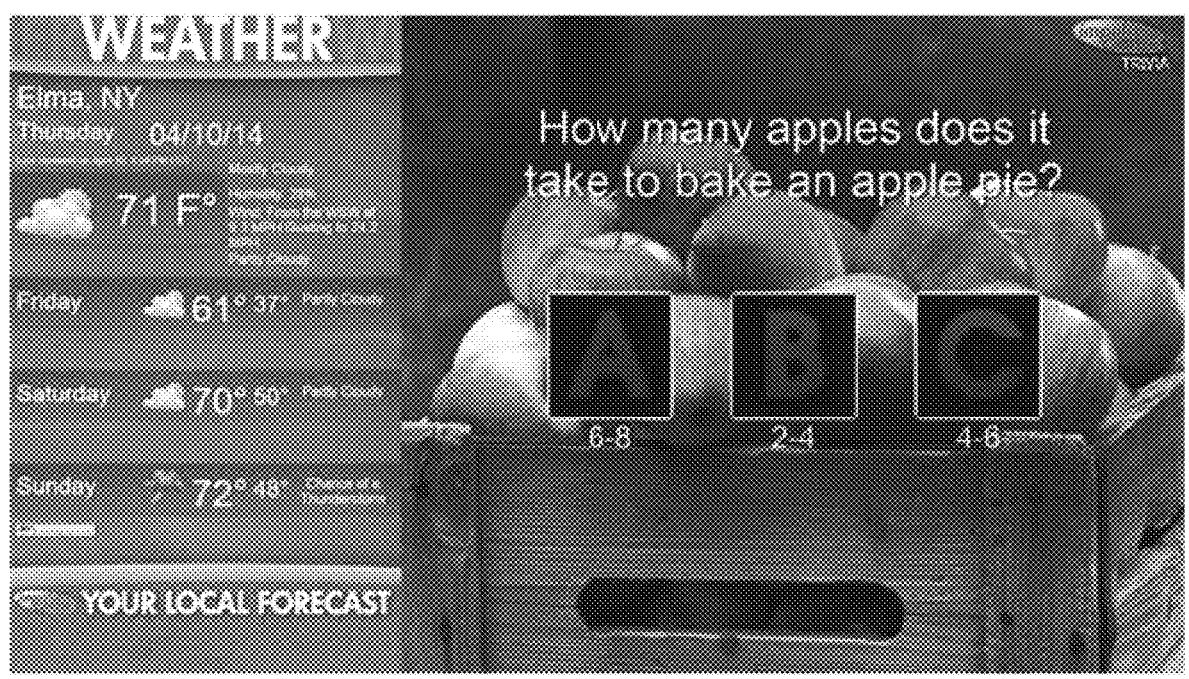
FIGS. 13A and 13B illustrate resulting display images for a compilation media item created in accordance with the trivia type question, options and answer compilation media item example in FIGS. 12A-12V.
Figure 13B:
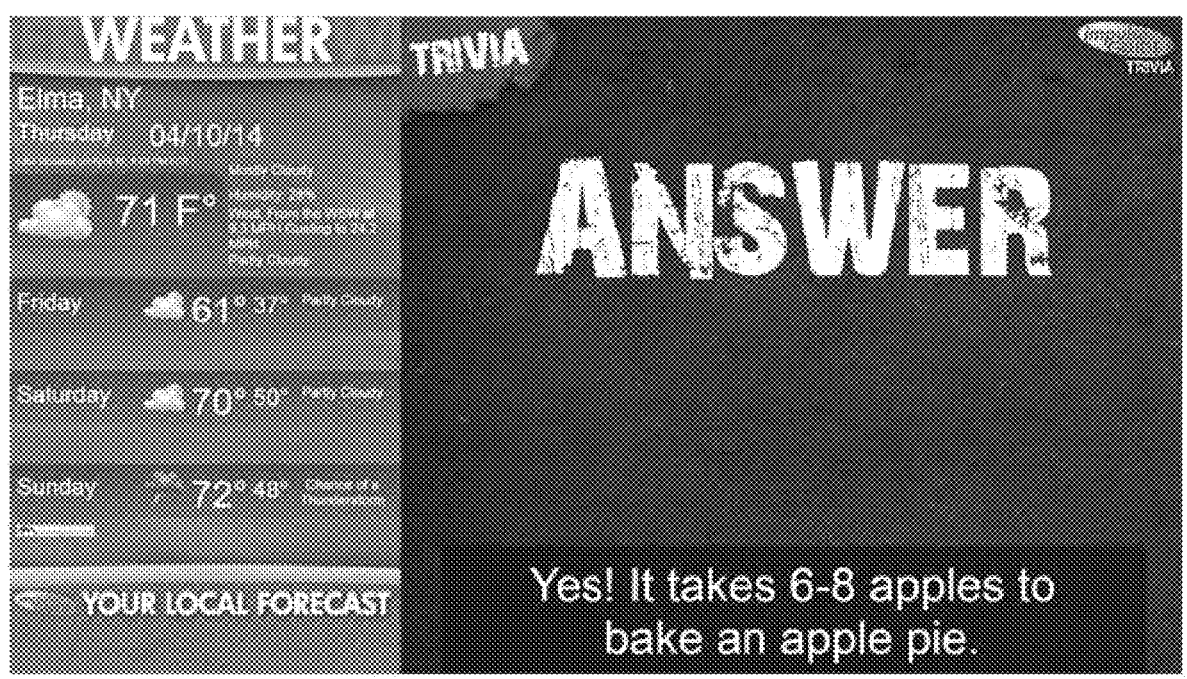

FIGS. 12A-12V thus illustrate GUI screens which may be employed in accordance with steps 1110-1158 of FIG. 11 to create and save a trivia question (e.g., "How many apples does it take to bake an apple pie?") for display on a selected background image, along with multiple answer options (e.g., "6-8", "2-4", "4-6") and corresponding option images (e.g., block letters "A", "B", and "C") for super-imposition over the question background image, and a final answer ("Yes! It takes 6-8 apples to bake an apple pie.") for subsequent display on a selected final answer background image. The compilation media item creator tool employs a template which positions the question and answer options over the first selected background image for display of a first composite image in a selected target division as illustrated, e.g., in the right hand screen division in FIG. 13A (which illustrates a screen display having a screen layout like screen layout 14E as shown in FIG. 1E, with screen divisions 12E and 12D) and the final answer over the selected final answer background image for display of a following second composite image in the selected target division as illustrated, e.g., in FIG. 13B. The trivia question, with associated background and option images for selected target divisions, will then be available for addition to groups, channels, and playlists which correspond to a selected target division of the completed trivia question. As further shown in FIGS. 13A and 13B, other media items may be displayed in the other illustrated screen division, such as a local weather media item as illustrated in the left hand screen division, while the trivia item is being displayed in the target screen division in accordance with further preferred embodiments of the invention as described herein.

While FIGS. 12A-12V illustrate an embodiment for creation of a trivia type compilation media item with A/B/C "multiple choice" type option answers, such trivia creator tool may also be employed to create other types of compilation media items such as, e.g., "What am I" type questions (e.g., where multiple images are presented as clues in place of answer options, and the "final answer" is, e.g., what the clues might have in common), "True/False" type questions, "Which one doesn't belong" type questions, or other question and game formats employing background and option images and text.

The various components of the system for managing display of a plurality of media items on an electronic display device screen of a specified screen format as described herein may be implemented in software, hardware, firmware, or a combination thereof. As mentioned above, a centrally located server 20 (FIG. 2) may be accessed by a user to access individual stored media items, groups of related media items and channels of related media items, and perform the operations described herein, and a created player program may be scheduled to be distributed over the network to any one or more selected media player driving different displays 10 in the network. Those skilled in the art will recognize, however, that it would also be possible to share some of the storage and processing tasks between the central server and any local computers if so desired. Moreover, the tasks of managing the network, including the tasks of creating and storing media items in defined screen division formats, could be shared between different linked computers and databases, and the central server 20 is intended to reflect that possibility. Further specific digital signage hardware and software system components that may be further employed in the methods and systems of the present invention include, e.g., those conventional hardware system and software programming components described in U.S. Pat. Pub. No. 2009/0144157, the disclosure of which is incorporated herein in its entirety.

One advantage of the present system is that a high amount of varying media content can be created and stored in accordance with defined screen division formats, and once created and stored can be easily programmed into a playlist containing channels or groups of media items, and easily scheduled and presented resulting in enticing and engaging display messages. The channel and group system of the invention can be advantageously applied to electronic media displays in any industry, keeping display content fresh and improving patron engagement. In particular, the food, retail, and medical industries can benefit from the advantages of using multiple images saved in a themed group or channel to create a playlist with a highly variable display of image sequencing to sell the same or similar services, without having to constantly manually update content to change displayed images or to create a single long sequential item playlist. Providing a variety of prepared media content in defined screen division formats which together correspond to a specified screen format, suitable for playout directly on system hardware and software specifically configured for use with such provided media content, further enables a complete turnkey digital signage system for system users. Benefits include improved customer engagement, more dynamic presentation of media and messages, reduced redundancy in images seen by patrons, increase relevance of content, and economy of operations in media management. Further employing media saved in defined screen division formats and scheduled for playout only in corresponding defined screen divisions of a defined screen layout eliminates the need for transcoding of media at the time of playout, so as to advantageously minimize media player processing requirements. As standardized electronic display device screens having the same defined screen formats may be deployed by multiple different organizations and/or by the same or different organizations at multiple different locations, the process of publishing media items saved by or created for one or more clients in a defined screen division format cooperatively across multiple client systems is enabled in the use of the system. Cooperative use of saved media items enabled by the present invention extends the promotional reach and makes messaging at each playout location more interesting.

In a further embodiment, the invention provides a system for managing display of a plurality of media items on an electronic display device screen of a specified screen format comprising: a plurality of defined screen division formats stored in an electronic memory, where each defined screen division format is configured to represent either the entire specified screen format or a portion of the specified screen format; a plurality of defined screen layouts stored in an electronic memory, each defined screen layout comprising either i) a defined screen division format configured to represent the entire specified screen format or ii) two or more defined screen division formats each configured to represent a portion of the specified screen format and which are spatially combined to form divisions which together represent the entire specified screen format; a plurality of media items, and groups or channels of media items stored in an electronic memory, each stored in one of the plurality of defined screen division formats; and a player program creator configured to create and store player program instructions in an electronic memory for controlling a media player to display media items on an electronic display device screen of the specified screen format selected from the plurality of media items and groups or channels of media items in accordance with a selected one or more of the defined screen layouts displayed in a selected sequence, wherein media items selected to be displayed in each defined screen division format of each selected defined screen layout are only selectable in the player program creator from media items stored in the corresponding screen division format.

In a further embodiment, the invention provides a networked system for managing display of a plurality of media items on a plurality of electronic display device screens of a specified screen format comprising: a plurality of defined screen division formats stored in an electronic memory, where each defined screen division format is configured to represent either the entire specified screen format or a portion of the specified screen format; a plurality of defined screen layouts stored in an electronic memory, each defined screen layout comprising either i) a defined screen division format configured to represent the entire specified screen format or ii) two or more defined screen division formats each configured to represent a portion of the specified screen format and which are spatially combined to form divisions which together represent the entire specified screen format; a plurality of media items, and groups or channels of media items stored in an electronic memory, each stored in one of the plurality of defined screen division formats; a player program creator configured to create and store player program instructions in an electronic memory for controlling media players to display media items on the plurality of electronic display device screens selected from the plurality of media items, and groups or channels of media items in accordance with a selected one or more defined screen layouts displayed in a selected sequences, wherein media items selected to be displayed in each defined screen division format of each selected defined screen layout are only selectable in the player program creator from media items stored in the corresponding screen division format.

The invention claimed is:

1. A computer implemented method for displaying a customized compilation media item comprising a compilation of multiple images and textual content on an electronic display device screen comprising:

accessing a compilation media item creator program stored in an electronic database employing at least first and second templates arranged in accordance with a media application script for display of first and second composite images in a specified sequence, wherein the first template includes one or more text boxes superimposed over a first background image field and the second template includes one or more text boxes superimposed over a second background image field;

entering text to be displayed in one or more text box in the first template and selecting a background image to be displayed in the first background image field from images stored in an electronic database, and saving the entered text and selected background image in an electronic database to create saved information for the first composite image;

entering text to be displayed in one or more text box in the second template and selecting a background image to be displayed in the second background image field from images stored in an electronic database and saving the entered text and selected background image in an electronic database to create saved information for the second composite image;

saving the entered text and selected background images for the first and second templates in an electronic database in combination as a saved customized compilation media item;

including the saved customized compilation media item as an individual media item along with other individual media items in a saved player program on an electronic database; and driving the electronic display device screen with a media player to display media items on the electronic device display screen, wherein the media player is configured by the saved player program to sequentially display different individual media items included in the saved player program, including the saved customized compilation media item;

and further comprising:

accessing an electronic library of media items stored in an electronic database, including collections of media items saved in the electronic data base as groups or channels of media items, where each group or channel of media items contains a plurality of media items;

selecting multiple selections from the group consisting of channels of media items, groups of media items and individual media items saved in the electronic library, where the multiple selections include at least one selected group or channel of media items, and arranging the multiple selections in a designated first sequential arrangement for sequential display of a media item from each selected group or channel and any selected individual media items, wherein the saved customized compilation media item is saved in a selected group or channel of media items, and saving the designated first sequential arrangement of selected groups or channels of media items and selected individual media items in an electronic database as a first playlist;

forming and saving one or more additional playlists by selecting and arranging one or more selections from the group consisting of channels of media items, groups of media items and individual media items saved in the electronic library, in one or more additional designated sequential arrangements for sequential display of a media item from each selected channel, group and selected individual media items, and saving the one or more additional designated sequential arrangements of channels of individual media items, groups of individual media items and individual media items in an electronic database as one or more additional playlists; and selecting and arranging one or more playlists including at least the first playlist in a desired sequential playlist order and saving the desired sequential playlist order in a player program on an electronic database, wherein a media player driving the electronic display device screen is configured by the saved player program to display media items on the electronic device display screen in a manner corresponding to a repeating loop of the arranged order of selected playlists and selection of sequential arrangement of channels of media items, groups of media items and individual media items in each selected playlist, wherein each channel and/or group in each playlist is programmed such that the media player is further configured by the player program to play a different media item from the channel and/or group relative to the media item played the previous time the channel and/or group is played by the media player, whereby the media item displayed on the electronic display device screen for a channel and/or group is changed, relative to the previous displayed media item for the channel and/or group, each time the channel and/or group is displayed in the designated sequential arrangement of channels, groups and individual media items of a playlist as a player program loop repeats.

2. The method of claim 1, wherein the first template includes at least a first text box superimposed over the first background image field in a first location for entering a question text string, and the media application script further enables layering of one or more answer option text boxes and/or answer option images selected from images stored in an electronic database over the first background image in a second location, and further comprising entering a question text string in the first text box, entering answer option text strings in answer option text boxes and/or selecting answer option images from images stored in an electronic database, and entering a final answer text string in a text box superimposed over the second background image, and saving the entered question text string and answer options text strings and/or answer option images in an electronic database to create the saved information for the first composite image.

3. The method of claim 2, wherein an answer option image is selected to be displayed superimposed over the first background image field in the second location in association with an answer option text string from images stored in an electronic database, and further saving the selected answer option image in an electronic database to create the saved information for the first composite image.

4. The method of claim 2, wherein the first template enables one to three of each of answer option text boxes and answer option images to be superimposed over the first background image field in the second location, and further comprising entering an answer option text string in one to three of the answer option text boxes and saving the entered answer option text strings in an electronic database to create the saved information for the first composite image.

5. The method of claim 4, further comprising selecting an answer option image to be displayed superimposed over the first background image field in association with each of the one to three answer option text strings from images stored in an electronic database, and further saving the selected answer option images in an electronic database to create the saved information for the first composite image.

6. The method of claim 2, wherein the first template enables one to three answer option images to be superimposed over the first background image field in the second location, and further comprising selecting one to three answer option images to be displayed superimposed over the first background image field from images stored in an electronic database, and further saving the selected answer option images in an electronic database to create the saved information for the first composite image.

7. The method of claim 2, wherein the compilation media item creator program centers the option text boxes and/or associated option images in the second location depending upon the number of options included in the compilation medium item.

8. The method of claim 2, wherein the option text boxes and/or option images are animated so as to individually be removed from the first composite image before the second composite image is displayed.

9. The method of claim 1, further comprising selecting multiple individual customized compilation media items from the electronic library to be displayed to form one or more groups or channels of customized compilation media items, where each formed group or channel of customized compilation media items contains a plurality of selected customized compilation media items, and saving the formed groups or channels in the electronic database.

10. The method of claim 1, further comprising selecting a group or channel play method for each selected group or channel of media items, and wherein the group or channel play method selected for at least one group or channel of media items selected for display in at least one playlist, configures the media player to display media items in the group or channel in a selected repeating ordered sequence each time the group or channel is displayed.

11. The method of claim 1, further comprising selecting a group or channel play method for each selected group or channel of media items, and wherein the group or channel play method selected for at least one group or channel of media items selected for display in at least one playlist, configures the media player to display media items in the group or channel in a random shuffle sequence each time the group or channel is displayed.

12. The method of claim 1, wherein at least one selected playlist includes more than one group or channel of media items in at least one designated sequential arrangement of selected groups or channels of media items or individual media items.

13. A method according to claim 1, further comprising:
selecting a defined screen division format from a plurality of defined screen division formats, wherein the electronic display device screen is of a specified screen format, and each defined screen division format is configured to represent either the entire specified screen format or a portion of the specified screen format, and further wherein individual media items selected from the electronic library to be displayed to form one or more groups or channels of media items are selected to be displayed in a selected defined screen division format;

selecting a first defined screen layout from a plurality of defined screen layouts, each of the plurality of defined screen layouts comprising either i) a defined screen division format configured to represent the entire specified screen format or ii) two or more defined screen division formats each configured to represent a portion of the specified screen format and which are spatially combined to form divisions which together represent the entire specified screen format, wherein one or more groups or channels of media items, and individual media items, saved in the electronic library, are selected and arranged in designated sequential arrangements for sequential display of a media item from each selected channel or group and any selected individual media items in each defined screen division format of the selected first defined screen layout, and the designated sequential arrangements of groups or channels of media items and individual media items in each defined screen division format of the selected first defined screen layout are saved in an electronic database as a first playlist for the selected first defined screen layout;

wherein additional playlists for additional defined screen layouts selected from the plurality of defined screen layouts are formed and saved, by selecting and arranging one or more groups or channels of media items or individual media items saved in the electronic library, in designated sequential arrangements for sequential display of a media item from each selected group or channel and selected individual media items in each defined screen division format of each selected additional defined screen layout, and saving the designated sequential arrangements of groups or channels of media items or individual media items in each defined screen division format of each selected additional defined screen layout in an electronic database as an additional playlist for each selected additional defined screen layout;

and wherein selected playlists including the first playlist and additional playlists for selected defined screen layouts are arranged in a desired sequential order and the desired sequential order is saved in a player program on an electronic database, wherein a media player driving the electronic display device screen is configured by the saved player program to display media items on the electronic device display screen in each defined screen division format of each selected defined screen layout in a manner corresponding to a repeating loop of the arranged order of selected playlists and selection and sequential arrangement of channels of media items, groups of media items, and individual media items in each selected playlist, wherein each channel and/or group in each playlist is programmed such that the media player is further configured by the player program to play a different media item from the channel and/or group relative to the media item played the previous time the channel and/or group is played by the media player, whereby the media item displayed on the electronic display device screen for a channel and/or group displayed in a defined screen division format is changed, relative to the previous displayed media item for the channel and/or group, each time the channel and/or group is displayed in the designated sequential arrangement of channels, groups and individual media items of a playlist as a player program loop repeats.

14. The method of claim 13, further comprising selecting either a sequential group or channel play mode or a shuffle group or channel play mode for each selected group or channel of media items in each designated sequential arrangement in each playlist.

15. The method of claim 13, wherein the electronic library of media items stored in an electronic database comprises a plurality of media items each stored in one of the plurality of defined screen division formats, and saved groups or channels of media items consist of media items selected from those stored in the same defined screen division format.

16. The method of claim 15, further wherein playlists for selected defined screen layouts comprise channels of media items, groups of media items and individual media items stored in defined screen division formats corresponding to the defined screen division formats of a selected defined screen layout.

17. The method of claim 16, wherein channels of media items, groups of media items, and individual media items selected to be displayed in each designated sequential arrangements of channels of media items, groups of media items, or individual media items in each defined screen division format of each screen layout are only selectable from channels, groups and individual media items stored in the corresponding screen division format.

18. The method of claim 17, further comprising naming each saved channel of media items and groups of media items in accordance with a corresponding selected defined screen division format.

19. The method of claim 13, further comprising selecting and saving in an electronic database a plurality of alternative images designated for use in a plurality of alternative defined screen division formats for the first and second background image fields of the compilation media item, wherein the compilation media item is made available for selection for addition to a group, channel, or playlist for a specified defined screen division format if images for the compilation media item designated for use in the specified defined screen division format are saved for such compilation media item.

20. A method according to claim 13, wherein at least one selected defined screen division format is configured to represent a portion of the specified screen format, and wherein the selected first defined screen layout comprises two or more defined screen division formats each configured to represent a portion of the specified screen format and which are spatially combined to form divisions which together represent the entire specified screen format.

21. The method of claim 20, wherein the electronic library of media items stored in an electronic database comprises a plurality of media items each stored in one of the plurality of defined screen division formats, and saved groups or channels of media items consist of media items selected from those stored in the same defined screen division format; wherein playlists for selected defined screen layouts comprise channels of media items, groups of media items and individual media items stored in defined screen division formats corresponding to the defined screen division formats of a selected defined screen layout; and wherein channels of media items, groups of media items, and individual media items selected to be displayed in each designated sequential arrangements of channels of media items, groups of media items, or individual media items in each defined screen division format of each screen layout are only selectable from channels, groups and individual media items stored in the corresponding screen division format.

* * * * *